(12) United States Patent
Dehkordi et al.

(10) Patent No.: US 12,360,366 B2
(45) Date of Patent: Jul. 15, 2025

(54) SYSTEMS AND METHODS FOR INTEGRATING INTO A VEHICLE VIRTUAL DISPLAY SYSTEMS USING FIELD EVOLVING CAVITIES AND CURVED COMPONENTS

(71) Applicant: BRELYON INC., San Mateo, CA (US)

(72) Inventors: Barmak Heshmat Dehkordi, San Mateo, CA (US); Christopher Barsi, Lee, NH (US); Albert Redo Sanchez, San Mateo, CA (US)

(73) Assignee: BRELYON, INC., San Mateo, CA (US)

( * ) Notice: Subject to any disclaimer, the term of this patent is extended or adjusted under 35 U.S.C. 154(b) by 0 days.

(21) Appl. No.: 18/767,629

(22) Filed: Jul. 9, 2024

(65) Prior Publication Data

US 2025/0199302 A1    Jun. 19, 2025

Related U.S. Application Data

(63) Continuation of application No. PCT/US2024/010254, filed on Jan. 4, 2024, which is a continuation-in-part of application No. PCT/US2023/083862, filed on Dec. 13, 2023.

(51) Int. Cl.
*G02B 27/01* (2006.01)
*G02B 30/25* (2020.01)

(52) U.S. Cl.
CPC ..... *G02B 27/0101* (2013.01); *G02B 27/0149* (2013.01); *G02B 2027/0154* (2013.01)

(58) Field of Classification Search
CPC ........... G02B 27/0101; G02B 27/0149; G02B 2027/0154
USPC ........................................................ 359/630
See application file for complete search history.

(56) References Cited

U.S. PATENT DOCUMENTS

| | | | |
|---|---|---|---|
| 6,262,848 B1 * | 7/2001 | Anderson | G02B 27/0101 359/633 |
| 10,852,838 B2 * | 12/2020 | Bradski | G06F 3/014 |
| 11,500,205 B2 * | 11/2022 | Liang | G06V 20/20 |

* cited by examiner

*Primary Examiner* — Wyatt A Stoffa
*Assistant Examiner* — Grant A Gagnon
(74) *Attorney, Agent, or Firm* — Hsuanyeh Law Group, PC

(57) ABSTRACT

A display system and method for generating virtual images or light field images includes, in some embodiments, a display and a field-evolving cavity. The field-evolving cavity modulates the optical depth of the virtual image. In some embodiments, the components of the display system are curved. The focal plane of the virtual image is curved and may approximate a portion of a human horopter. In some embodiments, the display system is integrated into a part of a vehicle. Components of the display system may move relative to each other, such that the display system is collapsible or foldable when not in use.

30 Claims, 38 Drawing Sheets

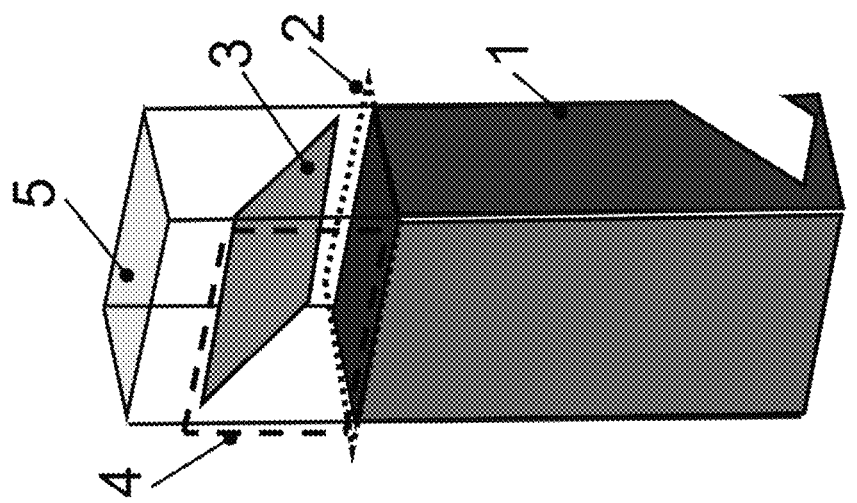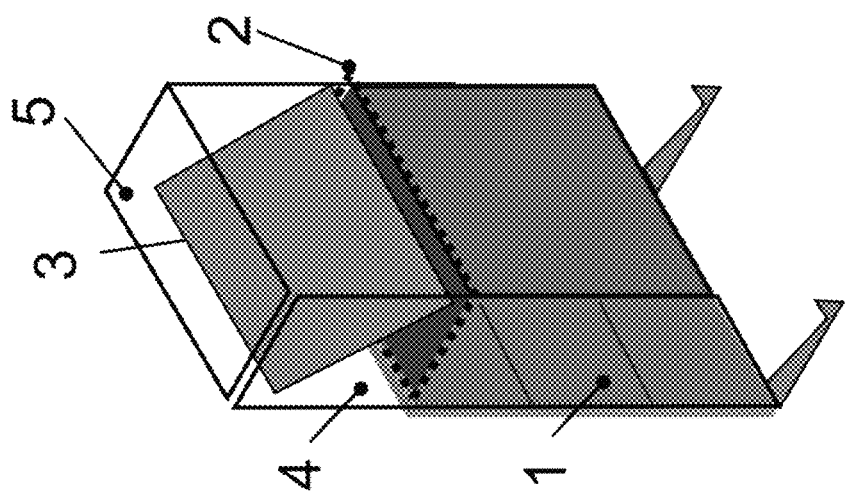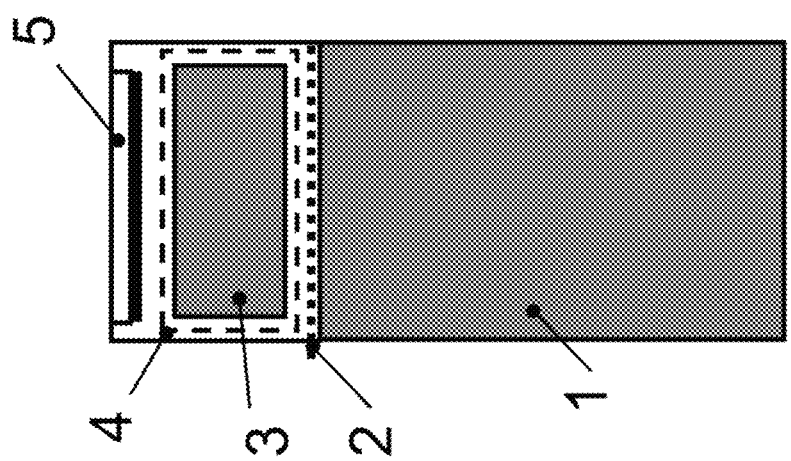
FIG. 1

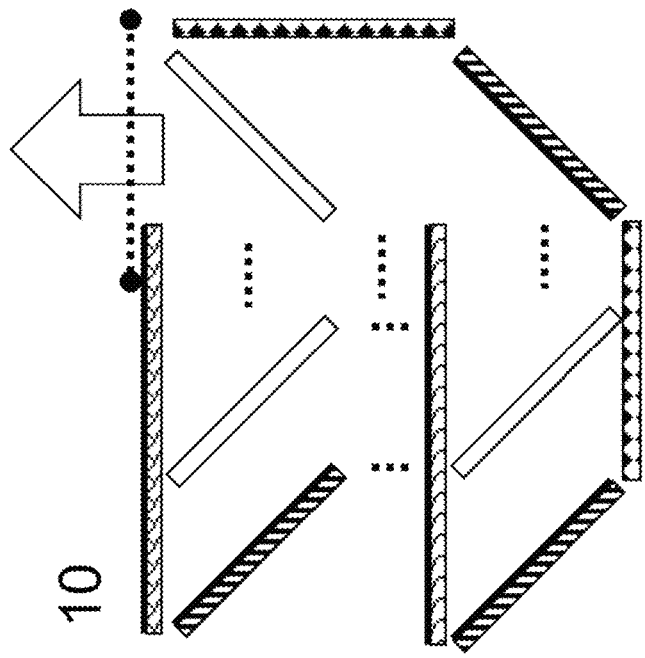
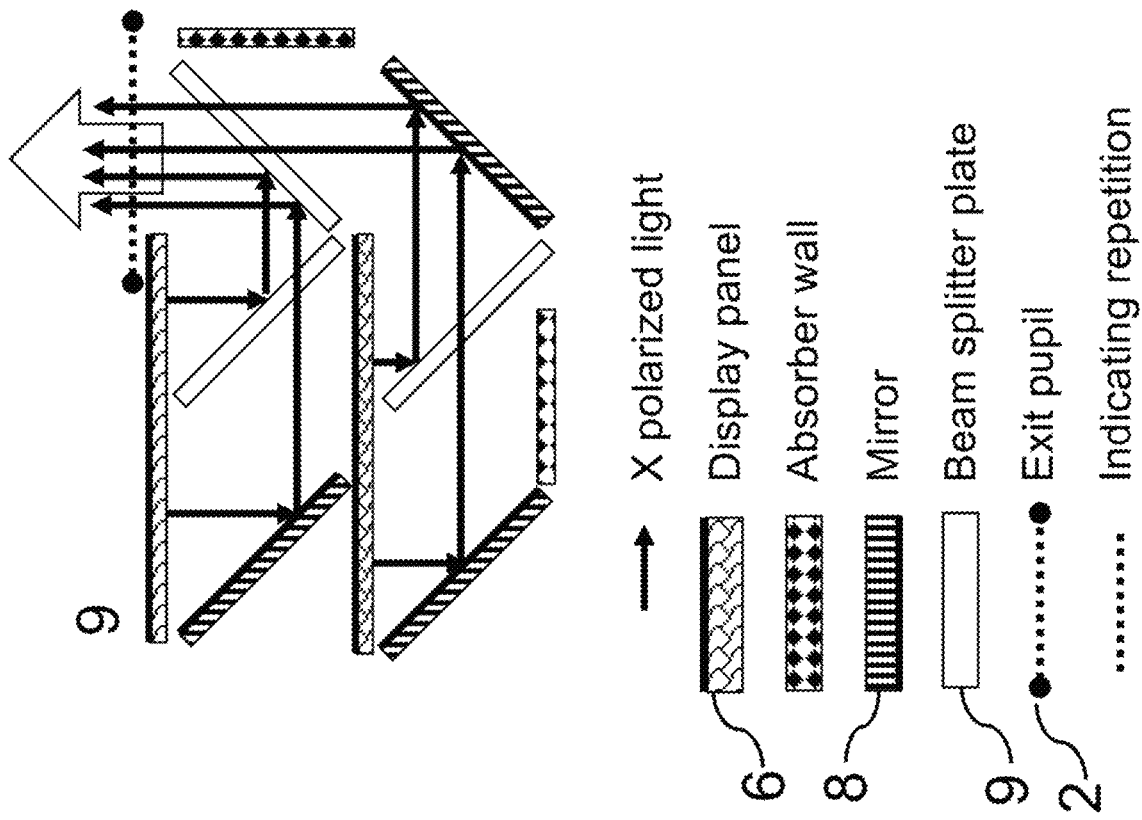
FIG. 3B

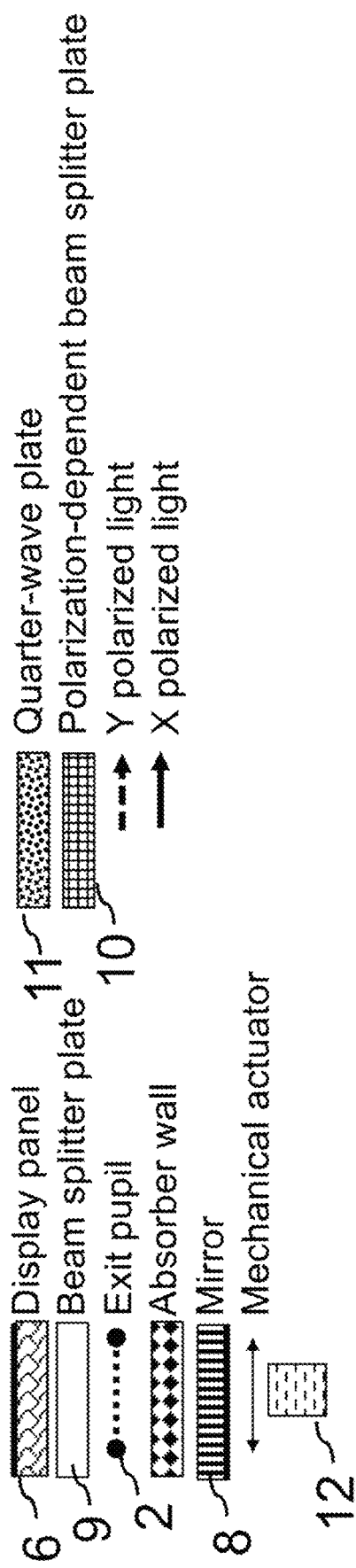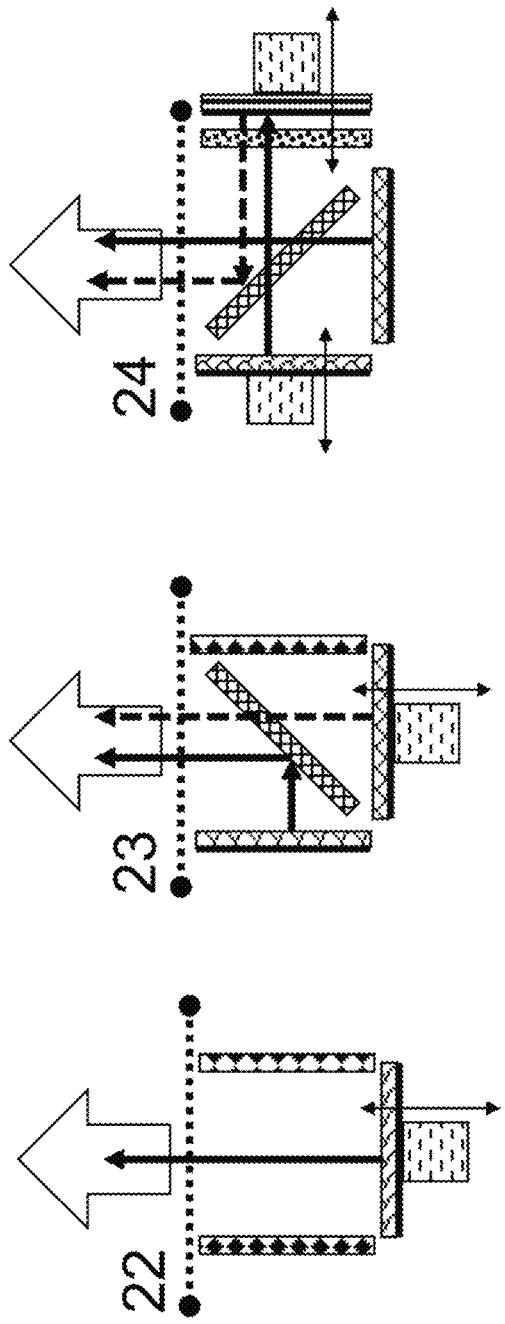
FIG. 6

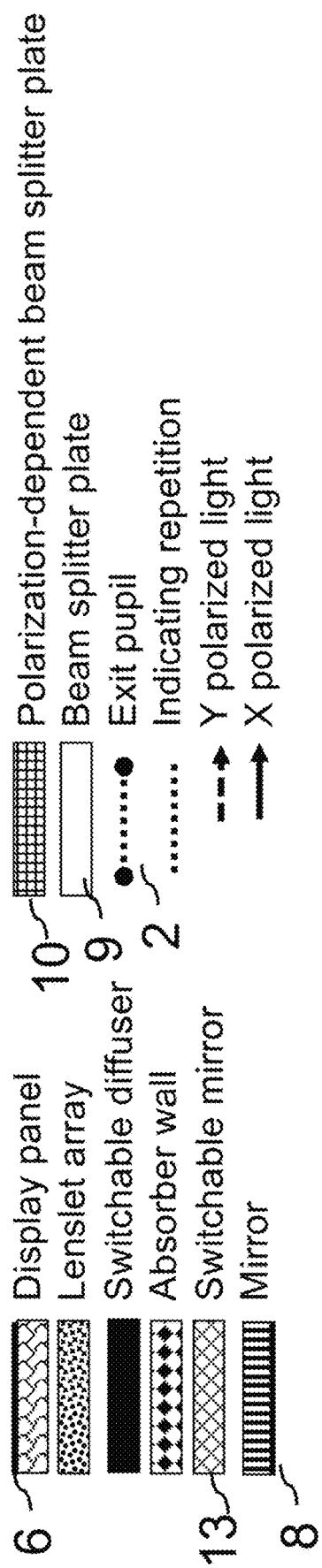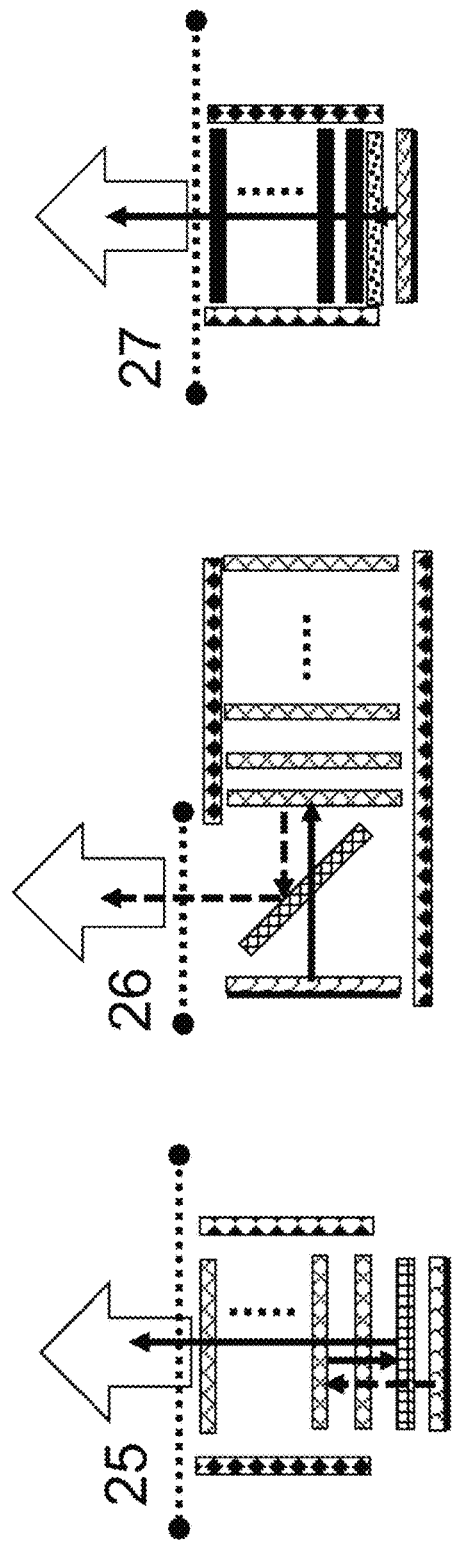
FIG. 7

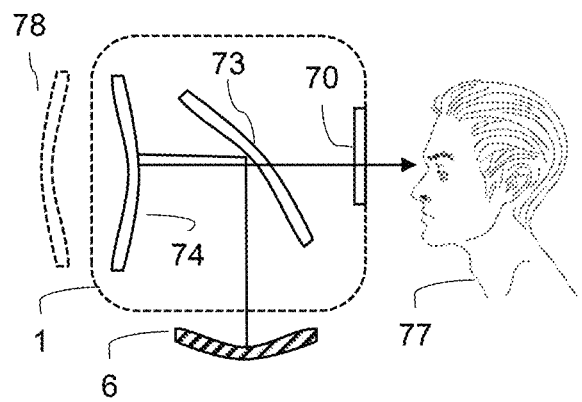
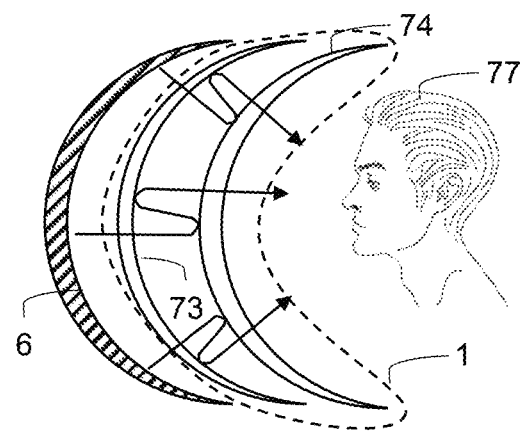
FIG. 21E
FIG. 21F
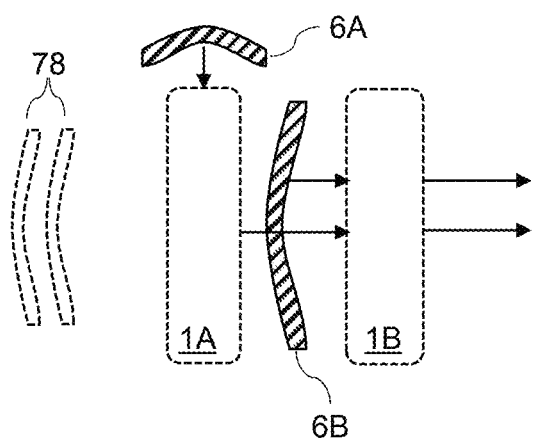
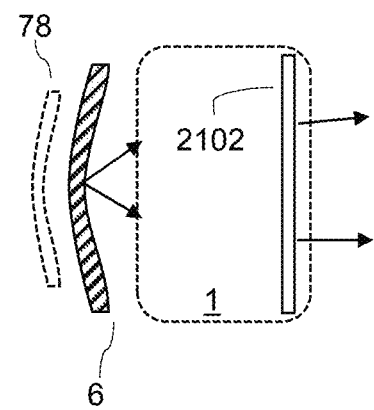
FIG. 21G
FIG. 21H

| 2nd move ><br>----<br>1st move v | Longitudinal movement | Rotational movement | Relative movement |
|---|---|---|---|
| Longitudinal movement | Pull and pull | Pull and turn | Pull and unfold |
| Rotational movement | Turn and pull | Turn and turn | Turn and unfold |
| Relative movement | Unfold and pull | Unfold and turn | Unfold and unfold |

FIG. 22A

| 3rd move ><br>----<br>1st + 2nd v | Longitudinal movement | Rotational movement | Relative movement |
|---|---|---|---|
| Pull and pull | and pull | and turn | and unfold |
| Pull and turn | and pull | and turn | and unfold |
| Pull and unfold | and pull | and turn | and unfold |
| Turn and pull | and pull | and turn | and unfold |
| Turn and turn | and pull | and turn | and unfold |
| Turn and unfold | and pull | and turn | and unfold |
| Unfold and pull | and pull | and turn | and unfold |
| Unfold and turn | and pull | and turn | and unfold |
| Unfold and unfold | and pull | and turn | and unfold |

FIG. 22B

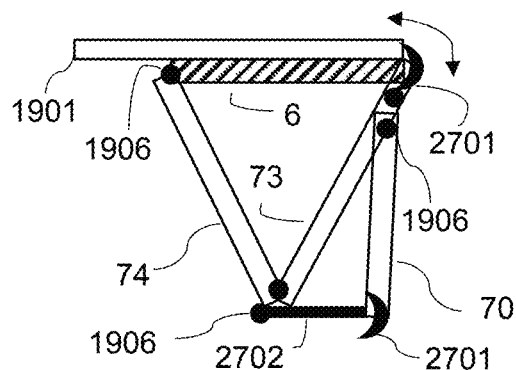
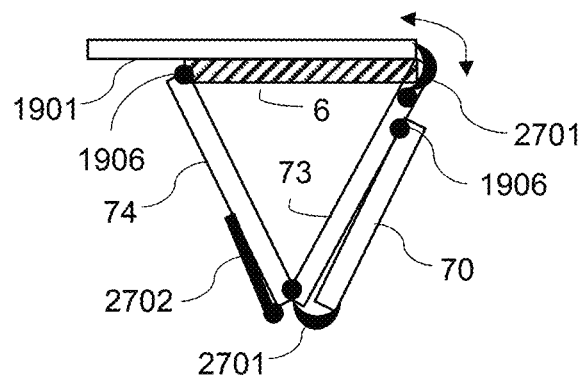
FIG. 27H  FIG. 27I
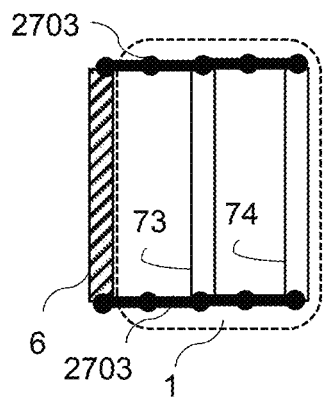
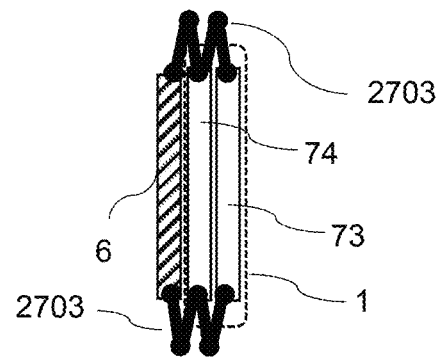
FIG. 27J  FIG. 27K
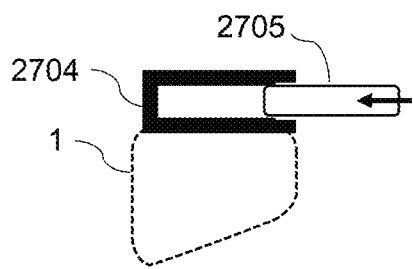
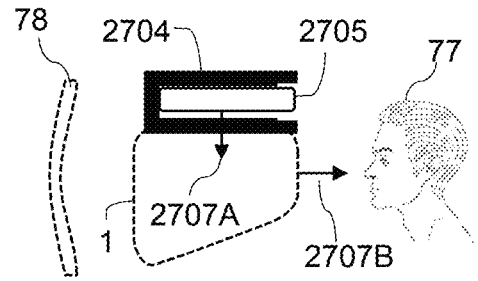
FIG. 27L  FIG. 27M
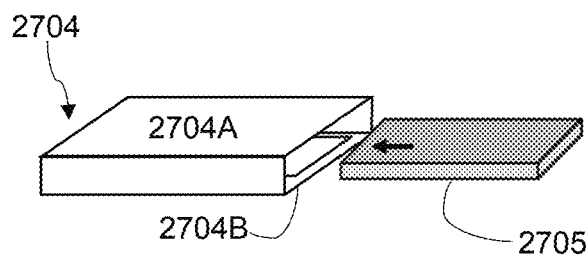
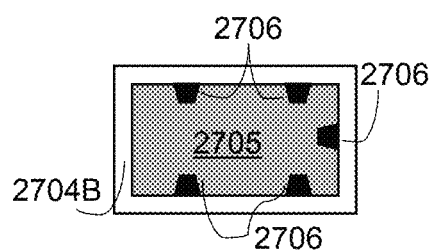
FIG. 27N  FIG. 27O

SYSTEMS AND METHODS FOR INTEGRATING INTO A VEHICLE VIRTUAL DISPLAY SYSTEMS USING FIELD EVOLVING CAVITIES AND CURVED COMPONENTS

This application claims priority to application no. PCT/US24/10254, filed on Jan. 4, 2024, and titled "Systems and Methods for Integrating into a Vehicle Virtual Display Systems Using Field Evolving Cavities and Curved Components," that in turn claims priority to application no. PCT/US23/83862, filed on Dec. 13, 2023, and titled "Systems and Methods for Integrating into a Vehicle Virtual Display Systems Using Field Evolving Cavities and Curved Components," both of which are herein incorporated by reference in their entirety.

FIELD OF THE INVENTION

The present invention relates generally to light-field displays. More specifically, the present invention is a system for creating compact light-field displays through varying optical depths.

BACKGROUND OF THE INVENTION

In present society, there has been an increasing traction towards more immersive light-field and/or autostereoscopic three-dimensional (3D) displays due to advancements in electronics and micro fabrications. Unlike stereoscopic 3D, light-field displays manipulate the wavefront to create depth perception at the monocular level. This can eliminate the accommodation-vergence mismatch and reduce stress on the user's eyes. There have been breakthroughs for realizing more realistic light-field experiences, which can be described in four major methods for creating such experiences, each method each having its own weaknesses and advantages: super multi-view, computational, multi-focal, and holographic. The super multi-view method provides a light-field at a very compact form but is limited to a very small viewing zone and low resolution. The computational method increases the resolution but produces haze and temporal flickering artifacts. The holographic method can struggle with color nonuniformity and fringing or specular artifacts. The multi-focal method can produce clean, but not scalable, images. Also, devices employing a multi-focal method can be bulky. However, universal to all current methods of light field displays are these following issues: large bandwidth requirements; a reliance on expensive and/or advanced components that are not easily mass produced such as tunable lenses; poor color uniformity, small field of view or viewing zone, low brightness, haze and diffraction artifacts, limited depth range; and the occasional necessity to wear specialized glasses. These challenges have significantly limited the use or production of light-field displays in commercial and/or industrial settings. Therefore, what is needed is a thorough class of optical methods that in some embodiments uses a set of reflectors positioned in a cavity to multiplex different liquid crystal displays (LCDs) or different portions of a single LCD onto different optical focal planes. This can allow a light-field within the cavity to adapt into or to certain optical depth(s) before it exits the cavity's exit pupil, while resolving the previously discussed issues associated with other methods of light-field display.

An objective of the present invention is to provide users with a device that can be a compact system of creating light-field displays at or through varying optical depths. The present invention intends to provide users with a device that addresses the previously discussed issues associated with current methods of light field displays. The present invention intends to provide users with a device that is less expensive and easier to produce at or for commercial and/or industrial levels. The present invention intends to provide users with a device that reduces artifacts without reducing the clarity of the light-field display. The present invention intends to provide users with a device that allows users to produce content for light-field displays more easily than conventional stereoscopic displays. The present invention intends to provide users with a device that does not require additional accessories or specialized components to be utilized by the user in order to view the content of the light-field display, such as specialized glasses or rending engines, respectively. The present invention intends to provide users with a device that can reduce an optical path difference to each focal plane of the light-field display and minimize the light loss from polarization. The present invention intends to provide users with a device that can vary the display focal plane without any mechanical motion.

SUMMARY OF THE INVENTION

The present invention is a system for creating compact light-field displays through varying optical depths. The present invention primarily contains a housing. The housing contains a plurality of panels in a variety of arrangements in which the present invention can produce light-field displays of varying degrees or scope. The present invention also contains a relay panel. The present invention contains a cover case atop the housing.

Realizing accurate light-field displays usually requires advanced optical structures that use high-cost light sources and spatial modulators such as laser scanners, tunable lenses; liquid crystal on silicon (LCoS) reflectors or digital micro-mirror devices (DMDs). Accordingly, these existing methods do not provide true optical depth which means that there is inaccuracy in the wavefront in the form of diffraction color inaccuracy, speckle, or haze. A class of displays systems and methods revolves around the concept of field-evolving (FE) cavities. These cavities prepare the light in such a way that it provides true optical depth with no distortion to the wavefront, and, therefore, the images provided by such systems are as accurate as a normal display panel. This method uses conventional LCD or organic light-emitting diode (OLED) panel displays in a fashion that provides multiple optical focal planes simultaneously or sequentially in opaque or augmented (transparent) modality. The system can also be conveniently packaged in a small form factor well suited to desktop uses. Since the cavity feeds regular two-dimensional (2D) images and combines them optically into a 3D light-field, there is no need for complex rendering engines. The methods are also scalable to large-scale displays for commercial uses.

BRIEF DESCRIPTION OF THE DRAWINGS

The following description illustrates aspects of embodiments of the disclosed apparatuses, methods, and systems in more detail, by way of examples, which are intended to be non-limiting and illustrative with reference to the accompanying drawings, in which:

FIG. 1 illustrates a light-field display based on a three-layer field-evolving cavity, wherein a non-limiting example of the 3D model of a three-layer light-field display prototype is shown, wherein a front view is shown on the left, a back top view is shown in the middle, and a front side view is shown on the right.

FIGS. 3A, 3B, and 3C illustrate Class I FE cavities examples with first-order exit pupil, in which displays are arranged in one dimension or one axis (either vertical or horizontal), and the light for each layer bounces from each reflector only once, meaning there are no roundtrips or loops that light travels before exiting the cavity, wherein nonlimiting examples of different designs under Class I FE cavities category, ranging from simple to more complex with a greater number of layers, are shown.

FIG. 6 illustrates examples of FE cavities with actively translated (mechanically translated) components used to adjust or sweep the focal plane through a range of depths, wherein instances of FE cavities with mechanically translated components to actively adjust or sweep the focal plane through a range of depths are shown.

FIG. 7 illustrates instances of FE cavities that involve switchable mirror elements and switchable diffusers to change the focal depth of the exiting light, and wherein examples of display cavities using switchable mirrors (from Profiles 22, 23 in FIG. 6) and switchable diffusers (from Profile 24 in FIG. 6) to vary the display focal plane without gross mechanical motion are shown.

FIGS. 21A through 21H show embodiments of display systems using curved elements within a field-evolving cavity or curved display panels.

FIGS. 22A and 22B show tables of various types of motion of a display system within a vehicle.

DETAILED DESCRIPTION OF THE INVENTION

Figure 2:
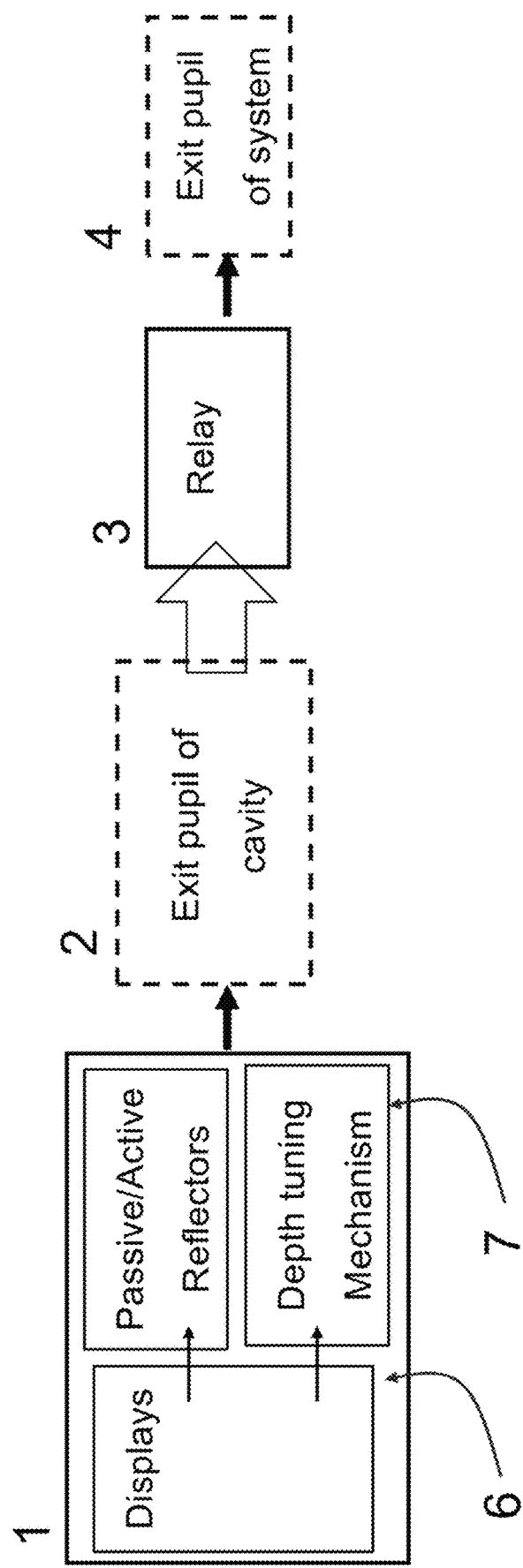
FIG. 2 illustrates a generalized block diagram of the cavity-based light-field systems in this disclosure, wherein a block diagram of a FE cavity-based light-field display system is shown, and wherein the cavity generates light of multiple focal planes and feeds it to a relay mechanism which then projects it to outside world.

All illustrations of the drawings are for the purpose of describing selected versions of the present invention and are not intended to limit the scope of the present invention.

In conventional binocular or stereographic vision, the display system provides two offset images separately to the left and right eye of the viewer. These two-dimensional images along with accommodation of the eye lenses are then combined in the brain of the viewer to give the perception of 3D depth in front of the viewer. If the true optical depth (curvature of the wavefront) does not match the parallax provided by the stereoscopic images, then the viewer experiences a bit of uncomfortable inaccuracy, since his/her eye lenses are telling the brain that the image is at a certain distance and that the parallax is telling the brain otherwise. This is known as accommodation-vergence mismatch. Light-field display systems change the wavefront in such a way as to provide both parallax and accommodation cues. Conventional methods of providing light-field displays have been limited by cost, accuracy of the image, bandwidth, the need for wearing headsets or glasses, bulkiness, and manufacturability.

To overcome this tradeoff between perceived content realism and manufacturability, the present invention uses a field-evolving cavity built around conventional LCD or OLED panel displays to produce digital content at one or more display focal depths which are then relayed to the outside world. This approach does not require tunable lenses, extensive computational rendering engines; it also does not necessarily rely on freeform optics, can be cost-efficiently manufactured, and provides the light-field experience for any number of users within the large viewing zone.

General Purpose

The present invention provides a multi-layer light-field experience in a mass producible way with image accuracy comparable to high-quality displays. The purpose of the present invention is the realization of a compact and practical transparent or opaque light-field display, which does not suffer from accommodation-vergence conflict and does provide true optical depth. Such a display has wide-ranging utility in a variety of contexts, further elaborated upon hereinafter. The light-field can be used as an entertainment display, for commercial applications, or industrial use cases such as in navigation or biomedical use cases. In near-head use cases, the present invention provides virtual depth or optical space which seems like a virtual window and can provide a sense of scale despite having a small pupil. For example, the present invention can magnify a 13-inch exit pupil sitting 10 inches from the head to appear as a 60-inch monitor sitting 3 meters away from the user.

In the preferred embodiment, the present invention comprises a system enclosure 5, a field-evolving cavity 1, and a relay mechanism 3, which are shown in FIG. 1 through FIG. 13. System enclosure 5 is used to house the other components of the present invention. Thus, the field-evolving cavity 1 and the relay mechanism 3 are mounted within system enclosure 5. The field-evolving cavity 1 is a compact body that is responsible for modifying the light-field displays. Moreover, the field-evolving cavity 1 comprises a cavity exit pupil 2, at least one display panel 6, and at least one optical-tuning mechanism 7. Display panel 6 generates the initial light-field display, which is modified by the optical-tuning mechanism 7, and the modified light-field display is then output by the cavity exit pupil 2. In addition, the display panel 6 and the optical-tuning mechanism 7 are configured into a specific optical arrangement, which allows for at least one light-field display 6 to be generated with at least one focal plane along at least one optical path. The optical path specifically traverses from display panel 6 to the cavity exit pupil 2. The relay mechanism 3 is used to transfer the modified light-field display from the cavity exit pupil 2 to an enclosure exit pupil 4 of the system enclosure 5, and, thus, the cavity exit pupil 2 is in optical communication with the enclosure exit pupil through the relay mechanism 3.

FIG. 1 illustrates field-evolving cavity 1 for a prototype model of the present invention. The cavity exit pupil 2 is also shown by a dotted line rectangular frame in FIG. 1. The relay mechanism 3 in this case is a simple mirror or switchable mirror and relays the cavity exit pupil 2 to the enclosure exit pupil 4. The enclosure exit pupil 4 also allows the light that exits this pupil to reach the user or users directly with no further manipulation. This enclosure exit pupil 4 is shown with a dashed line rectangular frame in FIG. 1.

Technical Description

Aspects of the disclosed apparatuses, methods, and systems describe various methods, systems, components, and techniques that enable the display of digital content at two or more focal planes and contribute to a significant reduction of the size and cost of the light-field display systems. The disclosed apparatuses, methods, and systems work by generating digital content at multiple depths within a field-evolving cavity 1 and relaying this content to the user's eyes, as illustrated in FIG. 2.

First, digital content is generated within a field-evolving cavity 1, at one or more depths. This may be done in a variety of ways, the details of which are described in the section titled, "Design of the field-evolving cavity." Then, a relay mechanism 3 is used to enable a user to view the digital content in different modalities, the details of which are described in the section titled, "Relay mechanisms and application modalities."

Additionally, the technology described herein may be used not only for larger-scale displays such as desktop monitors, television sets, and heads-up displays but also in a new modality of near-head displays. The details of this application extension are described in the section titled, "Relay mechanisms and application modalities." The thickness of the field-evolving cavity 1 may be reduced with the use of sequential relaying inside and outside of the field-evolving cavity 1, the details of which is explained in the section titled, "Compressed designs." Details of a nonlimiting example of a practical prototype are given in the section entitled, "Prototype model."

This disclosure has four major aspects or focuses: (1) the design of the field-evolving cavity 1 necessary to generate one or multiple focal planes from one or more display panels; (2) the methods of generating different tunable focal planes (i.e., light-fields with tunable planes) by varying or elaborating the cavity arrangement or using switchable mirrors or LCD layers; (3) elaboration on the means of relaying light from the cavity exit pupil 2 to the enclosure exit pupil 4; and (4) elaboration of compressed designs and near-head use cases.

Design of the Field-Evolving Cavity

In order to provide true optical depth for different layers of a light-field, there needs to be an optical mechanism that prepares or manipulates the curvatures of the wavefront of the light which is true to that depth or correct for that depth. The various embodiments of the field-evolving cavity 1, illustrated in FIGS. 3 through 13, are cavities or void spaces comprising at least one display panel 6 (based on Liquid Crystal Displays (LCD), Thin-film Transistor (TFT), Light Emitting Diode (LED), Organic Light Emitting Diode arrays (OLED), Active Matrix Organic Light Emitting Diode (AMOLED), projection on flat screen or any other display technology) and/or at least one mirror 8 and/or at least one half mirror 9 and/or a plurality of switchable mirrors 13 or at least one liquid crystal cell layer 16 arranged and assembled in such a way as to exit bundles of light with divergence apexes at different depths from the cavity exit pupil 2. These apexes can be from different displays at different depths inside the field-evolving cavity 1 or from a single display panel 6 along the entirety of the field-evolving cavity 1. The cavity exit pupil 2 delivers light into a relay mechanism 3, resulting in a different or the same reference apex (depending on the type of relay) of divergence for different focal planes being presented to the user. The relaying mechanism 3 can be a simple flat surface, or a free form curved surface as further discussed herein, or it can be a geometrical or diffractive waveguide, or any other suitable relay means. The relay mechanism 3 can be semi-transparent, opaque, or tunable in transparency (e.g., a switchable mirror).

Since theoretically, there is an infinite number of these types of field-evolving cavities, determining a class of the field-evolving cavity 1 is based on the dimensionality of display arrangement. If all of the display panels 6 are along a single axis (e.g., the y axis), then the field-evolving cavity 1 is defined as Class I. More specifically, display panel 6 is positioned along the single axis, and the single axis is positioned either perpendicular or parallel to the cavity exit pupil 2. Alternatively, if all of the display panels 6 are arranged in both x and y dimensions, then the field-evolving cavity 1 is Class II. More specifically, a plurality of display panels 6 is positioned along a pair of axes, and the pair of axes is positioned perpendicular to each other, while each of the pair of axes being positioned either perpendicular or parallel to the cavity exit pupil 2. Furthermore, the order of the cavity exit pupil 2 is the maximum number of times that the light bundle from any pixel of the display panel 6 is reflected before it exits the cavity exit pupil 2. Any field-evolving cavity 1 that has at least one display panel 6 arranged at an angle that is not a multiple of 90 degrees in x and y is still considered as a Class II cavity but are referred to as Class II wedge cavities or angled cavities. More specifically, display panel 6 is positioned along an alignment axis, and the alignment axis is positioned at an angle to the cavity exit pupil 2.

The following descriptions and drawings in FIGS. 3 through 13 provide non-limiting examples of Class I field-evolving cavities, which can be used to generate digital content at multiple focal depths using a single display panel 6 or multiple display panels 6 in parallel arrangements. In all of these configurations, the display panel 6 can use a variety of display technologies such as OLED, LCD, LED, AMOLED, or any display technologies or projection screen that provides a 2D image. In non-limiting examples of these conceptions, the display panel 6 can be replaced with an LCoS (Liquid crystal on silicon) spatial light modulator illuminated by a sequential RGB light, or DMD (Digital Mirror Device) spatial light modulator illuminated by a display. Therefore, in this disclosure, a "display panel" refers to any architecture that provides an array of light that can be focused or collimated to create an image.

In all non-limiting examples and configurations given in FIGS. 3 through 9, the reflectors can be polarization-dependent reflectors, semi-transparent reflectors, thin layer pellicle reflectors, beam splitter cubes, or other suitable reflectors. In all these configurations, the light from different portions of display panels 6 or from different panels 6 can be polarized in such a way to increase the output light efficiency of the light-evolving cavity 1. More specific examples are given in the figures throughout this disclosure.

Figure 3A:
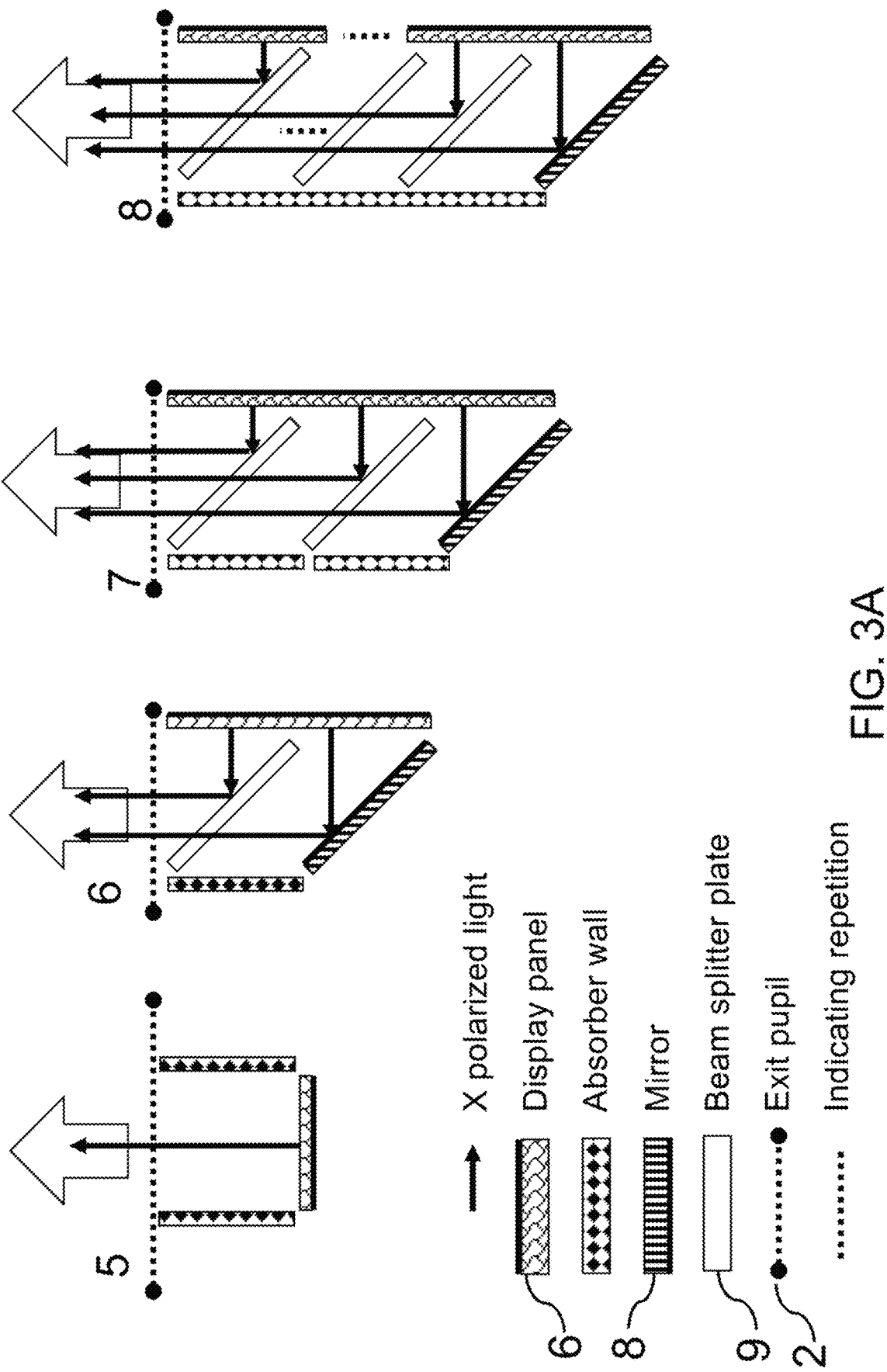
Figure 3C:
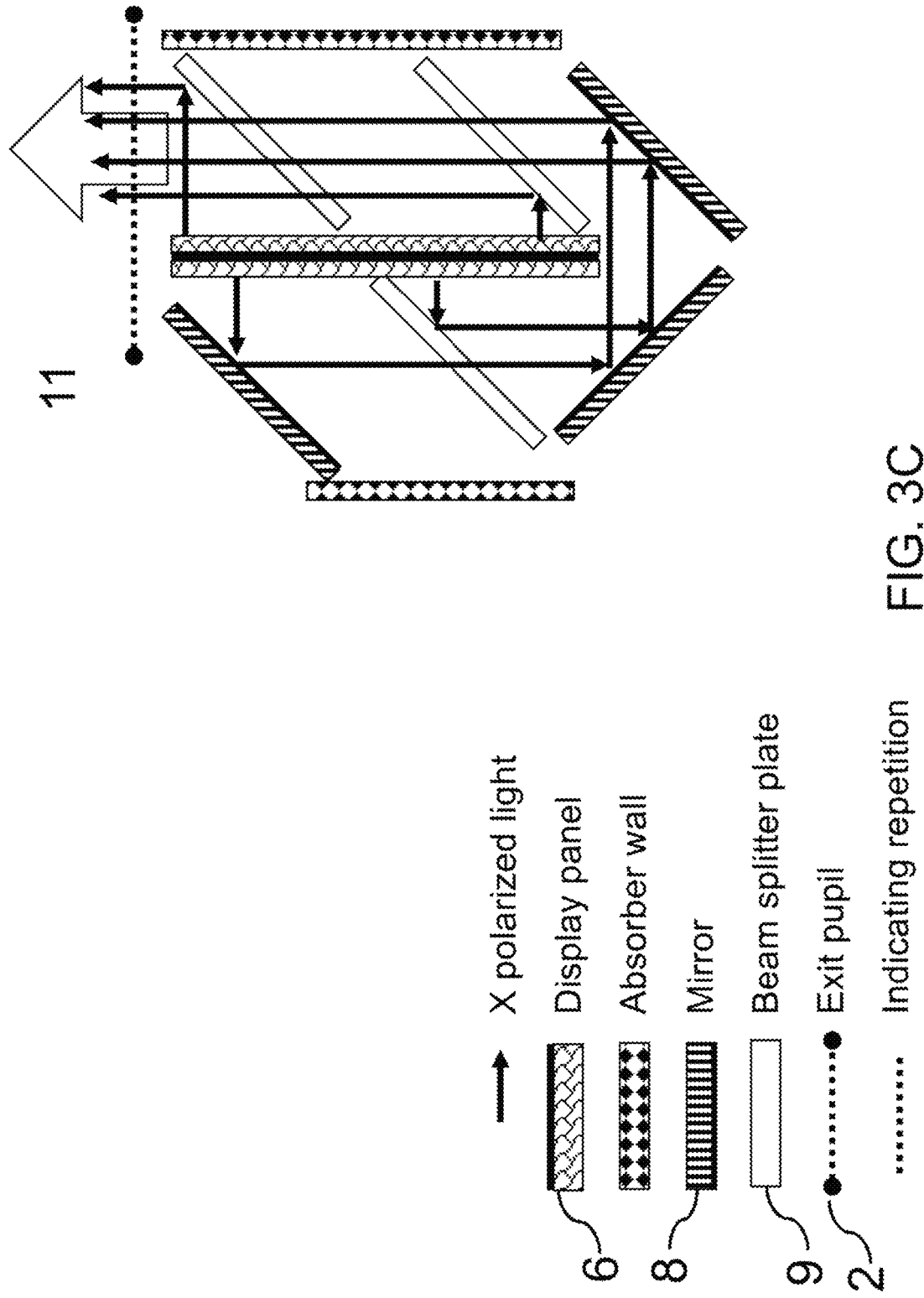

FIGS. 3A, 3B, and 3C illustrate some non-limiting instances of designs for Class I of field-evolving cavities 1. In general, the optical-tuning mechanism 7 may comprise at least one mirror 8 and at least one beam splitter plate 9. As can be seen from sections in FIG. 3, the specific cavity arrangement may be configured to reflect the optical path with the mirror 8, and the specific cavity arrangement may be further configured to reflect the optical path with the beam splitter plate 9, to pass the optical path through the beam splitter plate 9, or combinations thereof.

Section 5 of FIG. 3A illustrates an embodiment of a Class I of a field-evolving cavity 1 with a single display panel 6 at the bottom which produces only a single depth (included for theoretical support). The light directly travels out of the cavity exit pupil 2 without bouncing off any reflector or other optical surface(s). This is a cavity exit pupil 2 with zero order. The orange arrow shows the light bundle exiting the dashed line which is the cavity exit pupil 6 in all the figures in this disclosure. In all the figures, only the light that makes it out of the light-evolving cavity 1 is shown with red or blue arrows. The light that is wasted is not indicated in these drawings for simplicity. Also, for any beam splitter plate 9, the percentage of reflectivity can be chosen in such a way to maximize the brightness uniformity of all layers. This does not change the architecture of the design, and, thus, the reflectivity percentage is not specified through this disclosure. The reflectivity percentage can be assumed 50% for all the designs for simplicity.

Section 6 in FIG. 3A illustrates an embodiment of a Class I field-evolving cavity 1 comprising a single display panel 6 on the right wall which produces digital content simultaneously at two different depths. By incorporating a beam splitter plate 9 (half-mirror sheet) and a mirror 8 to combine and redirect light out of the cavity exit pupil 2. The light from the upper portion of display panel 6 reflects off mirror 8, passes through a beam splitter plate 9 and half of its intensity is output through the cavity exit pupil 2. The light from the lower portion of display panel 6 reflects off the beam splitter plate 9, and half of its intensity is directed toward the cavity exit pupil 2. Therefore, this is a Class I of a field-evolving cavity 1 with a first order, and the intensity of each focal plane is half of the original intensity of the display panel 6. In some examples of this type of field-evolving cavity 1, one or more of the reflectors might be shifted up or down to change the desired depth that is output to the cavity exit pupil 2.

Section 7 in FIG. 3A illustrates an extension of Section 6 in FIG. 3A, in which a single display panel 6 is used to generate digital content simultaneously at three different depths. In some embodiments, the optical efficiency of the field-evolving cavity 1 may be different for different depths, and, therefore, the brightness of the display panel 6 could be adjusted to accommodate this variation. For example, if the beam splitter plates 9 have 50% reflection and 50% transmission, the light from the topmost part of the display panel 6 passes through two beam splitter plates 9, and, thus, its intensity is reduced to 25% of the intensity of the display panel 6; the light from the middle section passes through two beam splitter plates 9 and also has 25% of the intensity for the display panel 6, but the light from the lowermost section only passes through one beam splitter plate 9, and, therefore, the intensity is 50% of the intensity of the display panel 6. To compensate for this variation in intensity across focal depths, the brightness on the lowermost part could be reduced by 50% electronically through the signal that is given to the display panel 6. Such brightness adjustments can be applied to the various configurations in FIGS. 3 through 13 to provide uniform brightness for different layers of the light field.

Section 8 in FIG. 3A illustrates the ultimate extension of Section 6 in FIG. 3A, in which a single display panel 6 is used to generate digital content at an arbitrary number of depths.

Section 9 in FIG. 3B illustrates an extension of Section 6 in FIG. 3A in which two field-evolving cavities 1 (each producing content at two depths) are combined to generate digital content simultaneously at four different depths.

Section 10 in FIG. 3B illustrates an extension of Sections 8 and 9 in FIGS. 3A and 3B, in which multiple cavities 1 illustrated in Section 8 in FIG. 3A are combined as illustrated in Section 9 in FIG. 3B to generate digital content simultaneously at a plurality of depths.

Section 11 in FIG. 3C illustrates an extension of Section 9 in FIG. 3, in which two display panels 6 are positioned back-to-back to provide a more compact form factor.

Figure 4:
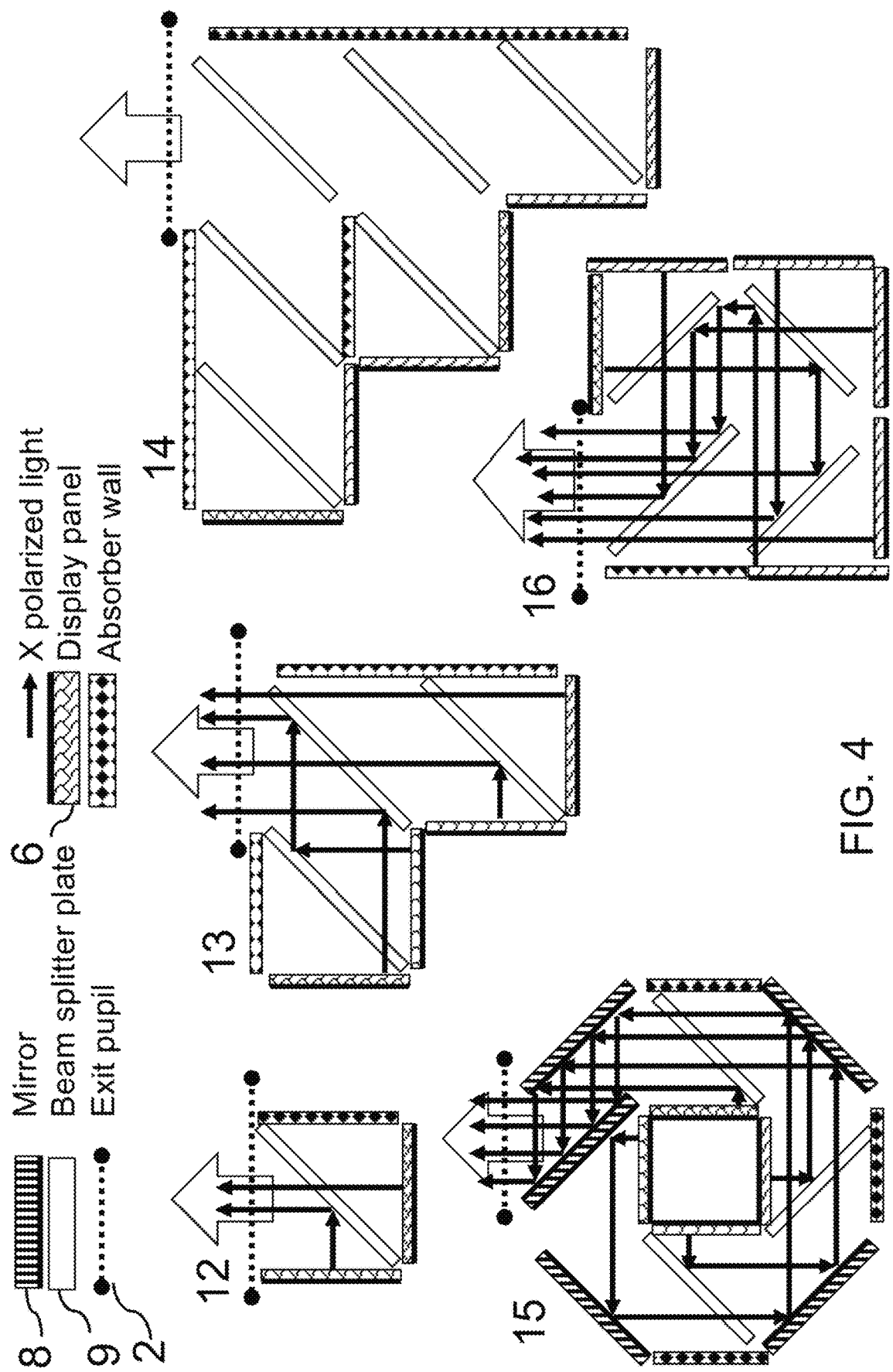
FIG. 4 illustrates instances of Class II FE cavities with first-order exit pupil, such that Class II displays can be arranged in two dimensions (both horizontal and vertical) to make up the cavity, wherein the term "first order" refers to the fact the light bounces from each mirror or reflector no more than once, and wherein more complex Class II FE cavity examples showing how multiple displays can be incorporated along two axes to avoid losing spatial resolution incurred when splitting a display in Class I cavities are shown, and wherein the orange arrow is the light bundle exiting the pupil of the cavity.

FIG. 4 shows non-limiting examples of designs for Class II field-evolving cavities 1 with the cavity exit pupil 2.

Section 12 in FIG. 4 illustrates an embodiment of a simple Class II field-evolving cavity 1 comprising two display panels 6 that are positioned perpendicularly to each other and that are combined with a single beam splitter plate 9. It has the benefit that the two display panels 6 can generate digital content simultaneously at two similar depths. By adjusting the position of one display panel 6, the depth separation between the two focal planes can be easily adjusted.

Section 13 in FIG. 4 illustrates an embodiment of a simple Class II of a field-evolving cavity 1 comprising four display panels 6 that are combined to generate digital content simultaneously at four different depths.

Section 14 in FIG. 4 illustrates the ultimate extension of Section 13 in FIG. 4, which generates digital content simultaneously at a plurality of different depths.

Section 15 in FIG. 4 illustrates an embodiment of a simple Class II field-evolving cavity 1 comprising four display panels 6 at the center that are combined to generate digital content simultaneously at four different depths.

Section 16 in FIG. 4 illustrates an embodiment of a simple Class II field-evolving cavity 1 comprising six display panels 6 that are combined to generate digital content simultaneously at six different depths.

Figure 5:
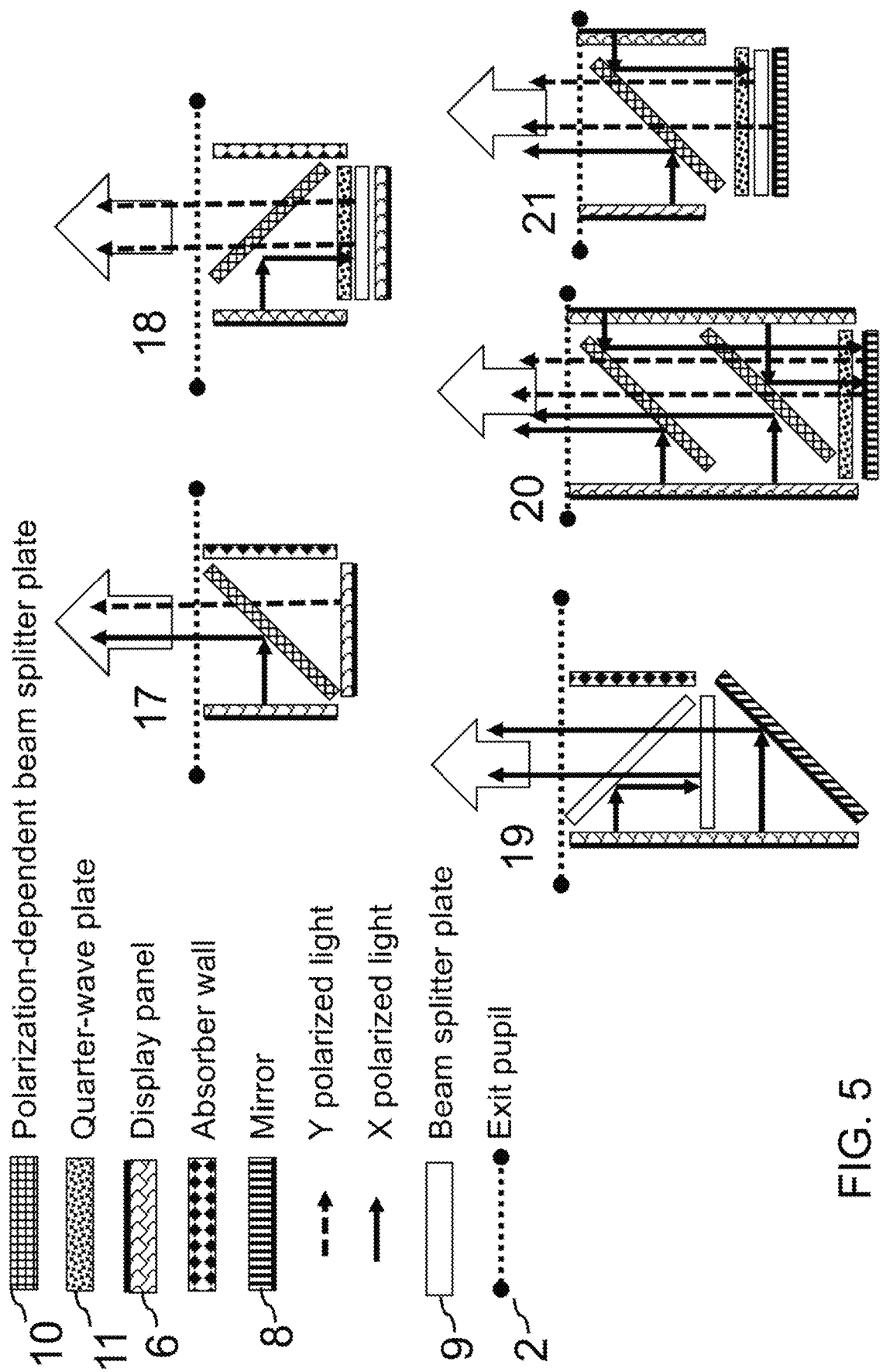
FIG. 5 illustrates instances of Class I and Class II FE cavities with first-order and second-order exit pupils designed to reduce the optical path difference to each focal plane and minimize light loss are shown; "second order" means that the light may bounce from a reflector up to two times, wherein examples of FE cavities with higher order exit pupil that are designed to reduce the optical path difference to each focal plane and minimize light loss by using polarization are shown.

FIG. 5 shows examples of Class I field-evolving cavities 1 and Class II field-evolving cavities 1 with higher-order exit pupils 2. These non-limiting examples show how polarization and multiple reflections from the same surfaces can create more compact cavities with a larger number of output focal planes. In general, the optical-tuning mechanism 7 may further comprise at least one polarization-dependent beam splitter plate 10 and at least one quarter waveplate 11. As can be seen from the sections in FIG. 5 the specific cavity arrangement may be configured to reflect the optical path in a first polarization with the polarization-dependent beam splitter plate 10, to pass the optical path in a second polarization through the polarization-dependent beam splitter plate 10, or combinations thereof, wherein the first polarization is the optical opposite of the second polarization. The specific cavity arrangement may further be configured to switch the optical path from a first linear polarization to a second linear polarization with a combination of the quarter waveplate 11 and the mirror 8, wherein the first linear polarization is perpendicular to the second linear polarization.

Section 17 in FIG. 5 illustrates an embodiment of a Class II field-evolving cavity 1 comprising two polarized display panels 6 that are combined with a polarization-dependent beam splitter plate 10. The polarization-dependent beam splitter (PDBS) plate 10 is a beam splitter plate or a reflector sheet that reflects one polarization fully and fully transmits the other perpendicular polarization. It has the benefit that the two display panels 6 can generate digital content simultaneously at two similar depths. By adjusting the position of one display panel 6, the depth separation between the two focal planes can be easily adjusted. It also has the benefit that light loss is minimized by leveraging the polarization of the display panels 6 in conjunction with the PDBS plate 10.

Section 18 in FIG. 5 illustrates an embodiment of a Class II field-evolving cavity 1 with second order that uses a PDBS plate 10 and waveplate 11 to efficiently generate two different focal planes (image depths). In this embodiment, the light from vertical display panel 6 has a horizontal polarization and hits a PDBS plate 10 that only reflects light with horizontal polarization. Therefore, this light (shown schematically by red arrows) moves upward and passes through a quarter waveplate 11 (shown in purple). This quarter waveplate 11 changes the horizontal polarization to clockwise circular polarization, and then it hits a half mirror on top of the horizontal display (shown in blue), which will then reflect it back with counterclockwise polarization. Quarter waveplate 11 converts that counterclockwise circular polarization to vertical linear polarization (shown schematically with red arrows). This light passes through the PBDS plate 10 and leaves through the cavity exit pupil 2. Light from the horizontal display panel 6 has counterclockwise polarization, and by passing through the quarter waveplate 11, the light is converted to vertical polarization which then passes through the PBDS plate 10. This process of using a quarter waveplate 11 alongside a reflective surface 8 can be used extensively in many other configurations for field-evolving cavities 1 as shown in FIGS. 5 through 10. The functionality is identical to the one described for this configuration: the waveplate 11 together with the reflective surface 8 reflects and rotates the polarization by 90 degrees. Therefore, if light with a horizontal polarization goes through those layers, the light reflects back with vertical polarization and vice versa. If a vertically polarized light reflects from this structure, the light will be reflected with horizontal polarization.

Section 19 in FIG. 5 illustrates an embodiment of a Class II field-evolving cavity 1 with second order comprising a single display panel 6 that is combined with a series of beam splitter plates 9 and a mirror 8. It has the benefit that a single display panel 6 can be used to generate digital content simultaneously at two similar depths. By adjusting the position of the central beam splitter plate 9, the depth separation between the two focal planes can be adjusted.

This embodiment is a Class I field-evolving cavity 1 since there are display panels 6 only in one dimension, and this embodiment has the cavity exit pupil 2 at second order since the light from the lower part of the display panel 6, reflects once from the lower beam splitter plate 9, and then again by the horizontal half-mirror (it will also pass through the lower beam splitter plate 9 before exiting). Higher order field-evolving cavities 1 can provide more flexibility in terms of design and form factor, but they tend to be less light efficient.

Section 20 in FIG. 5 illustrates an embodiment of a Class II field-evolving cavity 1 with second order comprising two display panels 6, combined with a series of PDBS plates 10. The light from left display panel 6 is x-polarized, which is reflected from the reflectors 8 to the cavity exit pupil 2. The light from right display panel 6 is x-polarized, which is reflected downward and goes through the waveplate 11, hits the bottom mirror 8, and goes through the waveplate 11 again, which will shift its polarization to y-polarization, which would then pass through the PDBS plates 10.

Section 21 in FIG. 5 illustrates an embodiment of a Class II field-evolving cavity 1 with second order that is configured such that the light from the right display panel 6 is x-polarized, so the light reflects from the PDBS plates 10. The light from bottom display panel 6 has a polarization rotated through the waveplate 11 and passes through the diagonal PDBS plate 10 to the cavity exit pupil 2. The light from the right-side display panel 6 is reflected downward by the PDBS plate 10, goes through polarization rotation through waveplate 11, is half-reflected by the beam splitter plate 9 at the bottom, and then passes through the diagonal PDBS plate 10 to the cavity exit pupil 2.

In reference to FIG. 6, the optical-tuning mechanism 7 may further comprise at least one mechanical actuator 12. As can be seen in the sections from FIG. 6, the specific cavity arrangement may be configured to translationally move the display panel 6 with a mechanical actuator 12, and/or the specific cavity arrangement may be configured to translationally move the combination of the waveplate 11 and the mirror 8 with another mechanical actuator 12.

Section 22 in FIG. 6 illustrates an embodiment of a Class I field-evolving cavity 1 comprising a single display panel 6 which is swept through a plurality of physical positions to generate digital content at a plurality of depths. Such a field-evolving cavity 1 can either be used as part of an accommodation display panel 6, where the position of the display panel 6 is adjusted to correspond to the user's vergence depth, it can be continuously swept while continuously updating the digital content displayed (to produce a light-field), or if the digital content is at a known depth, it can simply be set to match the perceived depth of the digital content. This mechanical movement can be combined with a curved relay to increase the optical range of variations in depth. This is usually necessary since mechanical translation with a large range is usually not practical. A variety of solutions can be considered for these mechanical translations such as mechanical stages, piezoelectric translators, or voice coils.

Section 23 in FIG. 6 illustrates an embodiment of a field-evolving cavity 1 combining the embodiment shown in Section 22 in FIG. 6 and the embodiment shown in Section 17 in FIG. 5, which simultaneously generates digital content at two different depths, one of which is dynamically adjustable.

Section 24 in FIG. 6 illustrates an extension of Section 23 in FIG. 6, which includes a movable mirror 8 to enable a more rapid translation of the dynamically adjustable focal plane. It simultaneously generates digital content at two different depths, one of which is dynamically adjustable. Faster transitions can be achieved by using higher order field-evolving cavities 1; however, in general, the speed of depth translation will be slow if mechanical motion is used. The speed of translation is typically directly a function of order. An example of Section 24 in FIG. 6 is the speed of tunability or translation that doubled since the light hits the right mirror 8 and therefore goes back a delta variation in the position of the mirror 8, or the display panel 6 is doubled through the roundtrip of the light. Simultaneous transition of the right display panel 6 and the left mirror 8 can quadruple the speed and range of depth variation in this example.

In reference to FIG. 7, the optical-tuning mechanism 7 may further comprise a plurality of switchable mirrors 13 that are in serial optical communication with each other and are positioned offset from each other. As can be seen from the sections in FIG. 7, the specific cavity arrangement may be configured to selectively alternate between reflecting the optical path with at least one specified mirror from the plurality of switchable mirrors 13 and passing the optical path through the specified mirror.

Section 25 in FIG. 7 illustrates an embodiment of a field-evolving cavity 1, which utilizes a polarized display panel 6 and a stack of polarization-dependent switchable liquid crystal mirrors 13 to produce digital content at a plurality of depths, each of which is determined by the switchable mirror 13 that is activated (the one which reflects the light). There are many technologies that provide functionality for a switchable mirror 13, and a non-limiting example of a switchable mirror 13 is a liquid crystal cell (LCC) placed on top of a polarization-dependent reflector. If the incident light has the same polarization as the polarization axis of the reflective surface, the light will reflect from the switchable mirror 13. If the LCC is turned on so that the LCC makes the incident light cross polarized with the reflective polarizer, the light passes through, and the mirror is rendered transparent. There are other technologies for switchable mirrors 13 that use photorefractive or other electro-optical materials.

Section 26 in FIG. 7 illustrates a variant of Section 25 in FIG. 7, which utilizes a folded structure to double the depth separation imparted upon the output focal plane in comparison to the physical separation of the switchable mirrors 13. The depth that exits the cavity exit pupil 2 is defined by which switchable mirror 13 is turned on to reflect the light. These switchable mirrors 13 can be switched on and off with speeds comparable to the switching speed of liquid crystal material (tens of nanoseconds). In this architecture, each frame can be reflected from a different depth out of the field-evolving cavity 1 and therefore different layers in the light field can be scanned electronically and sequentially. Sequential scanning of the layers by turning on one of the switchable mirrors 13 at a time is not necessarily the most efficient way to scan the entire depth of light-field and one may use computational approaches to turn on and off switchable mirrors 13 inside the field-evolving cavity 1 in such a way as to increase overall light efficiency or brightness of the used depth. For example, if there is content only at the closest depth, there is no need to allocate more empty frames to another deeper depth. In other words, the signal to feed the display panel 6 and the switchable mirrors 13 can be processed in such a way as to maximize the frame rate and brightness dynamically at active depths.

Section 27 in FIG. 7 illustrates an embodiment of a field-evolving cavity 1, which uses a microlens array to collimate a display panel 6 and to project digital content onto a stack of switchable diffusers. This embodiment produces digital content at a plurality of depths, each of which is determined by which diffuser is set to be diffusive. In addition, if the switchable diffusers are driven in such a way that a spatially varying diffusion is achieved, it is possible to produce a diffusive surface which is non-planar, thereby creating an output focal plane which is non-planar. The spatially varying depth of this output focal plane can then be dynamically adjusted to match the spatially varying depths of the digital content being displayed. There are many technologies available for switchable diffusers; most of these technologies depend on polymer stabilized cholesteric texture (PSCT) light shutter technology. Another way to realize Section 27 in FIG. 7 is to use polarization-dependent diffusers, which scatter light at one polarization and transmit the light at the other perpendicular polarizations. This will require a layer of liquid crystal on top of the lenslet to rotate polarization, which would correspond to different diffusers diffusing the light at different depths. Although this is theoretically viable, such arrangement would most likely produce haze artifact for deeper layers.

Figure 8:
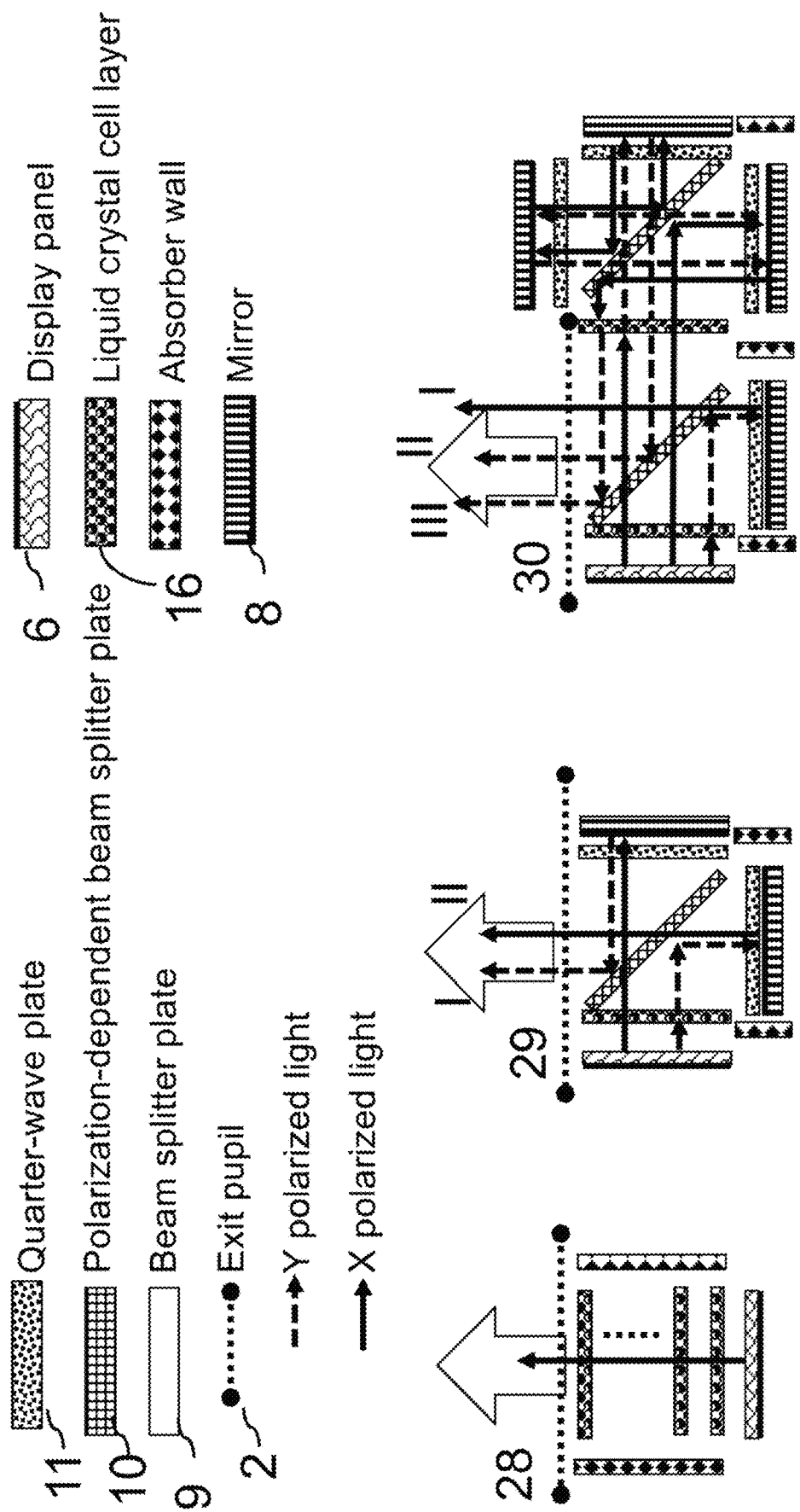
FIG. 8 illustrates examples of using switchable liquid crystal layers to switch the path that light takes inside different sections of the FE cavity, wherein instances of FE cavities using switchable liquid crystal layers to vary the display focal plane without any mechanical motion are shown.

In reference to FIG. 8, the optical-tuning mechanism 7 comprises at least one liquid crystal cell layer 16. As can be seen from the sections in FIG. 8, the specific cavity arrangement may be configured to switch the optical path from a first linear polarization to a second linear polarization with a liquid crystal cell layer 16, to tune a refractive index of the optical path with the liquid crystal cell layer 16, or a combination thereof, wherein the first linear polarization is perpendicular to the second linear polarization.

Section 28 in FIG. 8 illustrates an extension of Section 25 in FIG. 7, which generates different depths by virtue of the birefringence of transmissive liquid crystal cell layers 16 that are positioned on top of display panel 6. As more or fewer of the stack of liquid crystal cell layers 16 is activated, the apparent refractive index between display panel 6 and the cavity exit pupil 2 can be dynamically tuned. As such, this extension can generate digital content at a plurality of different depths. The amount of required variation in refractive index depends upon the design of the optical relay mechanism 3 that couples to the cavity exit pupil 2. If the optical relay mechanism 3 magnifies perceived depth, small variations in the optical path can result in large shifts in the focal plane depth that are perceived by the user.

Section 29 in FIG. 8 illustrates an alternative to Section 28 in FIG. 8, which can provide significantly larger depth steps and thereby a larger depth variation range for the focal plane compared to Section 25 in FIG. 7. It is an embodiment of a Class I field-evolving cavity 1 with a single polarized display panel 6, light from which passes through a liquid crystal cell layer 16 capable of rotating incident polarization. Because of the construction of the rest of the field-evolving cavity 1 (with a polarization-dependent beam splitter plate 10 and quarter waveplates 11/mirrors 8 as illustrated in FIG. 8), it is possible to use the liquid crystal cell (LCC) layer 16 to switch between two output depths. In some embodiments, the LCC layer 16 does not have a 2D matrix on it and is essentially a LCC layer 16 that rotates the polarization by 90 degrees once biased. As such, it can generate digital content at two different planes, the selection of which is determined by the state of the liquid crystal cell layer 16 (and the cavity's physical construction). In the illustrated embodiment, display panel 6 produces horizontally polarized light (blue arrows). If the LCC layer 16 is off, the light passes through the LCC layer 16 with the same polarization, then passes through the polarization-dependent beam splitter plate 10, then hits the quarter waveplate 11 and reflector 8, then reflects with vertical polarization, then hits the beam splitter plate 9, and exits the cavity exit pupil 2 (Beam I). If the LCC layer 16 is on (biased with electricity), then the polarization rotates 90 degrees and becomes vertical, reflects from the beam splitter plate 9, goes upward, reflects off the quarter waveplate 11/mirror structure 8 resulting in horizontal polarization, and passes through the polarization-dependent beam splitter plate 10 (Beam II).

Section 30 in FIG. 8 illustrates an extension of Section 28 in FIG. 8, which allows for one display panel 6 to generate digital content at three different depth planes, the selection of which is determined by the state of two liquid crystal cell layers 16 (and the physical construction of the field-evolving cavity 1). In addition, it can provide significantly larger depth steps and thereby a larger depth variation range for the focal plane compared to Section 25 in FIG. 7. Each liquid crystal cell layer 16 acts like a 2D optical valve that preserves the angular information and defines which path the light is going to take depending on the state of its polarization. Based on the state of the LCC layers 16, the three depths of I, II, and III can be generated. For example, considering that display panel 6 has horizontal polarization, in this design, depth I is generated when LCC1 is on (LCC2 is not used for depth I). Depth II is generated when LCC1 is off and LCC2 is off. Depth III is generated when LCC1 is off and LCC2 is on. Theoretically, this design can be extended to an infinite number of field-evolving cavities; however, each time another field-evolving cavity is added, some portion of the light will be lost, and the efficiency will be reduced.

Figure 9:
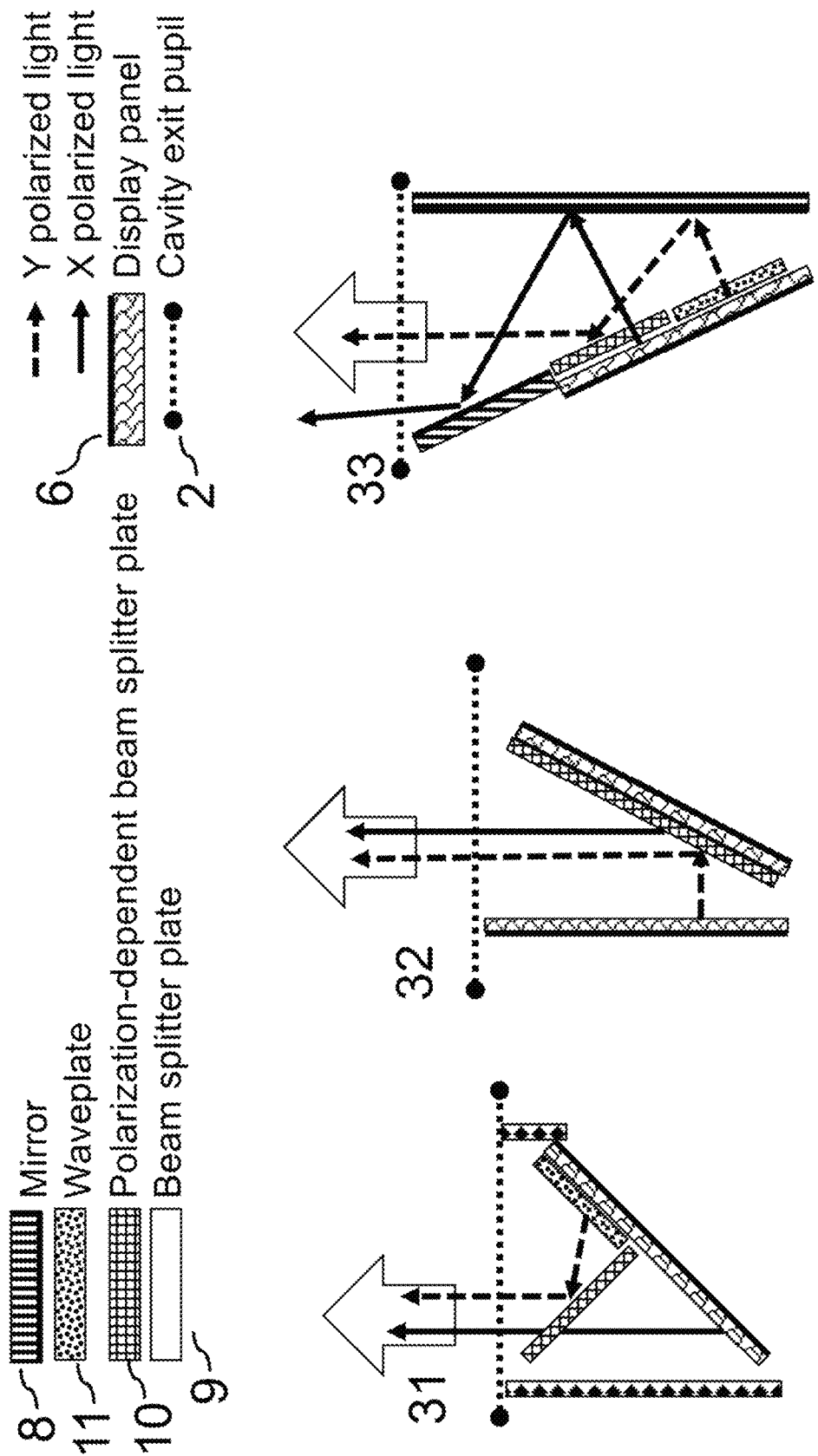
FIG. 9 illustrates examples of wedge type (or angled) FE cavities used to produce multiple focal planes, wherein in such cavities the display plane normal vectors may make angles other than multiples of 90 degrees with regards to each other, and wherein examples of compact Class I and II wedge cavities used to produce multiple focal planes in smaller form factors are shown.

Section 31 of FIG. 9 illustrates a compact wedge cavity extension of Section 12 of FIG. 4, which uses a single display 6 instead of two display panels 6 to generate digital content simultaneously at two similar depths. By adjusting the position of the single polarization-dependent beam splitter plate 10, the depth separation between the two focal planes can be easily adjusted. It also has the benefit that light loss is minimized by leveraging the polarization of the display panel 6 in conjunction with the polarization-dependent beam splitter plate 10 and a waveplate 11.

Section 32 of FIG. 9 illustrates a compact Class II variation of Section 12 of FIG. 4, which uses two polarized display panels 6 and a polarization-dependent beam splitter plate 10 to generate digital content simultaneously at two similar depths. By adjusting the position of the display panels 6, the depth separation between the two focal planes can be easily adjusted.

Section 33 of FIG. 9 illustrates a compact Class I wedge for a field-evolving cavity, which uses a polarized display panel 6 to generate digital content simultaneously at two depths. The angle may cause the light to exit the cavity exit pupil 2 at a desired angle.

Depth and Brightness Enhancement Mechanisms

The depth of each layer in the light field can be tuned by using glass or other high refractive index materials within field-evolving cavity 1 or at the cavity exit pupil 2. Additionally, the brightness of the layers can be enhanced by using prismatic films on the display. The display panels 6 in the field-evolving cavity 1 usually have a Gaussian wide-angle profile with peak intensity at the center; this is not always beneficial in a cavity-based light-field where the reflection from a display panel 6 might be at an oblique angle. Placing prismatic films on display panel 6 can help to tilt the peak intensity of the gaussian profile to a certain desired angle to get brighter output for that layer of the screen. The reason that high refractive index glass windows reduce the depth is that it refracts the light into a smaller cone than the original cone of the light, and, therefore, the perceived depth appears to be slightly smaller, or less deep.

Figure 10:
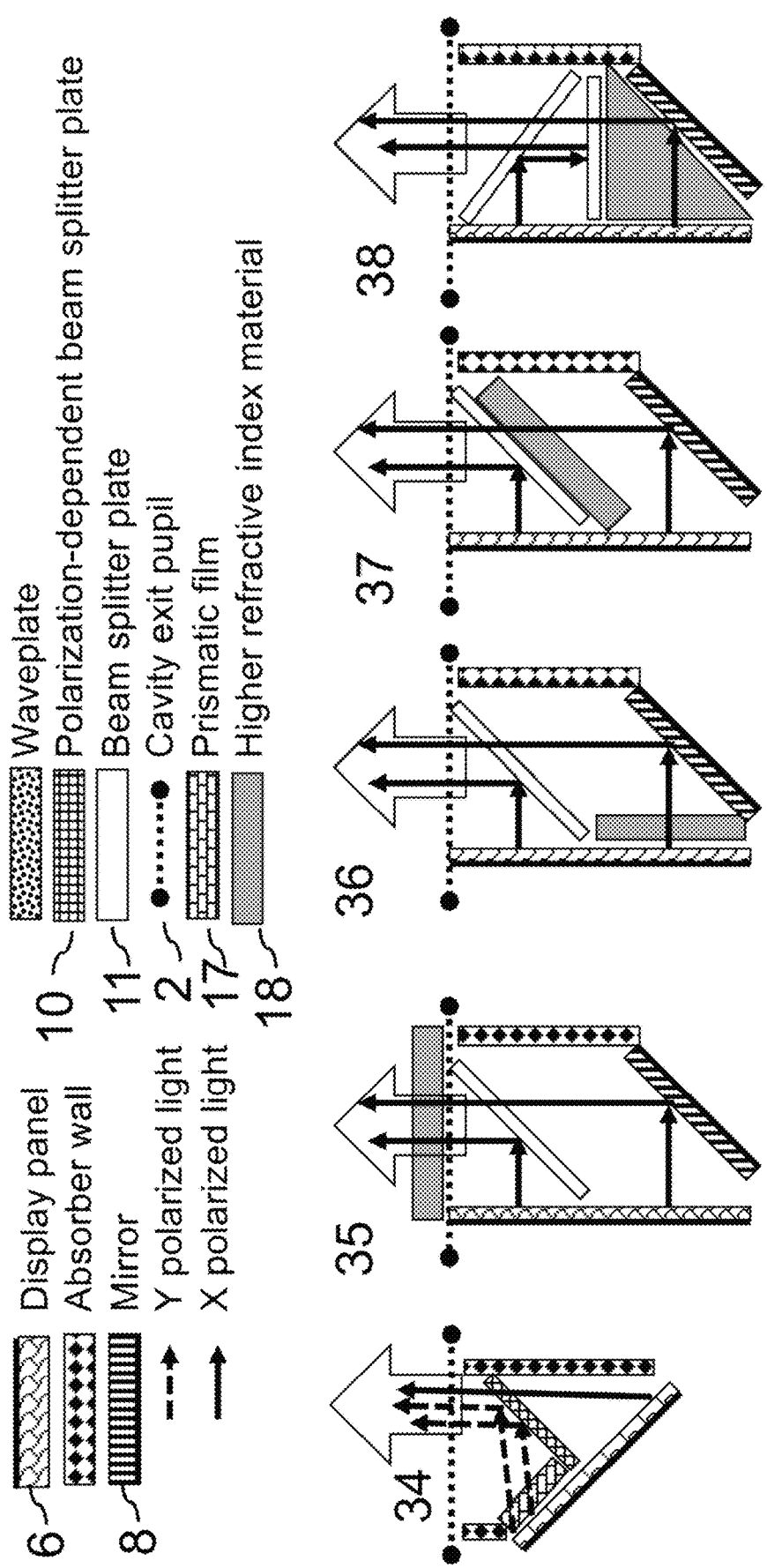
FIG. 10 illustrates instances in which one or all of the depth is shifted using higher refractive index slabs or prisms, wherein it also shows how prismatic film can improve the brightness of a focal plane, and wherein examples of passively tuning or enhancing the depth and brightness of focal planes using material with different refractive index within the cavity volume or prismatic films are shown.

In reference to FIG. 10, the optical-tuning mechanism 7 may further comprise at least one prismatic film 17 and at least one piece of higher refractive index material 18. As can be seen from the sections from FIG. 10, the specific cavity arrangement may be configured to enhance a brightness of the optical path with the prismatic film 17, and/or the specific cavity arrangement may be configured to lower a depth of the focal plane along the optical path with the piece of higher index material 18.

Section 34 of FIG. 10 illustrates an example case where a prismatic film 17 can increase the brightness by tilting the peak of the gaussian profile of the intensity toward the reflector. Prismatic films 17 always help if the cavity exit pupil 2 looks at the display panel 6 in any angle other than 90 degrees angle.

Section 35 of FIG. 10 illustrates an example of Class I field-evolving cavity 1 with a first order of the cavity exit pupil 2, where both of the depths are perceived to be slightly less deep inside the field-evolving cavity 1 due to high refractive index 18 at the cavity exit pupil 2.

Section 36 of FIG. 10 illustrates is an example of Class I field-evolving cavity 1 with a first order of the cavity exit pupil 2, where deeper focal plane has become slightly less deep to the cavity exit pupil 2 due to high refractive index 18 on the display panel 6.

Section 37 of FIG. 10 illustrates is an example of Class I field-evolving cavity 1 with a first order of the cavity exit pupil 2, where deeper focal plane has become slightly less deep to the cavity exit pupil 2 due to high refractive index 18 on the back of the reflector 8 for the closer depth.

Section 38 of FIG. 10 illustrates is an example of Class I field-evolving cavity 1 with a first order of the cavity exit pupil 2, where deeper focal plane have become notably less deep to the cavity exit pupil 2 due to high refractive index 18 on the entire lower section of the field-evolving cavity 1. In essence, the bottom reflector 8 is replaced with a high refractive index prism 18.

Relay Mechanisms and Application Modalities

As mentioned previously, the cavity exit pupil 2 delivers light into a relay mechanism 3, resulting in different reference apexes of divergence for different focal planes being presented to the user. The relay mechanism 3 can be an off-axis visor, a geometrical or diffractive waveguide, a birdbath design beam splitter, or any other suitable relay means.

Figure 11:
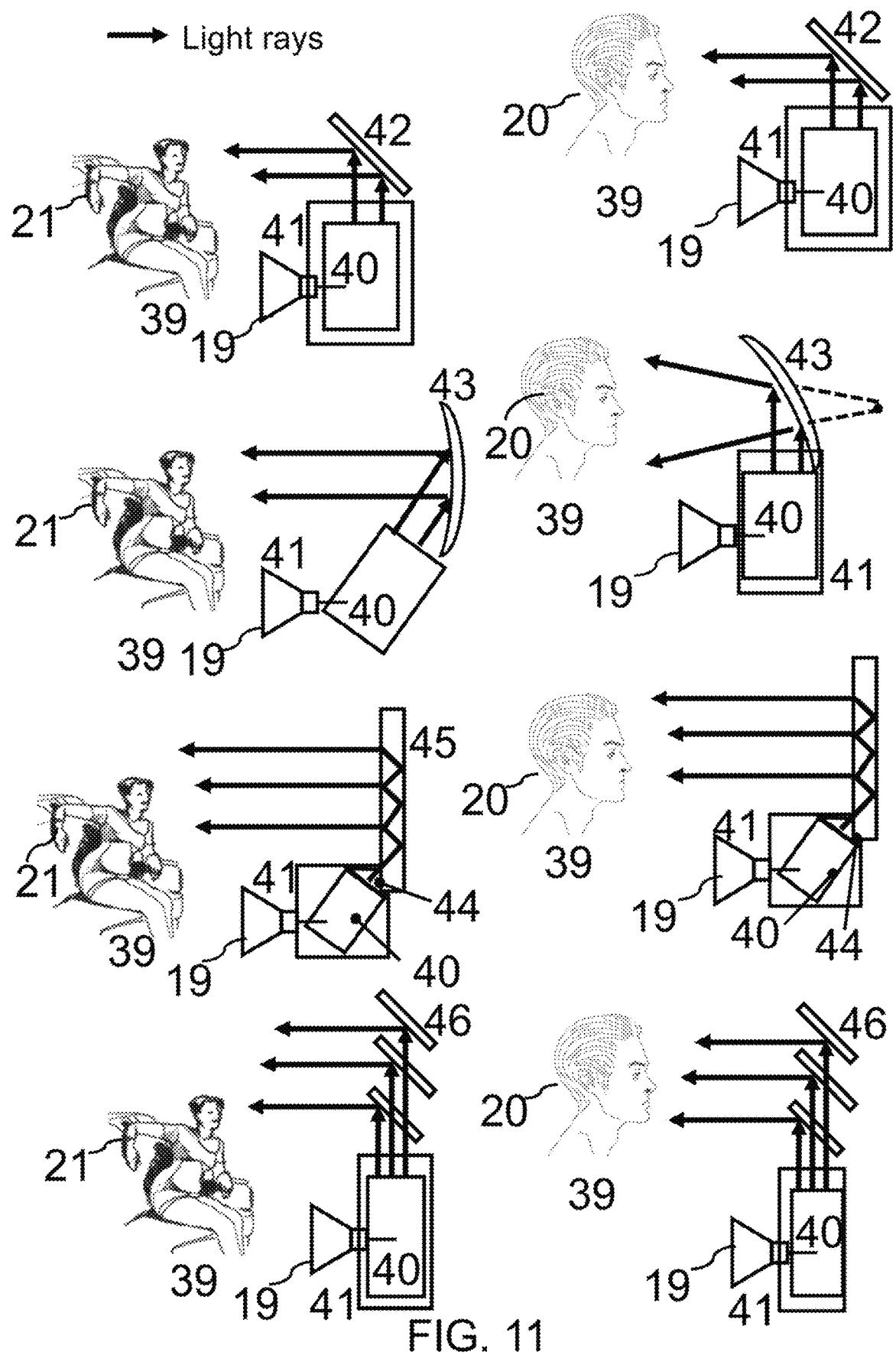
FIG. 11 illustrates instances of a relay system that can be used to relay light from the cavity to the outside world, wherein the display might be used as a far standing display or used very close to the head as on a desktop, and wherein the relays might be fully transparent or opaque, curved or flat, one piece or comprising multiple switching sections, and wherein diagrams show how display cavities' outputs can be relayed to the viewer as part of an entertainment system or a magnified monitor, and wherein the left column shows entertainment system modalities, and wherein the right side shows magnified near-head display modalities.

FIG. 11 and the following descriptions provide non-limiting examples of relay mechanism 3 which can be used to direct the output of a field-evolving cavity 1 to the viewer. In one example, the light exits the cavity exit pupil 2 onto a visor and moves toward the eye. In another example, the light exits a smaller cavity and is fed to a large-size waveguide that then redirects the light toward the viewer.

In reference to FIG. 11, the diagram showing how the output of the field-evolving cavity 1 can be relayed to the viewer as part of an entertainment system or a magnified monitor. The left column shows entertainment system modalities, and the right column shows magnified near-head display modalities. In general, a near-head mount 20 may be operatively coupled to system enclosure 5, wherein the near-head mount 20 is used to position the system enclosure 5 adjacent to a user's head. Moreover, entertainment stand 21 is operatively coupled to system enclosure 5, wherein entertainment stand 21 is used to position the system enclosure 5 offset from a user's head. Furthermore, at least one audio output device 19 is electronically connected to the display panel 6.

Reference 39 in FIG. 11 illustrates the viewer either in near-head modality 20 or entertainment system modality 21 where the viewer is farther than 60 centimeters (cm) from the display.

Reference 40 in FIG. 11 illustrates a generalized display cavity (i.e., the at least one field-evolving cavity 1) producing digital content (stereoscopic or 2D) at one or more depths.

Reference 41 in FIG. 11 illustrates the casing (i.e., the system enclosure 5) of the at least one field-evolving cavity 1 that holds the rest of the electronics of the system.

Reference 42 in FIG. 11 illustrates an example of an angled reflector relay (i.e., the relay mechanism 3) where a reflective, semi-reflective or switchable mirror surface is used to relay the cavity exit pupil 2 to the enclosure exit pupil 4 and therefore the viewer.

Reference 43 in FIG. 11 illustrates an example of a curved angled reflector relay (i.e., the relay mechanism 3) where a curved reflective, semi-reflective, or switchable mirror surface is used to relay the cavity exit pupil 2 to the enclosure exit pupil 4 and therefore the viewer. The curvature of this relay can change the depth of the content coming from the original depth of the cavity to further or closer distances.

Reference 44 in FIG. 11 illustrates a coupling optics that couples the cavity exit pupil 2 to the entrance pupil of the waveguide (i.e., the relay mechanism 3).

Reference 45 in FIG. 11 illustrates a geometrical or diffractive waveguide (i.e., the relay mechanism 3), which redirects the output of FE Cavity (made with LCoS and reflectors or DMD and reflectors or LCD panels and reflectors or array of projectors) to the viewer. These waveguides can be multimode geometrical, diffractive, or real single mode-confined waveguides.

Reference 46 in FIG. 11 illustrates a compressed relay system (i.e., the relay mechanism 3) that will be further detailed in the next section of this disclosure. The compressed relay system helps to have more compact form-factor for the display.

Compressed Designs

Figure 12:
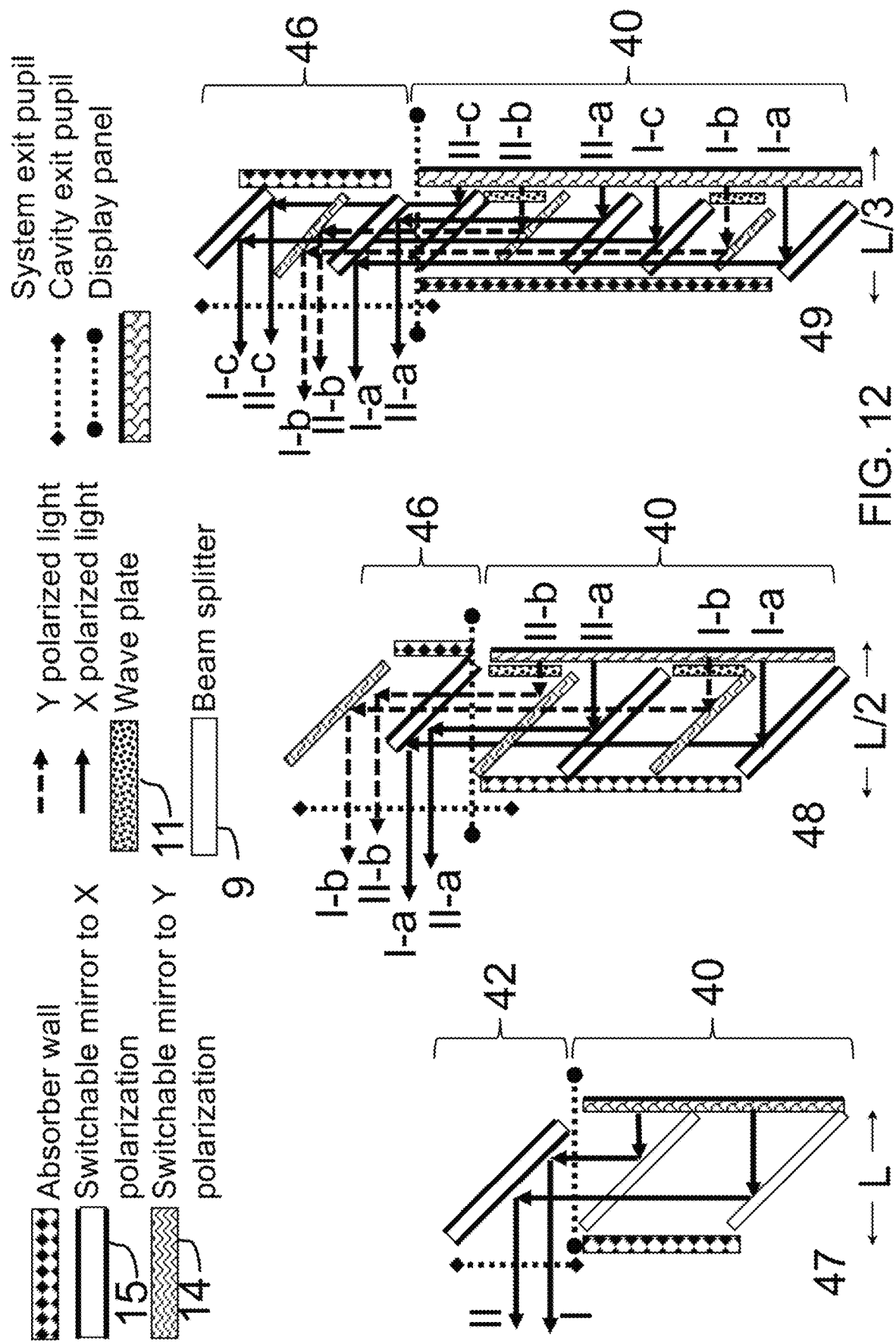
FIG. 12 illustrates instances of compressed FE cavities based on switchable mirrors, wherein the thickness of the cavity (L) can be reduced by having the reflectors turned on and off sequentially, and wherein diagrams show how the compressed architecture with switchable mirrors in Class I FE cavities can compress the size of the system.

The single reflectors can be bulky both inside the FE cavity 1 and as the relay. FIG. 12 shows a few non limiting examples of such compressed designs based on spatial stacking of switchable mirrors.

In reference to FIG. 12, an operative combination of the at least one field-evolving cavity 1 and the relay mechanism 3 may comprise a plurality of switchable mirrors that are in serial optical communication with each other and are positioned offset from each other. Moreover, the plurality of switchable mirrors may comprise a plurality of first switchable mirrors 14 and a plurality of second switchable mirrors 15 so that the plurality of first switchable mirrors 14 is interspersed amongst the plurality of second switchable mirrors 15. As can be seen in the sections of FIG. 12, the specific cavity arrangement being configured to selectively alternate between reflecting the optical path in a first polarization with at least one specified first switchable mirror from the plurality of first switchable mirrors 14 and passing the optical path through the specified first switchable mirror, while the specific cavity arrangement is further configured to selectively alternate between reflecting the optical path in a second polarization with at least one specified second switchable mirror from the plurality of second switchable mirrors 15 and passing the optical path through the specified second switchable mirror. This allows the plurality of first switchable mirrors 14 and the plurality of second switchable mirrors 15 to be configured to compress an occupying volume of the operative combination of the at least one field-evolving cavity 1 and the relay mechanism 3. Section 47 of FIG. 12 shows an example system where there is no compression with Class I FE cavity 1 and two depths, similar to Section 6 in FIG. 3A. The light exits the cavity exit pupil 2 (shown by blue dashed line), reflects from Reference 42 in FIG. 12 (i.e., the relay mechanism 3), and exits the enclosure exit pupil 4 (shown in the red dashed line). The deeper light I is coming from depth I, and the light II is coming from a closer distance inside the field-evolving cavity 1. The system is obligated to have minimum thickness of L obligated by the dimensions of the display panel 6. For the same dimensions of the display panel 6, Section 48 of FIG. 12 reduces the thickness to half (L/2). This compression is obtained by having a stack of relays which are transparent relative to which other either by means of temporal switching of the switchable mirrors or by polarization. Therefore, in Section 48 of FIG. 12, the deeper depth I has two sections I-a and I-b which are relayed at two different distances; the distances in relay work in such a way that I-a and I-b both end up having the same depth as depth I but will span the same size for the enclosure exit pupil 4 as in Section 47 of FIG. 12. The same thing is happening for the closer depth II. The depth is diced into two relays which expand the enclosure exit pupil 4 but have less thickness. This approach can be extended for further compression. Moreover, Section 49 in FIG. 12 shows the case where the thickness in relation to Section 47 of FIG. 12 is compressed by factor of three. Here each depth level is spatially multiplexed to three sections which are compensated by the height of the three relay switchable mirrors 14, 15. For example, the paths that I-a and I-b and I-c travel to the enclosure exit pupil 4 (shown in the red dashed line) are equal, and, thus, all of them have the same depth as depth I. However, they exit at different heights, therefore expanding the enclosure exit pupil 4 back to the size of the enclosure exit pupil 4 in Section 47 of FIG. 12.

Example Prototype

Figure 13:
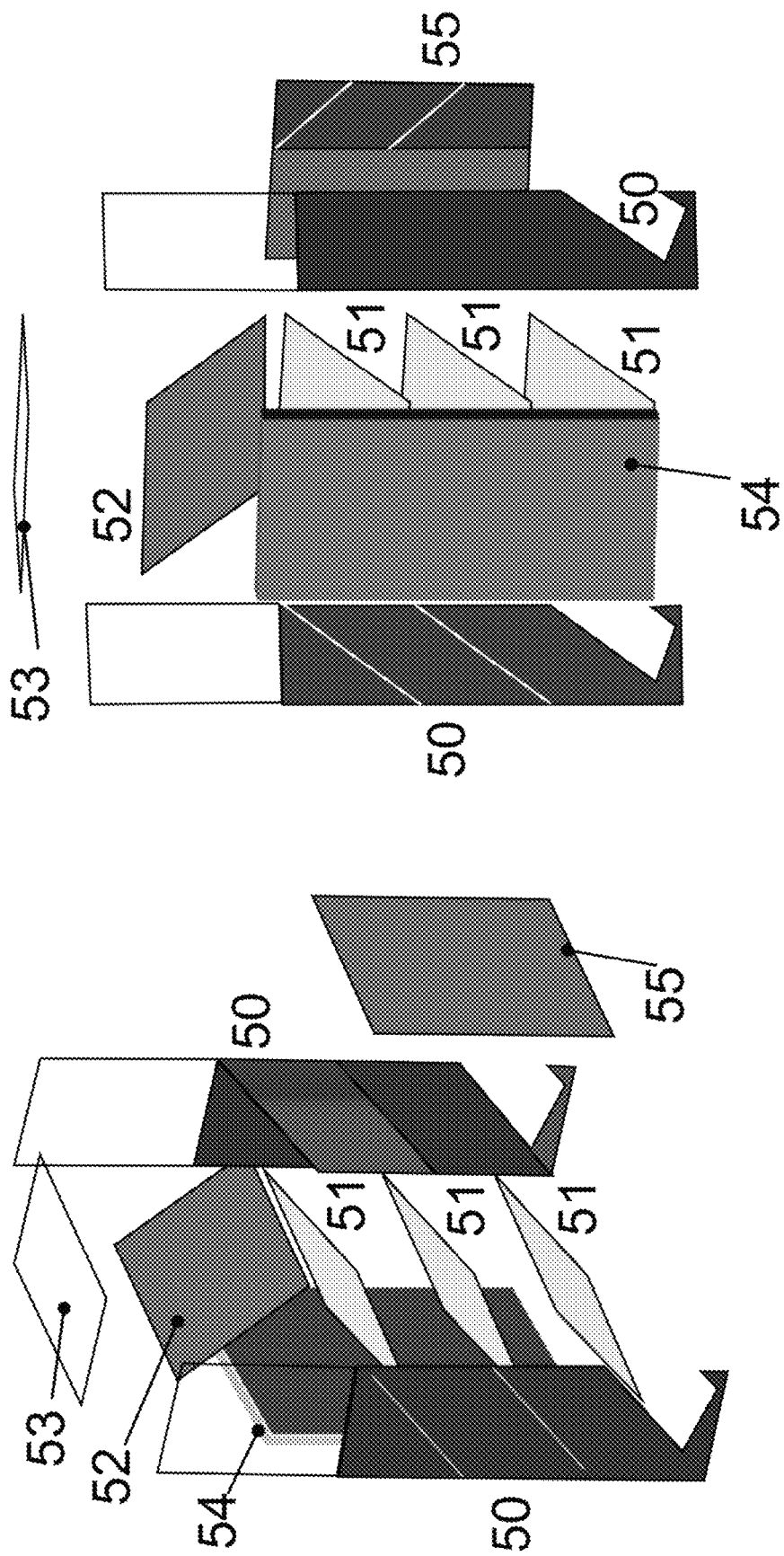
FIG. 13 illustrates the exploded view of a prototype model of a three-layer light-field display, wherein a 3D model of a prototype system is shown, and wherein the left panel is the back of the exploded model, while the right panel is the front of the display, and wherein the light-field exits the green reflector on top.

FIG. 13 shows the exploded 3D model of a prototype system, previously shown with no details in FIG. 1, with three depths from the back on the left and from the front on the right. The components are as below:

Reference 50 in FIG. 13 (i.e., components of the system enclosure 5) are side holders of the assembly. Reference 51 in FIG. 13 (i.e., components of the optical tuning mechanism 7) are reflective or semi-reflective surfaces. Reference 52 in FIG. 13 is a simple reflective mirror working as the relay mechanism 3. Reference 51 in FIG. 13 (i.e., component of the system enclosure 5) is a top cap just for protection of the relay mechanism 3. Reference 54 in FIG. 13 (i.e., the display panel 6) is an LCD panel that is divided at three depths. Reference 55 in FIG. 13 (i.e., component of the system enclosure 5) is a back cover of the FE cavity 1.

Advantages and Improvements Over Existing Methods

The arrangements, methods, and assembly of components in this description confer a variety of advantages and improvements over existing 3D systems:

Ergonomic advantages and improvements

Accommodation-vergence conflict mitigation—the present invention described herein can produce digital content at multiple depths with true monocular optical wavefront. The flexibility of display digital content at multiple depths enables the presentation of digital content at an optical depth which matches or is similar to the binocular disparity depth cue presented to the viewer, thereby helping to resolve any accommodation-vergence conflict experienced by the viewer. Mitigating accommodation-vergence conflict makes the digital content more comfortable to view for extended periods of time and increases the sense of realism experienced by the user viewing the digital content.

Size reduction—Because the present invention allows for folding of optical paths, it offers flexibility in terms of packaging compared to systems that use projectors. This enables smaller systems.

Unlike autostereoscopic 3D systems, which are limited in view zone distance and angle, and sometimes allow only few viewers to see the 3D content, the present invention allows up to a 150-degree (depending on number of depths) viewable angle and does not have limitation in number of users.

The FE cavities 1 can be combined with any type of panels and light engines so they are not limited to a specific technology; if needed, they can also use autostereoscopic displays as an engine to enhance their performance in depth accuracy.

Reduced cost—As opposed to using eye-tracking-based accommodation displays or holographic displays, the present invention can utilize readily available components (flat display panels) which are ready for mass production, significantly reducing overall system cost and technical challenges.

Since a FE cavity 1 system allows true optical depth, they allow the enclosure exit pupil 4 to sit very close to the eye without any eye fatigue since the true optical depth of the images can be far back. Unlike stereoscopic displays, this opens a whole new set of possibilities for near-head displays where the size of the display can be magnified with no need to wear anything or have a large screen.

For most of the designs with a passive glass reflector or even switchable mirrors herein, the images provided by FE cavities 1 have no artifacts such as haze, color nonuniformity, distortion, and moiré artifacts.

Performance advantages and improvements

Bandwidth reduction—The present invention as described herein allows for solving or mitigating accommodation-vergence conflict without having to present the entire 5D plenoptic function to the viewer. This reduces the complexity of content rendering and can improve system frame rates compared to full light-field displays. The bandwidth can be reduced by orders of magnitude.

Optical efficiency flexibility—The present invention is flexible in that if optical efficiency is a priority, a design can be chosen that has high light throughput. If display brightness is not needed, additional flexibility exists to add more display planes or use simpler cavity designs.

Spatial resolution flexibility—The present invention is flexible in that spatial resolution can be maintained by using multiple display panels 6. If spatial resolution is not needed (for instance, if individual pixels are already not resolvable by the user), the present invention can utilize unnecessary spatial resolution to render a different depth plane, improving the user experience.

Expandability—FE cavities 1 are conveniently expandable in architecture, number of planes and expansion to different display systems.

Compatibility—The present invention introduced herein has significant advantages in compatibility, both on the software level and on the hardware level. At the software level, since the light source can be ultimately a 2D screen, the feed to the display system can be easily fed with conventional standard signals. Also, this simplifies the rendering as there is no fundamental need for significant computational processing of the input due to depth providing optics. The hardware architecture is integral to a wide variety of existing 2D display systems.

Functional advantages and improvements

Monitor magnification—Since the depth of the systems disclosed herein are true optical depths, the eye can accommodate and view these 3D contents with no discomfort at any given distance of the display. For example, if the display is 20 cm away from the head, but the depth that is shown is still 2 meters, the viewer sees the image as being 2 meters away and can use the monitor even at such a close distance. This helps to magnify small sized monitors using true optical depth provided by disclosed systems.

Heads up displays—The relay can be semitransparent since the depth can be much further than the actual position of the display, which makes a perfect case for large-scale superposition of the image and the real world, especially in the context of the heads-up display.

Entertainment—The light-field experience provides a better sense of realism due to accurate optical depth and artifact free images. This can be used for home entertainment, gaming, and commercial entertainment applications.

Commercial Applications

Many commercial applications become possible with dramatic accuracy in depth, transparency of the screen, and sense of immersion. What follows is a non-exhaustive list of possible applications:

Navigation
Turn-by-turn directions while driving/piloting/etc., using heads up displays without having to look away from the road or fumble with a phone or separate navigation device.

Medical
Better investigation of 3D data files using the light-field displays.

Workplace Ergonomics
Magnified displays can provide a convenient replacement for large displays without the need to wear any hardware or the need to have a large screen. The 3D nature of the display can provide a volume for office work with pixel accuracy that is equal to the standard monitors today.

Entertainment
The layered nature of FE cavities 1 provides ease in content generation from game and video industries. This is because rendering in a few layers to provide 3D effect is much easier (less computationally demanding) than rendering the entire 3D environment.

The FE cavities 1 are well suited for stand-alone game machines since the true depth attracts viewers due to new experiences.

Design
Previewing the look and feel of objects which have yet to be physically prototyped, and visualizing content for modeling and design in AR or VR without having to wear headsets. This is very important since developers cannot wear headset for many hours, but they can use the present invention with true optical depth.

Figure 14A:
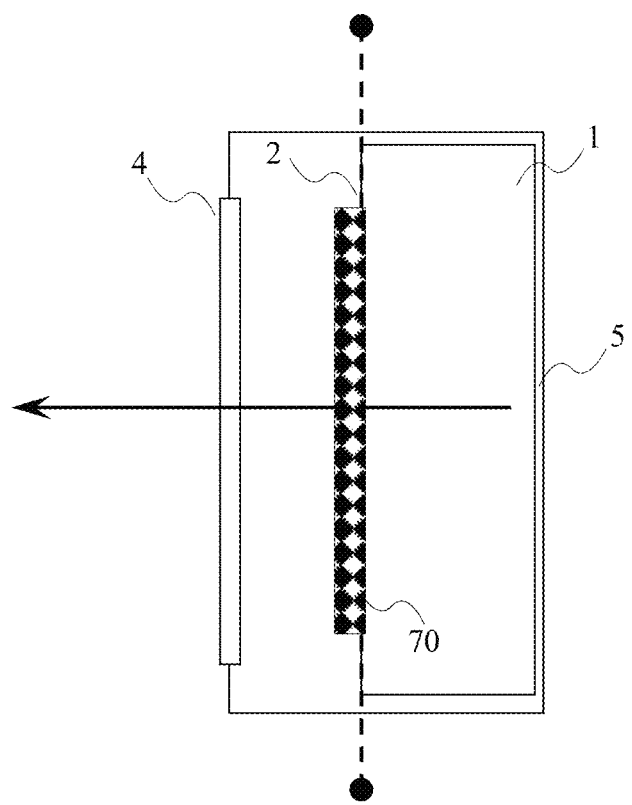
FIG. 14A illustrates an embodiment where an aperture optics is positioned at the cavity exit pupil of the field-evolving cavity.
Figure 14B:
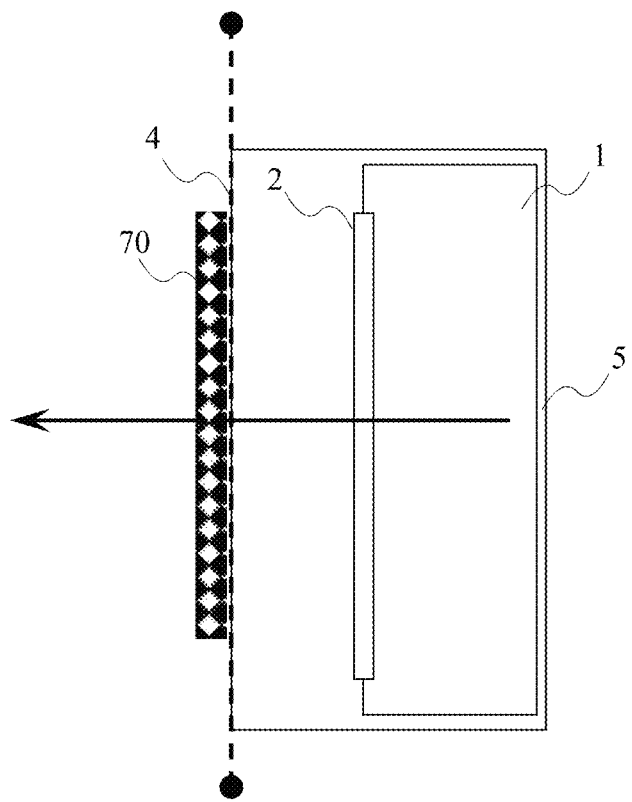
FIG. 14B illustrates an embodiment where an aperture optics is positioned at the enclosure exit pupil of the system enclosure.

In any of the embodiments of the field evolving cavities described above, aperture optics 70 can be added to assist and modify the optical properties of the light of the optical path. FIG. 14A and FIG. 14B show two exemplary examples.

In FIG. 14A, light that exits the field-evolving cavity 1 passes through the aperture optics 70 positioned at the cavity exit pupil 2. The light modified by the aperture optics 70 then exits the system enclosure 5 through the enclosure exit pupil 4. Similarly with the exemplary example in FIG. 14B, the field-evolving cavity 1 emits light through its cavity exit pupil 2. The light passes through and is modified by the aperture optics 70 positioned at the enclosure exit pupil 4 and travels to a viewer.

The aperture optics 70 can comprise any number of light-modifying devices including, but not limited to, anti-reflection layers, prismatic films 17, privacy layers, absorptive polarizers, or micro-curtain layers. The aperture optics 70 may further be used to modify the ambient light that is directed toward the user from the external environment. As an exemplary example, an anti-reflection layer can be used as an aperture optic 70 to remove stray reflections that would otherwise enter the viewer's eyes. Aperture optics 70 may have the further function of protecting the components within the system enclosure 5 from the external environment. In some embodiments, aperture optics 70 can be placed at both the cavity exit pupil 2 and the enclosure exit pupil 4.

In this disclosure, the field-evolving cavity can produce a light-field display, or a subsampled light-field display, i.e., a light-field display that only approximately replicates the full light-field emanating from a physical three-dimensional scene. For example, fractional light-field display may produce a single virtual image, corresponding to a single focal plane or virtual depth.

In some embodiments, the field-evolving cavity 1 is further comprised of one or more semi-reflective elements 71 and one or more reflective element 72. In some embodiments of the present invention, these reflective elements 72 and semi-reflective elements 71 are configured such that the light of the optical path is at least partially folded onto itself to selectively tune a virtual depth location of a virtual image presented to a viewer. In other words, the field-evolving cavity 1, the reflective elements 72 and semi-reflective elements 71 are configured so a portion of the optical path is folded back onto the original optical path to adjust a depth of the focal plane along the optical path. This folding of the optical path upon itself allows the present invention to further tune the virtual depth location of the virtual image. Further embodiments include switchable mirrors or mechanical actuators within the field-evolving cavity 1, configured to further tune the virtual depth location of the virtual image.

Figure 15:
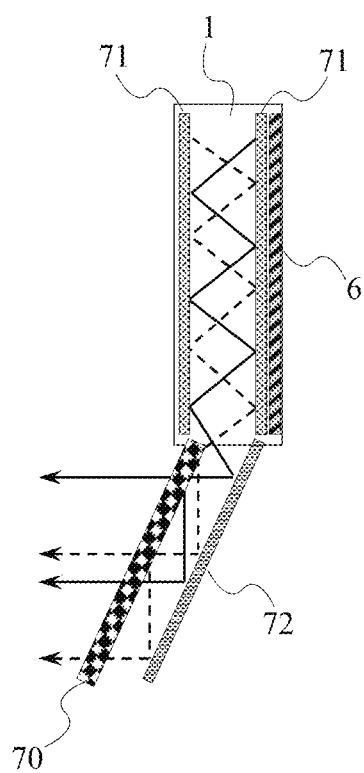
FIG. 15 illustrates an embodiment of the field-evolving cavity being configured as a light pipe in which elements of the present invention are segmented to produce multiple depths or images.

FIG. 15 shows a further embodiment of a field-evolving cavity 1 in which the semi-reflective elements 71 of the system are segmented to produce multiple depths through an extended aperture optics 70. In some embodiments, the display panel 6 itself can be segmented. In other embodiments, the reflective 72 or semi-reflective 71 optics may be segmented.

In this disclosure, an element that is "segmented" has a property that varies across the surface of the element. A segmented semi-reflective element, for example, is a semi-reflective element whose reflection coefficient or reflectivity vary across its surface. The variation can be smooth, continuous, piecewise constant, or piecewise smooth. A segmented display panel is a display panel that shows different image content in various regions of the display panel. For example, a display panel that is segmented into two regions can show a first image and a second image. In this way, light emitted from, transmitted through, or reflected by different segments of segmented elements can travel different paths through the display system.

Figure 17:
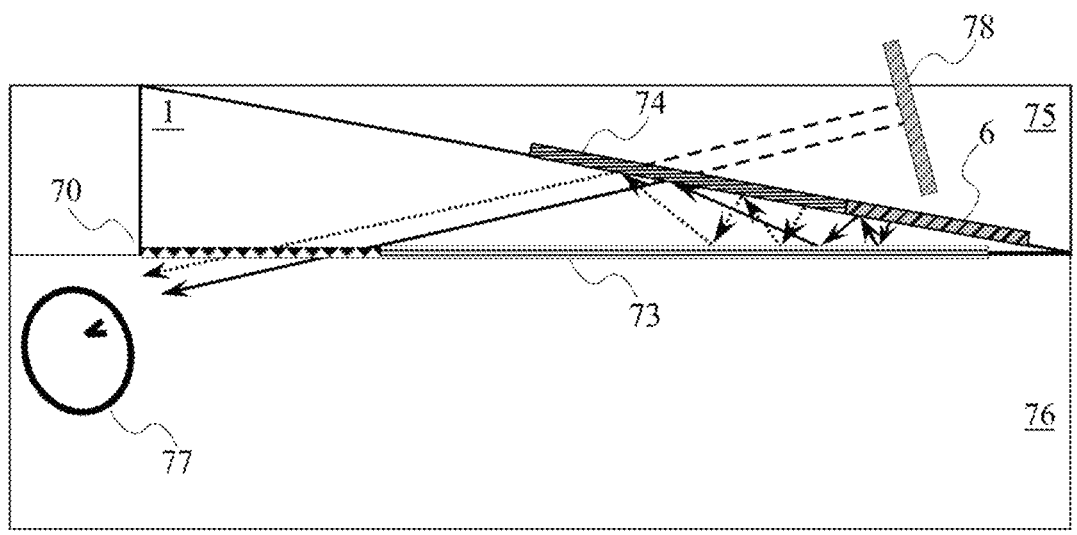
FIG. 17 illustrates an embodiment of the present invention where the field-evolving cavity is integrated into the roof of a vehicle.

This segmentation of components creates a number of segmented elements, such that a segmented display panel 6 may be segmented into a first segmented element and a second segmented element. There is no limit to the number of segmented elements created by a segmented component. Further, in the same manner the reflective 72 optics or the semi-reflective 71 optics can also be segmented into a first segmented element and a second segmented element. Any of the components within the present invention may be segmented in this same manner. Exemplary embodiments with segmented elements are shown in FIG. 15 and FIG. 17.

Further, the reflective 72 optics or the semi-reflective 71 optics may have gradient properties, such as a gradient reflectivity. The reflective 72 optics or the semi-reflective 71 optics, including segmented optics, can further be polarization-dependent, such that after interacting with the polarization-dependent element, the light of a first polarization travels a first optical path, and the light of a second polarization travels a second optical path.

As shown in FIG. 15, the light of the optical path may be guided along a cavity created between two or more reflectors, elements, optics, or components which constitute a light pipe. The light of the light pipe being guided down the cavity of the light pipe exiting the light pipe though aperture optics 70. The light being directed to the viewer.

In further embodiments a light pipe can be created with segmented elements, such as a first segmented element and a second segmented element. In one embodiment, the first segmented element and a second segmented element are comprised of polarization-dependent elements. The polarization-dependent elements of the first segmented element and a second segmented element be configured such that the light of a first polarization is guided along a light pipe along a first optical path and the light of a second polarization is guided along the light pipe along a second optical path. Thereby the light pipe produces a plurality of virtual images at a plurality of depths. In some embodiments, the light paths corresponding to the different segmented elements form images at the same depth but different lateral positions, such that together they form a single virtual image with extended aperture or field of view. In some embodiments, this polarization-dependent element light pipe is embedded or integrated into a vehicle.

Figure 16:
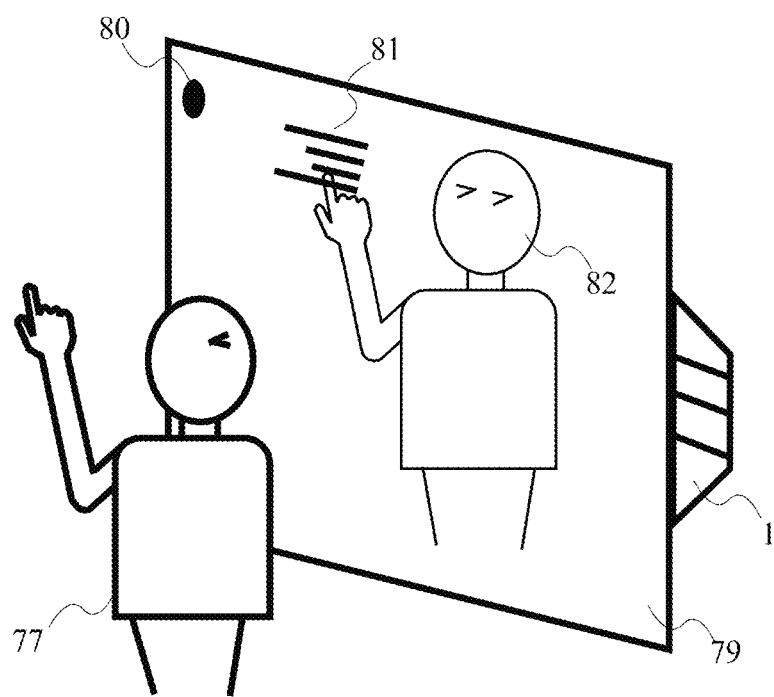
FIG. 16 illustrates an embodiment of the present invention where the field-evolving cavity is in optical communication with a mirror, the embodiment producing a virtual image at the same depth or a closer depth as the viewer's reflection.

The further embodiment shown in FIG. 16 has a field-evolving cavity 1 that has an exit aperture in optical communication with to a large mirror 79. The mirror can function partly as an aperture optic. The embodiment further comprises a gesture sensor 80, a depth camera 80, or both. The gesture sensor 80 or depth camera 80 being coupled or integrated into the display system. The gesture sensor 80 or depth camera 80 observes the viewer 77, such that the display system can capture, incorporate, or interpret the motions, positions, and gestures of the viewer 77. The gesture sensor 80 or depth camera 80 relays the information about the viewer 77 to the display system. The display system is then able to use this information to generate and display text or other augmentation effects dynamically as a virtual image 81. In some embodiments, the text or augmentation effects can be generated from other sources, and they can still be manipulated by the viewer through the depth camera 80 or gesture sensor 80.

In this embodiment, the field-evolving cavity 1 is configured to produce a virtual image 81, the virtual image 81 including any number of items such as but not limited text or images. This virtual image 81 is produced by the field-evolving cavity 1 so that the virtual image 81 appears at a virtual depth that is similar to the reflection 82 of the viewer in the mirror. In other words, when the viewer looks at their reflection 82 in the mirror, the virtual image 81 that is produced by the field-evolving cavity 1 appears to be at the same depth or appears to be on the same plane as the reflection 82 in the mirror.

In some embodiments, the field-evolving cavity 1 can further comprise a retroreflective or a retro-refractive element. The retroreflective or retro-refractive element can be configured so that the virtual image 81 appears closer to the viewer 77 compared to the viewer's 77 physical distance to the display. Thereby, the text or augmentation effects of the virtual image 81 appear at the same depth as the viewer's image. The viewer can then interact with the virtual images 81 via the gesture sensor 80 or depth camera as if the text or augmentation effects of the virtual image 81 are hovering in mid-air.

FIG. 17 shows a further embodiment where the field-evolving cavity 1 is embedded or integrated into the roof 75 or ceiling of a vehicle 76. In this further embodiment, which is similar to embodiment 33 of FIG. 9, the display panel 6 emits light into the field-evolving cavity 1, which can have a first element 73 and a second element 74. Both the first element 73 and the second element 74 can be reflective elements or semi-reflective elements which are positioned at angles of less than 45 degrees relative to each other. This angle can be designed arbitrarily. In some embodiments, the display panel itself can be segmented; in some embodiments, the first element or the second element can be segmented. In some embodiments, the segmented properties can be switchable in time, such that light travels a first path at the first time, and subsequent light travels a different path at a second time. In some embodiments, no elements are segmented. As the light is reflected between the two reflective elements, the angle at which it travels becomes shallower. This creates a light pipe that directs the light out of the exit of the display system towards a viewer 77, who sees a virtual image 78 corresponding to a shallower line of sight. In some embodiments, the virtual image is tilted at an angle different from that of any of the components of the display system and from that of the roof or ceiling. The viewer does not see a virtual image when looking straight up into the roof of the vehicle. In some embodiments, an aperture optic 70 is used. In some embodiments a relay mechanism 3 is used. In some embodiments, a component of the display system, such as the second segmented element, functions simultaneously as an aperture optic, relay mechanism, and optical tuning mechanism, or a subset thereof.

In some embodiments, the light path can be impacted by polarization-dependent elements. For example, a semi-reflective element can comprise a polarization-dependent grating, which directs light of a first polarization along the first path and light of a second polarization along a second path. The polarization of the light can be changed using quarter-wave plates and reflective polarizers.

In some embodiments, the field-evolving cavity can further comprise retroreflecting or retro-refracting elements, such that the virtual images appear closer to a viewer rather than farther away. Similar to the embodiment in FIG. 16, gesture cameras or depth sensors can be coupled to the display system, such that a viewer can interact with the virtual images. In some embodiments, the display system is transparent or semi-transparent for a see-through effect, such that a user can see simultaneously the display content and the environment behind the display system. In some embodiments, cameras capture information about the environment outside the vehicle, and the display system displays that information, for a video see-through effect.

The embodiment in FIG. 17 is an example of a wedge-type cavity, described in FIG. 9, but it can also be configured as other classes or orders of field-evolving cavities, such that the light path folds onto itself exactly or approximately. In such cavities, light can be folded when it experiences multiple reflections from a single element.

The embodiment of FIG. 17 may be integrated into portions of a vehicle. Although the embodiments described herein refer to an automobile or car, the vehicle can take on other forms, including, for example and not limitation, a car, a truck, bus, a motorcycle, a tricycle, a tank, an aircraft, or a water vessel.

It is important to note that each point of the virtual image is visible by both eyes of a human viewer, i.e., that light rays from any given point of the virtual image enter both eyes simultaneously. The viewer's eyes may be located anywhere within a certain volume to see the virtual image. The depth of the virtual image is the depth each eye accommodates or focuses on. The volume is called the headbox, and it spans a lateral dimension. The lateral dimension may be, for example, at least 8 cm, at least 10 cm, at least 15 cm, at least 20 cm, or at least 30 cm. The distance between the display system and the nearest viewing position in the headbox may be, for example, 20 cm, 30 cm, 40 cm, 50 cm, 60 cm, 70 cm, 80 cm, 90 cm, or 100 cm. In some embodiments, the nearest viewing position is greater than 100 cm. This distance is in part limited by the viewing direction required to see the virtual image. Viewer 77 is understood to have his/her eyes within the headbox.

Further, the virtual image is an image whereby the imaging-forming light rays corresponding to a given point of the image do not physically intersect. Rather, they diverge or are collimated. When the image-forming light rays are geometrically projected backward, their projections do intersect. This intersection point is the location of the virtual image. (In contrast, the image that is formed by physically intersecting light rays is a real image that may be projected onto a screen or other physical surface without any other focusing elements.) In some embodiments, a viewer views a virtual image.

In some embodiments, the first element 73 or the second element 74 of FIG. 17 is polarization dependent. In some embodiments, they are semi-reflectors or partial reflectors. For example, the first element 73 may be a polarization-changing semi-reflector, which is an element that transmits at least a portion of the light incident on it and further converts the incident light's polarization from one state into another. In some embodiments, a polarization-changing semi-reflector comprises a first wave plate, a beam splitter or other semi-reflector, and a second wave plate. In some embodiments, the wave plates are quarter-wave plates. If linear polarized light is incident on this polarization-changing semi-reflector, the light that is transmitted will be linearly polarized, but the direction of the polarization will be rotated by 90 degrees, i.e., incident x-(y-) polarized light is converted into y-(x-) polarized light. Further, linearly polarized light that is reflected by this element is also rotated by 90 degrees.

In some embodiments, either element 73 or 74 is a polarization-changing reflector, which is an element that reflects the light incident on it and further converts the incident light's polarization from one state into another. In some embodiments, a polarization-changing reflector comprises a mirror and wave plate. The wave plate is a quarter-wave plate in some embodiments. Incident linearly polarized light will be reflected, and the polarization orientation will be rotated 90 degrees.

The states of polarization under consideration may be linear polarization, circular polarization, or elliptical polarization. In some embodiments, the degree of polarization is included in the state of polarization.

In some embodiments, the first element 73 or second element 74 is a reflective polarizer, which transmits light of a first polarization state and reflects light of a second polarization state that is orthogonal to the first polarization state. An example of a reflective polarizer is a wire-grid polarizer. In some embodiments, the reflective polarizer is a polarization-dependent beam splitter (PBS).

In some embodiments, the optical properties of the first element 73 or second element 74 are controlled by an electronic signal. For example, the above mentioned waveplate in the polarization-changing (semi-) reflector may be a liquid crystal (LC), such as a nematic LC or a cholesteric LC. When a first voltage is applied to it, it may transmit light without changing its polarization (thus preserving the polarization), When a second voltage is applied to it, it may change the polarization from a first state to a second such as a conversion from horizontally polarized light to vertically polarized light. The voltage values may be arbitrarily engineered and include 0 V. For example, if the first element 73 comprises a first wave plate, a beam splitter, and a second wave plate; and one of the wave plates is a liquid crystal, then the applied voltage impacts how the polarization of transmitted and reflected light is changed. At one voltage, transmitted polarization may rotate 90 degrees. At a second voltage, it may rotate 0 degrees. At a third voltage, incident linear polarization may be converted into circular polarization. Thus, the type of wave plate and the configuration of an LC can impact the transmitted polarization. Consequently, the transmitted light will interact differently with the second element 74.

Figure 18A:
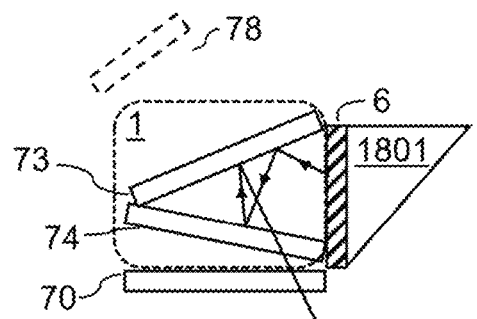
FIGS. 18A through 18F show various embodiments of the display system illustrated in FIG. 17, the embodiments using polarization-dependent reflectors or semi-reflectors.

FIGS. 18A through 18F depict a set of embodiments related to FIG. 17. In FIG. 18A, light having a first polarization state is emitted from a display 6 and enters a field-evolving cavity 1. In all embodiments shown in FIGS. 18A-18F, the field-evolving cavity 1 includes the first element 73 and second element 74, and it may include additional optical elements as well as a structure to mechanically support the elements. Inside the cavity, the light first is reflected from a first element 73, which is a polarization-changing reflector. The light is then reflected by a second element 74, with a reflective polarizer, and then reflected by the first element 73 again. The polarization state is such that the light is transmitted by the second element 74 when the light is incident on it a second time. The transmitted light passes through an aperture optic 70 and exits the cavity to the outside world. In some embodiments, the aperture optic 70 comprises an absorptive polarizer and an antireflection layer. In some embodiments, the aperture optic is a transparent material, such as a glass layer.

When a viewer views the light, it forms a virtual image 78 that is farther away from the viewer than is the field-evolving cavity itself. Further, the angle of the first element 73 relative to the second element 74 is less than 45 degrees, so that the orientation of the virtual image is shallower than that of the display itself. Further, because the angle is less than 45 degrees, the field-evolving cavity can be thinner.

The display system and any electronically addressable or electrically active of the cavity are controlled by a circuit block 1801. In some embodiments, the circuit block is coupled to an electronic system of the vehicle. In some embodiments, the circuit block is an integrated part of the display system and serves to provide content of the virtual imagery.

Figure 18B:
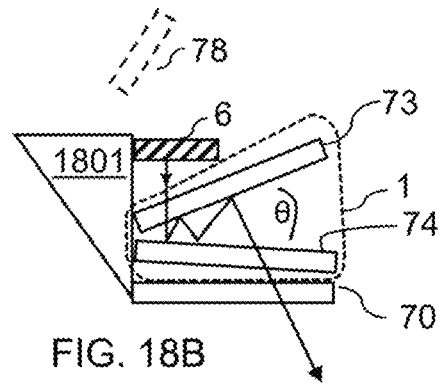

FIG. 18B depicts an embodiment in which display 6 is substantially parallel with the aperture optic 70. The display sends light through a first element 73, which may be a polarization-changing semi-reflector. The polarization state is rotated 90 degrees, reflected by the second element 74, which may be a reflective polarizer or PBS, then reflected by the first element 73, which rotates the polarization another 90 degrees such that is transmitted by the second element 74, and passes through the aperture optic 70. A virtual image 78 is formed, and it is located at a depth that is farther than the field-evolving cavity 1 and also farther than the display 6 itself. A circuit block 1801 controls the display content. In some embodiments, the polarization-changing semi-reflector includes a first wave plate, a beam splitter, and a second wave plate. In some embodiments, the aperture optic 70 includes an absorptive polarizer and/or an antireflection element. These are just examples, and any suitable configuration of first element 73, second element 74, and aperture optic 70 may be used. In some embodiments, a directional film is introduced in the beam path. The angle between the first and second elements is θ, which is less than 45 degrees.

In an FEC, the light is reflected back and forth, or is circulated, between the elements of the cavity. Each of these propagations is a pass. For example, an FEC may have a first element and a second element. The first instance of light propagating from the first element to the second element is called a forward pass. When the light, or a selected part of light, is reflected from the second element back to the first element, that propagation is called a backward pass, as the light is propagating backward toward the light source. In this cavity, a round trip occurs once the light completes one cycle (forward and backward pass) and returns to the first element. In some embodiments, a round trip occurs when light substantially reverses direction and is incident on an element more than once. The term "round trips" denotes the number of times that light circulates or bounces back and forth between the two elements of a cavity or the number of times light interacts with a single element.

In some embodiments, the light travels one round trip within the FEC 1. In some embodiments, the number of round trips may be 2, 3, 4, or 5. The number of round trips substantially determines the monocular depth perceived be a viewer. In some embodiments, a monocular depth is larger than the distance between the viewer and the light source. For example, the ratio between the monocular depth and the distance may be 1.1, 1.5, 2, 2.5, 3, 4.5, or 5. In some embodiments, the ratio may lie within a range, such as 1.1-2, 1.5-3, or 2-5. In some embodiments, a monocular depth is dynamically adjustable by modifying a property of the virtual display system.

In embodiments such as that in FIG. 18A, there is one round trip. In the embodiment of FIG. 18B, there are two round trips. The mechanism for introducing more round trips includes modifying the properties of the first and second element. For example, by using a different type of wave plate or an LC in the first element, the reflected polarization (after the first-round trip) can be configured differently, such that most of the light is reflected a second time by the second element. Further, the second element may also include a polarization-changing element, such as a wave plate or LC, to modify the polarization of the light that it reflects. Further, both the polarization changes and the reflectivity and transmittivity of these elements may be a function of angle. For example, either element may include a multilayer film. In such embodiments, because the angle of the light rays changes with each round trip, the light may be substantially transmitted by the second element after a desired angle is reached.

Figure 18C:
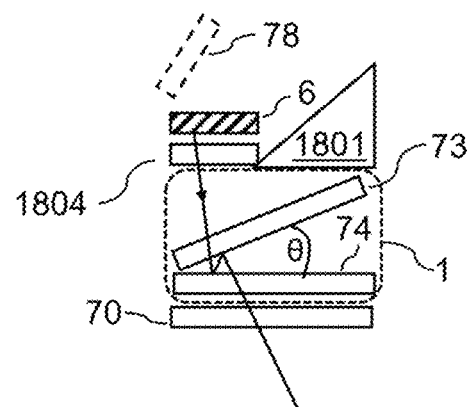

FIG. 18C shows an embodiment similar to that in FIG. 18B. Light from display 6 passes through a pre-cavity element 1804, which includes a directional film in some embodiments. A directional film selectively transmits light rays that are oriented at angles within a specified angular range and blocks light rays directed outside that range. For example, the directional film may transmit light rays that are incident within a range from zero to 10 degrees, zero to 20 degrees, zero to 30 degrees, zero to 40 degrees, zero to 50 degrees, or zero to 60 degrees. The directional film does not provide optical (focusing) power. In some embodiments, the directional film transmits an angular range that does not start at zero degrees.

The light then passes through the first element 73 which is a polarization-changing semi-reflector. The light is reflected by the second element 74, which is a reflective polarizer and makes a round trip within the field-evolving cavity 1. The light then exits the system through the aperture optic 70. In some embodiments, the aperture optic 70 is an absorptive polarizer or an antireflection layer. In some embodiments, the aperture optic 70 is a transparent element, such as a layer of glass or similar material. A virtual image 78 is formed, the virtual image orientation tilted with respect to the display orientation. A circuit block 1801 controls the display content and any active components, such as an LC or electrooptic material that may be included in the first element 73 or second element 74. The angle between the first and second elements is θ, which is less than 45 degrees.

Figure 18D:
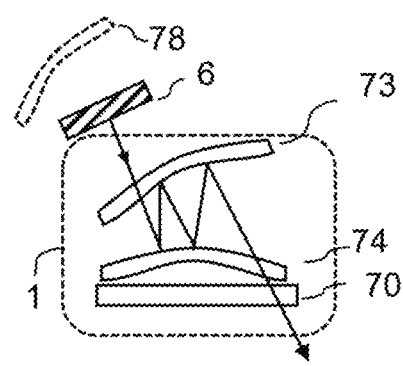

FIG. 18D shows an embodiment in which elements of the field-evolving cavity 1 are curved. Light from display 1 enters the cavity through a first element 73 which is a curved polarization-changing semi-reflector. The polarization exiting this element is such that it is reflected by a curved second element 74, which may be a reflective polarizer. The light is then reflected by the first element and rotated in polarization, and it then passes through the second element and through the aperture optic 70 forming a virtual image 78. The curvature of the elements creates optical power and allows the image to be magnified or minified and for its depth to be adjusted. In some embodiments, the curved elements are coatings on curved substrates. In some embodiments, the curved elements are freeform elements, and the curvature or shape of the elements is defined by a function.

In any of these embodiments, the angle between the first element 73 and the second element 74 may be less than 45 degrees. For example, it may be by 1, 5, 10, 15, 20, 25, 30, 35, 40, or 44 degrees.

Figure 18E:
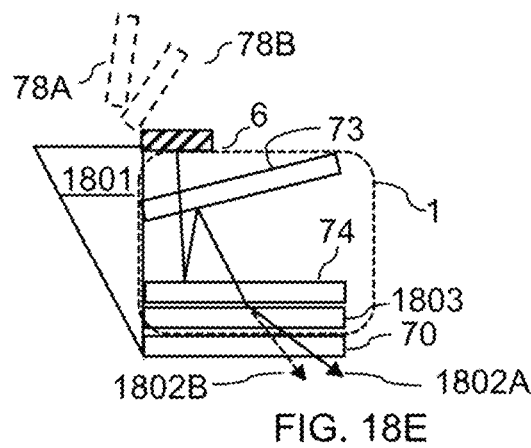

FIG. 18E shows an embodiment, in which the field-evolving cavity includes an electrooptic (EO) material 1803 whose refractive index changes in accordance with an applied voltage. For example, when a first voltage is applied by circuit block 1801, the EO material 1803 has a first value of refractive index; and when a second voltage is applied it takes on a second value of the refractive index. In some embodiments, the refractive index is not uniform, but varies linearly across the element, such that when the applied voltage changes, the variation changes, making the EO material 1803 an electrically controllable prism. For example, if the refractive index in the horizontal direction is given by $n(x)=n_0+A(V)x$, where x is the position, and $A(V)$ is a function of applied voltage, the light will be deflected in a direction dependent on the value of $A(V)$. Therefore, light that is emitted by a display 6 passes through a first element 73, is reflected by a second element 74, is reflected by the first element, and is transmitted through the EO material 1803. It is deflected by it and transmitted through an aperture optic 70. The deflection may be in a first direction 1802A producing a first virtual image 78A, or in a second direction 1802B to produce a second virtual image 78B depending upon the state of EO material 1803. In some embodiments, the display content is pre-compensated to account for any aberrations introduced by the EO material. That is, the display content may be distorted such that the combination of the distortion and any aberration results in a clear virtual image. In some embodiments, the function n(x) is not linear, but, rather, a function that varies so as to minimize aberrations. For example, the function may be a polynomial of order higher than 1, a logarithmic function, an exponential function, and the like.

Figure 18F:
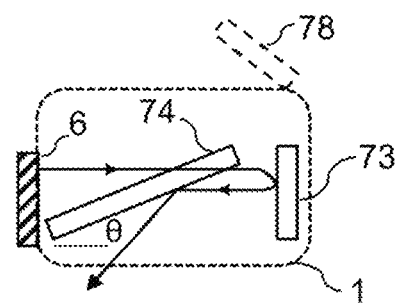

FIG. 18F shows an embodiment in which light from a display 6 enters the field-evolving cavity 1 from the left. It passes through the second element 74 and is reflected by the first element 73. Upon reflection in some embodiments, the light's polarization is modified, so that it is reflected by the second element and exits the system forming a shallow virtual image 78. The angle θ is less than 45 degrees.

In any of the embodiments above, a directional film may overlay the display panel to tilt the emitted light in a preferred direction before entering the field-evolving cavity.

An advantage of these embodiments is that the virtual image is tilted at an angle that depends on the angle between the first element 73 and the second element 74. If the angle between them is called θ, the tilt in the light accumulates by approximately 2θ after each round trip inside the FEC. So, if θ lies in a range between 1 and 30 degrees, the virtual image will be tiled relative to the display by a range between 2 and 60 degrees after one round trip. If θ lies in a range between 1 and 10 degrees, the virtual image will be tiled relative to the display by a range between 3 and 30 degrees after two round trips.

Another advantage is the thinness of the display system. If the lateral with is W~30 cm, and the angle θ is 30 degrees, the thickness of the FEC is approximately W tan θ, or 17 cm. The shallower the angle is, the thinner the display system is. The thickness of the display may be 5 cm, 10 cm, 20 cm, or 30 cm. Further, the virtual image size may be approximately the same as the display. In some embodiments, the virtual image is larger by, for example, a factor of 1.2, 1.5, 2, 2.5, 3, 3.5, or 4.

Figure 19A:
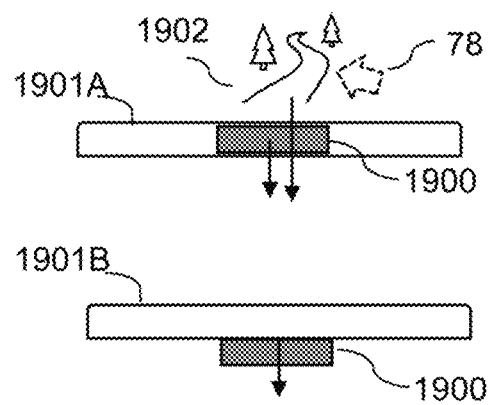
FIGS. 19A through 19F show exemplary ways that a display system may be integrated in a car, including mechanically articulated or motorized couplings.

FIGS. 19A through 19F show embodiments in which the display system described above is integrated into a vehicle. FIG. 19A is an embodiment in which the display system 1900 is integrated to a vehicle. The elements of display system include the display itself, the field-evolving cavity, and any pre- or post-cavity elements. In some embodiments, the display system includes an aperture optic as an element. The display system produces a virtual image. In some embodiments, the display system 1900 is integrated into a vehicle part 1901A. In some embodiments, the display system 1900 is overlaid on a window and lets light from an external scene 1902 pass through it such that the virtual image 78 overlaps with the scene and creates augmented reality (AR) environment. In some embodiments, the display system 1900 is connected to a surface of a vehicle part 1901B. Vehicle parts 1901A and 1901B may be, for example and not limitation, a roof, side panel, door, seat, seatback, window, or mirror. Because the display system is thin (because of the acute angle between the first and second element), it is substantially flush with a surface of the vehicle, and any recessed cavities will take up little space to house it when not in use. A bulkier display will jut out more and will usually require mechanisms to collapse it when not in use or require more space within the vehicle.

There are limitations to the placement of the present invention, dictated by its lateral size, distance to a viewer, and viewing direction to see the obliquely oriented virtual image. Specifically, an imaginary line that extends from the viewer's eyes to the virtual image must pass through the aperture optic (or the geometric surface where an aperture optic may be placed). This would not be the case, for example, for display systems with relatively small lateral dimensions that are positioned closer to a viewer.

Figure 19C:
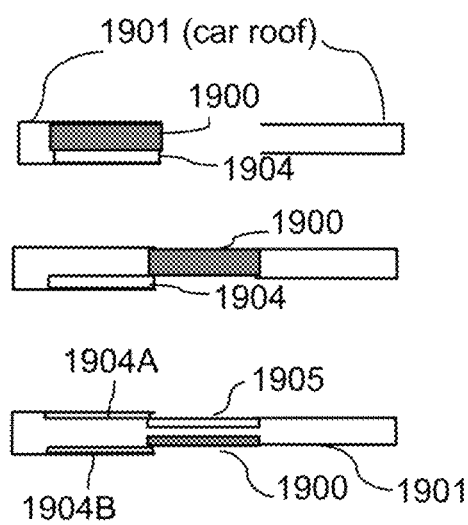
Figure 19E:
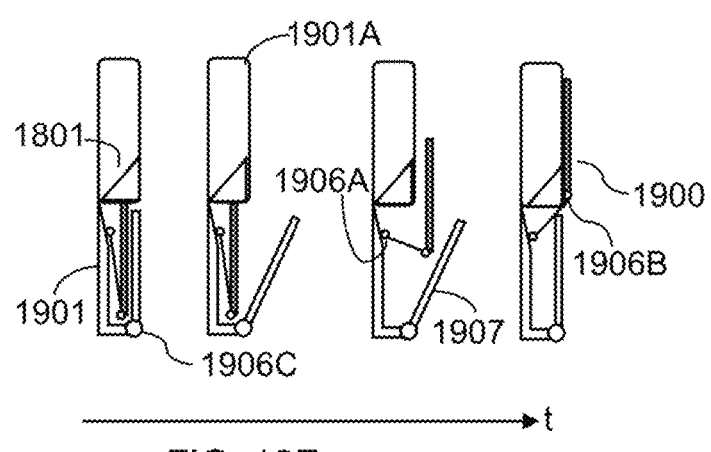
Figure 19B:
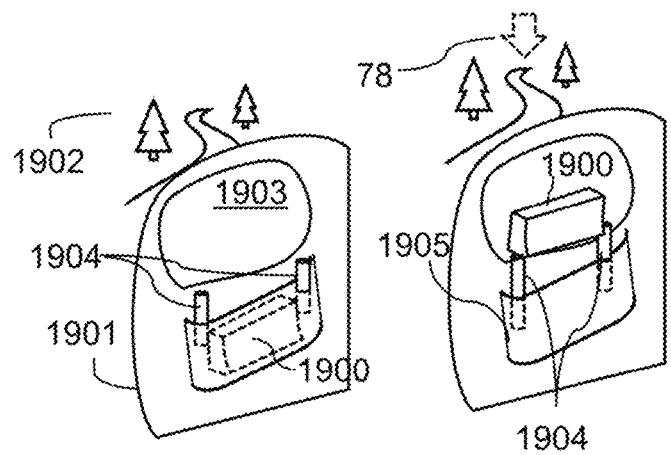

FIG. 19B shows an embodiment in which a display system 1900 is set in a first position in a pocket 1905 or recessed region of a vehicle part 1901. The display system is moved into place, for example, over a window 1903, by a mechanical track 1904. Through the window, an external scene 1902 is visible. With the display system in place, a see-through AR effect is generated, and a virtual image 78 is formed over the scene. In some embodiments, the display system produces augmented reality using see-through video: a camera attached to an external part of the vehicle captures the external scene and displays the captured information on the display of the display system itself.

FIG. 19C shows an embodiment in which the display system 1900 is integrated into a vehicle part 1901 that is a car roof, and the display system is at least partially see-through. A mechanical track 1904 slides the display system into place from a recessed cavity within the roof. In some embodiments, the display system acts as a vehicle sunroof or window. In some embodiments, there is a separate sunroof 1905, and the display system and sunroof are independently controlled by a first mechanical track 1904A and a second mechanical track 1904B.

Figure 19D:
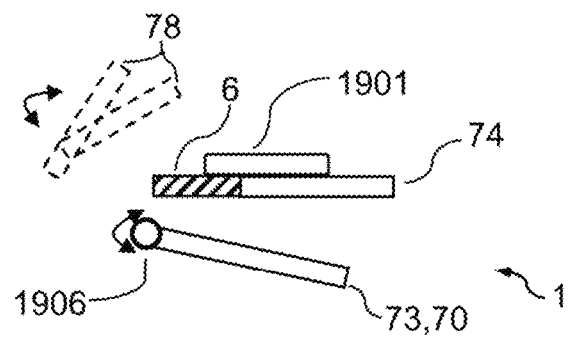

FIG. 19D shows an embodiment in which a portion of the display system is mechanically adjustable relative to the other components to modify the position and orientation of the virtual image. Display 6 is fixed to a vehicle part 1901 and light from the display is reflected by a first element 73, then reflected by a second element 74, and then transmitted by the first element 73 and through an aperture optics 70. The aperture optic and first element are rotatable by a hinge 1906 which has the effect of shifting and rotating the virtual image 78. That is, the rotation changes the viewing experience during use of the display system. In some embodiments, the hinge is motorized. In some embodiments, a user directly adjusts the hinge. The hinge is an example of a moveable joint, which includes hinges, ball joints, or tracks along with the display system, or an element of it may move relative to the vehicle. A hinge includes at least a first portion and a second portion that move relative to one another. For example, the first portion may be secured to a vehicle part and the second portion to part or all of the display system.

FIG. 19E shows an embodiment in which the display system 1900 may reside in a recess portion within a vehicle part 1901. A pair of hinges 1906A, 1906B move the display system in place, in front of a second vehicle part 1901A. A third hinge 1906C moves a panel 1907 to allow for the motion of the display system. The vehicle parts 1901A and 1901 may be parts of a seat within the vehicle. A circuit block 1801 may be used to control the motion of the hinges and display system as time evolves.

Figure 19F:
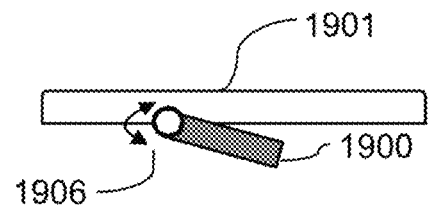

FIG. 19F shows an embodiment that combines aspects of FIGS. 19A and 19D. Here, the entire display system 1901 is connected to a vehicle part 1901 via a hinge 1906, which may be articulated to adjust the entire display system. The position of the resulting virtual image changes, but its position relative to the display system is fixed. In some embodiments, the hinge is instead an articulated arm or ball joint that may rotate the display system in multiple directions, i.e., that may rotate it about different axes of rotation.

In any of the embodiments above, the mechanical integration—the levers, arms, hinges, and tracks, may be motorized and controllable through buttons integrated into the vehicle, or they may be manually adjustable based on a viewer's actions.

Figure 20A:
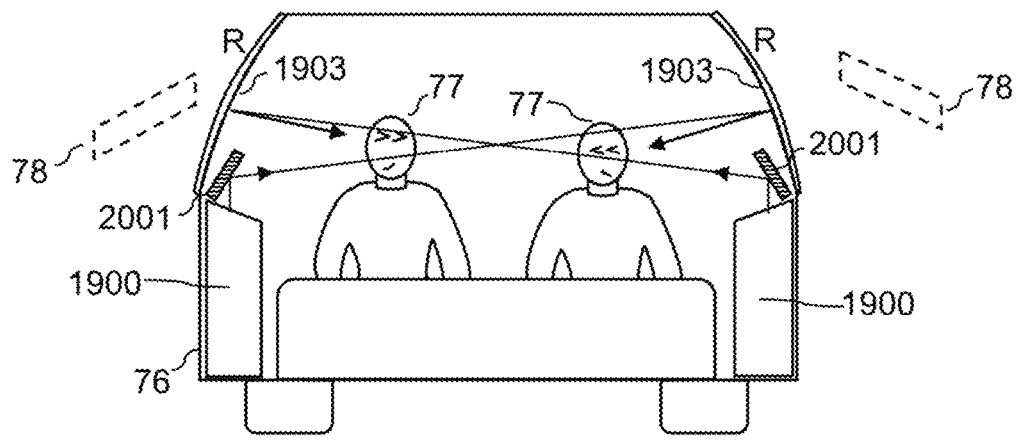
FIGS. 20A through 20E depict example applications of the display systems and field evolving cavities disclosed.

FIGS. 20A through 20E are example embodiments of applications of the display system in a vehicle. In FIG. 20A a vehicle 76 houses two display systems 1900. These may be the display systems described above. The light exits the display systems 1900 and is reflected across the vehicle by a mirror 2001. The reflected light is subsequently reflected again by the side windows 1903 and enters the eyes of the viewers 77. In some embodiments, the windows are curved with a radius of curvature R, such that they provide optical power and assist in collimating the light, forming virtual images 78 that have very far depths outside the vehicle.

Figure 20B:
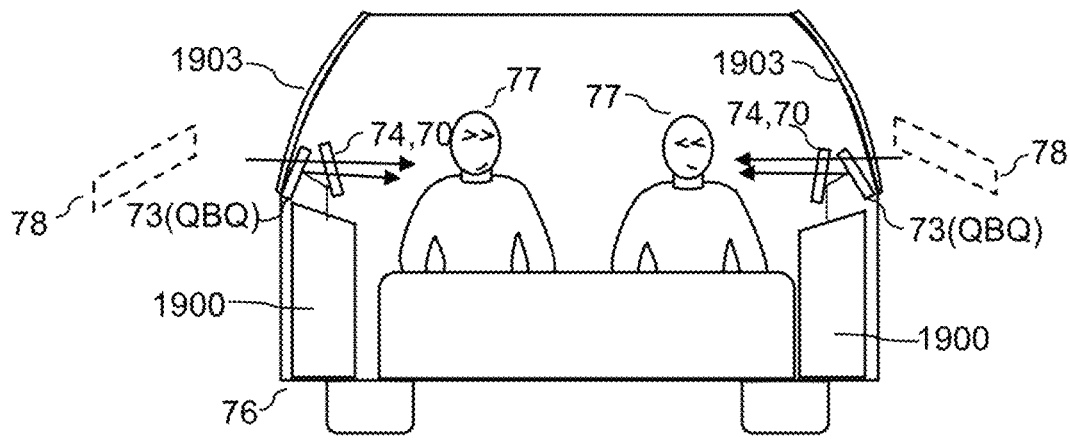

A similar embodiment is shown in FIG. 20B. The vehicle 76 has integrated into its sides display systems 1900. In this embodiment, the display system may have further external components to complete the imager formation. A second element 74 reflects light to a first element 73, which is a polarization-changing semi-reflector. The light is rotated by 90 degrees and is transmitted by the second reflector, which may be a reflective polarizer. The light then is viewed by the viewers 77 as virtual images 78. Because the first elements are semi-reflective, they allow light from the external environment to pass through, such that the overlaid virtual images create an AR environment.

Figure 20C:
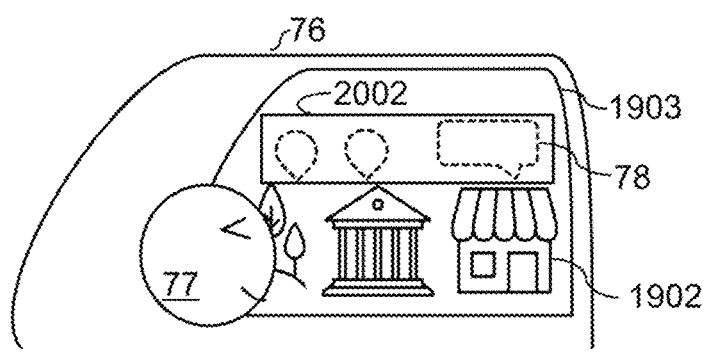

An example of such an environment is shown in FIG. 20C. Viewer 77 looks through the side window 1903 of the vehicle 76 and sees the external environmental scene 1902. A portion 2002 of the scene overlaps with the virtual image 78, which may include annotations. In some embodiments, the annotations are generated at least in part by a GPS module or navigation system.

Figure 20D:
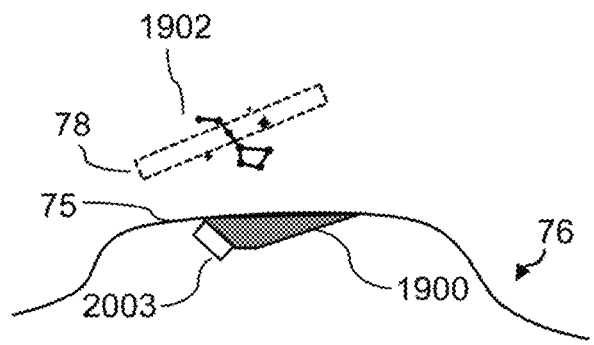

FIG. 20D shows an embodiment in which the display system 1900 is fixed to the roof 75 of a vehicle 76 to form a virtual image 78 above the vehicle. In some embodiments, the display system is partially transparent and allows external light to pass through it so that the external scene 1902 is simultaneously visible. In some embodiments a GPS module 2003 may be electrically coupled to the display system to produce content that depends on the vehicles coordinates or orientation relative to the environment. In some embodiments a simultaneous localization and mapping (SLAM) module is coupled to the display system. A SLAM module uses a computational algorithm to map out the vehicle's environment while simultaneously tracking the vehicle's position within the environment. Such algorithms include extended Kalman filter or the particle filter. Such a module is useful in particular for autonomous vehicles.

Figure 20E:
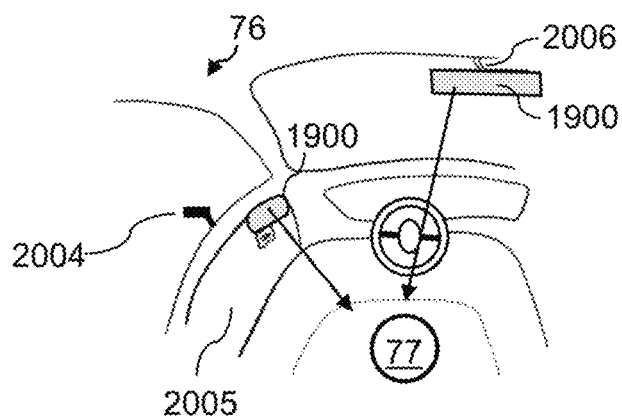

FIG. 20E shows an embodiment in which display systems 1900 are integrated to perform the function of conventional mirrors of the vehicle, similar to that of FIG. 16. In this embodiment content from the external environment is captured by a camera 2004 fixed to an external part of the scene. In some vehicles, the camera is approximately at the location of a conventional side mirror, and a side mirror is absent. The camera may capture information about the environment to the side of the vehicle and display it on the display system 1900 fixed to the interior of the vehicle 76, e.g., to an interior door 2005. In some embodiments, a camera captures information about the rear of the vehicle and displays it on the display system 1900 fixed to vehicle by an arm 2006, e.g., in place of a conventional rearview mirror. The advantage of this scenario, as compared to conventional "digital mirrors," which are simply display panels that replace the mirrors, is that the depths associated with objects in the external environment may be preserved by the depth of the display systems' virtual images.

Figure 21A:
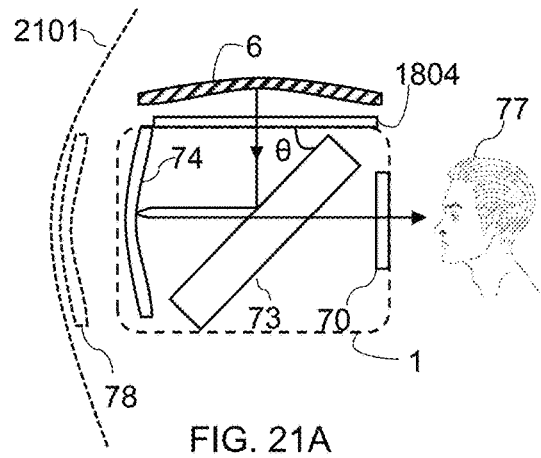

FIGS. 21A through 21J depict further embodiments of a field-evolving cavity and display for producing virtual images. In some embodiments, the display is a curved display, and at least one of the elements of the field-evolving cavity is curved. In FIG. 21A a curved display 6 emits light into a field-evolving cavity 1. In some embodiments, the light first passes through a pre-cavity element 1804, such as a directional film. The light is reflected by the first element 73, which makes an angle θ with respect to the curved display. In some embodiments, the angle is approximately 45 degrees. In some embodiments, the angle ranges from 35 to 45 degrees. In some embodiments, the angle ranges from 45 to 55 degrees. In some embodiments, the first element 73 is a semi-reflector, such as a beam splitter.

The light is then reflected by a second element 74 and directed through the first element 73 (i.e., the light is incident on the first element twice on the same surface). In some embodiments, the second element is a curved reflector. In some embodiments, the geometric shape of the curved reflector is a freeform surface. The light then exits the field-evolving cavity through an aperture optic 70 to be viewed by a viewer 77, who sees a virtual image 78. In some embodiments, the aperture optic is a quarter-wave plate or quarter-wave film layered on a transparent substrate.

Because of the curvature of the display 6 and of the second element 74, The geometric surface of the virtual image 78 is not flat. The geometric surface where a virtual image is located is called a focal plane. Thus, the focal plane is not flat in these embodiments. In some embodiments, the focal plane coincides with a portion of a human horopter 2101. The horopter is the locus of points in which the location of an image point on the left retina corresponds to the same location on the right retina. The horopter may be the empirical horopter or the theoretical horopter. In some embodiments, the horopter is the binocular horopter. In some embodiments the horopter is the oculomotor horopter. Image points on the human horopter are fused in the human vision system, so that a viewer sees a single, clear image point, instead of blurry vision. Thus, curved focal planes that are mapped to a human horopter provide both monocular depth cues and binocular depth cues. In some embodiments the second element is curved according to a freeform shape to match a horopter.

In some embodiments, the first element 73 is polarization dependent, and a quarter-wave plate is disposed between the first element 73 and the second element 74. In some embodiments as these, the aperture optic 70 may comprise a polarization and an antireflection element. In some embodiments, the pre-cavity element 1804 may include polarization-impacting elements, such as polarizers or wave plates to optimize the brightness of the virtual image.

In some embodiments, a horizontal dimension of the field-evolving cavity ranges from 30 to 40 cm. In some embodiments, a vertical dimension of the field-evolving cavity ranges from 15 to 25 cm tall. In some embodiments, a depth dimension of the field evolving cavity ranges from 5 cm to 20 cm deep. In some embodiments, the depth of the virtual image ranges from 1 m to 3 m, and a lateral dimension of the virtual image ranges from 75 cm to 130 cm.

In some embodiments, the mass of the field-evolving cavity and display together, including housing and framing, and the electronics and cables to drive the display system, ranges from 1.5 to 5.5 kg. In some embodiments, it ranges from 2.5 to 3.5 kg. Therefore, the display system is lighter than a standard display screen that provides comparable image sizes. The housing to support the display and field-evolving cavity may be plastic, metal, carbon fiber, aluminum, magnesium, alloy, or a composite material. In some embodiments, it is a thermoplastic, such as polylactic acid, polyethylene terephthalate, acrylonitrile butadiene styrene, polycarbonate, polyvinyl chloride, polymethyl methacrylate, and the like. The housing mass in some embodiments ranges from 1 kg to 3 kg. The first and second elements and the aperture optic may be made of optical materials, such as glass, polymer, plastic, and the like. In some embodiments, the combined mass of these elements ranges from 0.5 kg to 1 kg, or from 0.5 kg to 2.0 kg.

The curved display 6 and the curved second element 74 are chosen to produce a clear virtual image without significant aberration. Further, because the display system is integrated into a part of a car, such as the back of a headrest for a rear passenger, the system components must be small enough to fit. The curvature of the elements is necessary to overcome distortions of the virtual image within the viewable zone of the image.

Further, the curvature of the second element 74 and the curved display 6 may be shaped to pre-compensate image distortions. For example, when magnifying an image, a barrel distortion may be a resulting aberration: the virtual may be stretched substantially radially from a center point. The stretching may be modeled by a known transformation of the image content. The pre-compensation may be made by applying a pincushion transformation to the image content, where the pincushion transformation is the inverse of the (optically produced) barrel distortion. Typically, the transformation is a geometric warping, such as a polynomial warping. This is an example of correcting or pre-compensating a distortion lens distortion. Another type of distortion correction is perspective distortion correction. Other types of distortion compensation include perspective distortion compensation, which pre-compensates skewed based on off-axis reflections of optical elements. This can be pre-compensated using a homography transformation, keystone correction, and the like.

For example, the virtual image may have a barrel distortion that is produced by the nonuniform magnification of different elements of the image as they travel through a field-evolving cavity. The barrel distortion may be modeled as a function that transforms the image according to a polynomial function, such as $f(r)=r(1-kr^2)$, where r is the radial distance from the center of the image, and k is a system parameter. To pre-compensate this barrel, distortion, the inverse function g may be applied to the display content itself, where $g(r)=r/(1-kr^2)$. To apply this to the image, an algorithm may determine the pixel size of the display content, calculate the center pixel, create a matrix of the same pixel size of the image, and use g(r) to map each pixel value of the original display content to an element in the matrix. The radial distance is calculated by calculating the pixel distance between the pixel to be mapped and the center pixel. When all the pixels have been mapped, the matrix then becomes the new display content that is pre-compensated. The actual functions $f$ and g depend on the specific configuration and shapes of the optics elements in the display system. Other types of compensation algorithms may use an inverse function, look-up table, machine learning algorithm, or neural network. In some embodiments, the pre-compensation may affect the intensities of the pixels or the color profile.

Figure 21B:
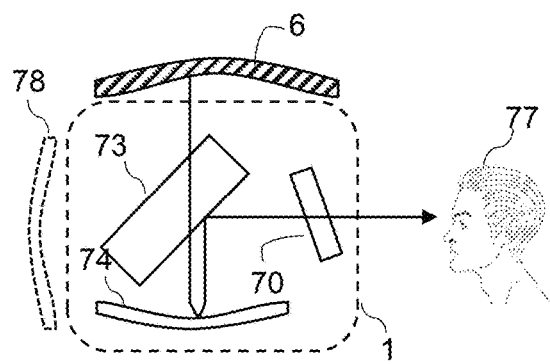

FIG. 21B shows an embodiment in which a curved display 6 emits light into a field-evolving cavity 1. The light is transmitted by a first element 73, is reflected by a second element 74, which may be a curved reflector. The reflected light is then incident on the first element 73 again, and exits through an aperture optic 70, such that a viewer 77 sees a virtual image 78 based on the display content of the curved display. In some embodiments, the aperture optic 70 is angled relative to the principal optical axis to deflect ambient light in a direction based on that angle. In some embodiments, the focal plane of the virtual image is curved and approximates a human horopter.

Figure 21C:
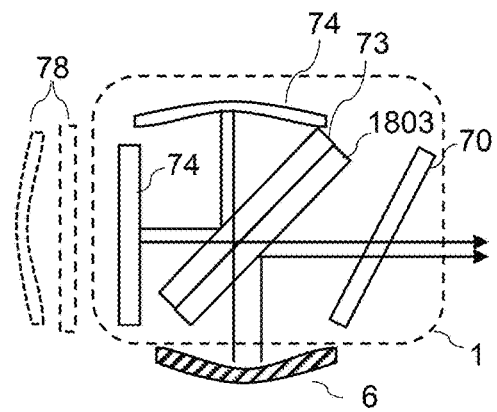

FIG. 21C depicts an embodiment that uses an EO material 1803. In some embodiments it is a liquid crystal that may change the polarization of transmitted light based on an applied voltage. Light from a curved display 6 enters a field-evolving cavity 1 and passes through the EO material 1803 to be incident on a first element 73, which may be a polarization-dependent reflector. In some embodiments, it is a reflective polarizer or a polarization-dependent beam splitter. If a first voltage is applied to the EO material, the polarization of the light incident on the first element 73 is such that it is reflected and then transmitted through the aperture optic. If a second voltage is applied, the polarization of the light incident on the first element 73 is such that it is transmitted, strikes a curved second element 74, is reflected by the first element 73, strikes a flat second element 74, and is transmitted through the first element 73 and through the aperture optic. In some embedment's, the flat second element 74 is polarization changing and includes a wave plate, such as a quarter-wave plate. In some embodiments, the aperture optic 70 includes a polarizer and an anti-reflection layer. In this way, one of two virtual images 78, which different depths and focal planes may be produced.

In some embodiments one of the focal places are curved and approximate a part of a human horopter. The curvature of the focal plane is determined by the curvatures of the display panel and the curved second element 74. The horopter shape in the vicinity of a fixation point depends on the fixation point itself. In some regions of a human's viewing field, it is convex, and in others it is concave. A horopter tends to be skewed vertically also, i.e., pitched away from a viewer from the bottom to the top.

Figure 21D:
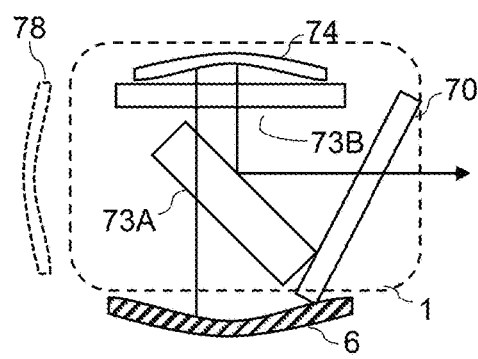

In FIG. 21D, light from a curved display 6 travels through. First first element 73A, then through a second first element 73B, is reflected by a second element, 74, which may be a curved reflector. It then passes through the second first element 73B, which may be a quarter-wave plate, and is reflected by the first first element 73A through the aperture optic to produce a virtual image 78. In some embodiments, the first first element 73A is a polarization-dependent reflector.

FIG. 21E shows an embodiment with multiple curved elements. Light from a curved display 6 enters a field-evolving cavity 1. The light strikes a first element 73, which is a curved semi-reflector. It strikes a second element 74, which is a curved reflector, is transmitted by the first element through the aperture optic 70, such that a viewer 77 sees a virtual image. The combined curvatures of the first element 73 and second element 74 can be used to modify the focal plane, the virtual image depth, the focal plane's approximation to a certain horopter, or correct or pre-compensate image distortion. In some embodiments, the curvatures of each of the elements are in largely perpendicular directions. In some embodiments, the aperture optic 70 is curved.

In FIG. 21F, a curved display emits light into a field-evolving cavity. It is transmitted by the first element 73, which is a curved semi-reflector, reflected by a second element 74, which is a curved semi-reflector, and then experiences a round-trip path between the first element 73 and the second element 74 before being transmitted to a viewer 77. Any of the elements of the field-evolving cavity may have optical power to further focus or collimate the light.

FIG. 21G shows an embodiment that uses multiple field-evolving cavities. Light from a first curved display 6A transmits light through a first field-evolving cavity 1A, which may be, for example, the field-evolving cavity described in FIG. 21A. The light is then transmitted through a second curved display 6B, which is semi-transparent, such that the first display's light is transmitted, and new display content is emitted. Light from both displays is transmitted to a second field-evolving cavity 1B, which may be the field-evolving cavity described in 21F. The result is a set of virtual images 78. In some embodiments, each of the focal planes is curved and each approximates a human horopter.

Last, FIG. 21H shows an embodiment in which a curved display 6 emits light into a field-evolving cavity 1, the field evolving cavity may include a lensing element 2102, such as a Fresnel lens, to provide optical power. The focal length of the lensing element may be such to collimate the light, producing a virtual image that is farther from a viewer.

FIG. 22A and FIG. 22B show tables containing the possible sequence of three-step movements to deploy a display system from its storage location to in front of a viewer (e.g., display system 1900 and viewer 77 shown in FIGS. 19A-19F, 23A-23F, 24A-24E, and 25A-25J). Each movement is further decomposed in three simple movements: i) translational, ii) rotational, and iii) relative folding movement.

FIGS. 23A through 23F depict different locations to store display system 1900 and the possible simple movement to bring display system 1900 in front of viewer 77.

Figure 23A:
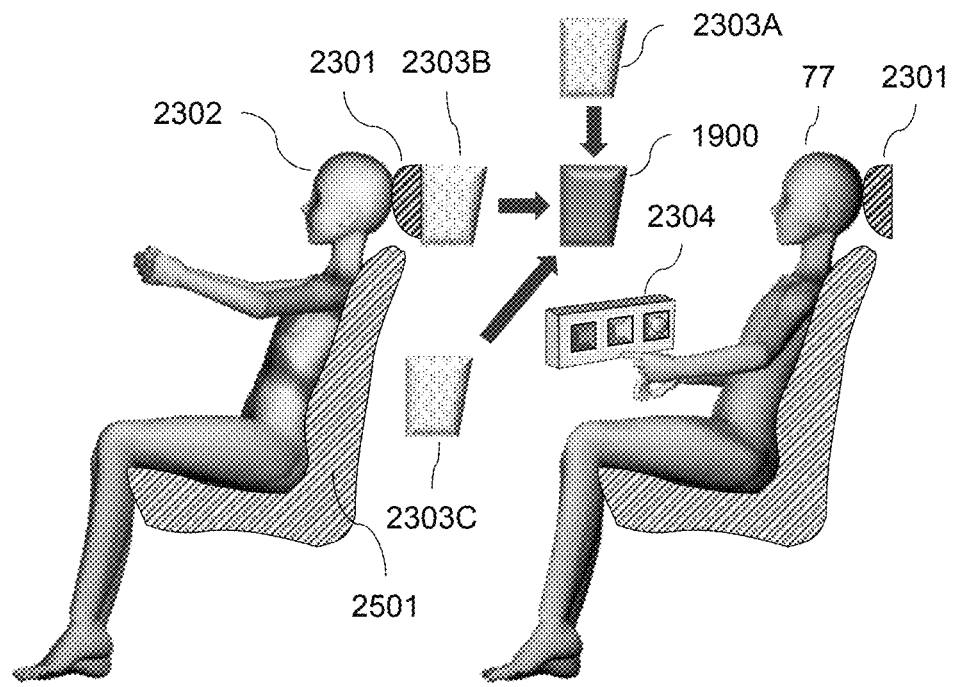
FIGS. 23A through 23F show various embodiments of the generic position of a display system within a vehicle and some mechanisms of coupling the display system to the vehicle.

FIG. 23A depicts a side view of viewer 77 and driver or frontal passenger 2302 in which display system 1900 can be stored in a vertical plane parallel to line of sight of viewer 77. Display system 1900 can be put in front of viewer 77 by a simple translational movement. For instance, display system 1900 can be stored on top of cockpit 2303A, or behind 2303B of headrest 2301, or at the bottom 2303C of back seat 2501 of driver or frontal passenger 2302. Viewer 77 can store or deploy display system 1900 through interface 2304.

Figure 23B:
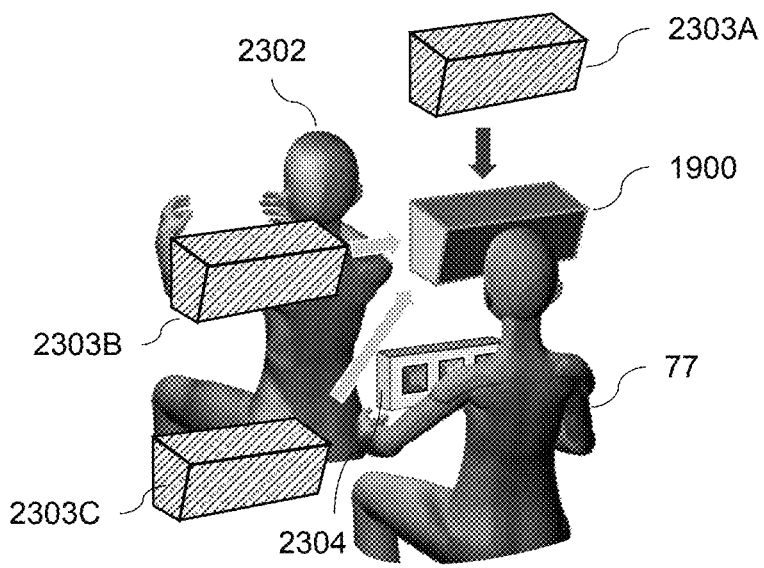

FIG. 23B depicts a rear view of viewer 77 in which display system 1900 can be stored on locations contained in a vertical plane perpendicular to the line of sight of viewer 77. Display system 1900 can be put in front of viewer 77 by a simple translational movement. For instance, display system 1900 can be stored on top of cockpit 2303A, to the side 2303B of headrest, or at the bottom and left or right 2303C of driver or frontal passenger 2302. Viewer 77 can store or deploy display system 1900 through interface 2304.

Figure 23C:
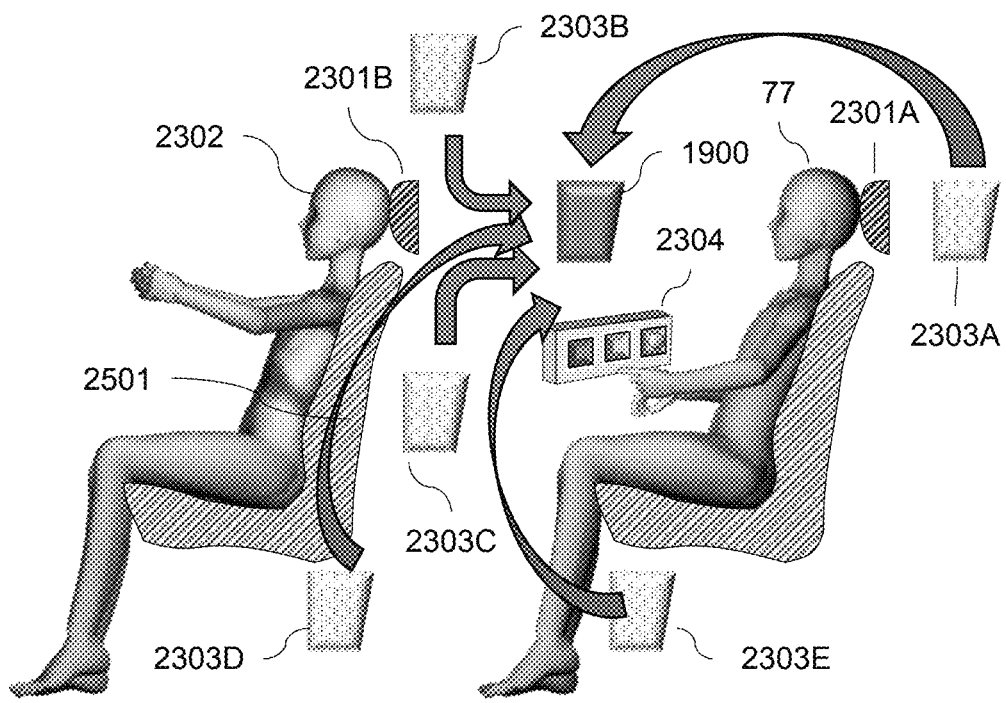

FIG. 23C depicts a side view of viewer 77 and driver or frontal passenger 2302 in which display system 1900 can be stored in a vertical plane parallel to line of sight of viewer 77. Display system 1900 can be put in front of viewer 77 by a simple rotational movement. For instance, display system 1900 can be stored behind viewer's headrest 2301A, on top of the cockpit 2303B, or below 2303C of headrest 2301B, or at the bottom 2303D of back seat 2501 of driver or frontal passenger 2302, or below viewer's seat 2303E. Viewer 77 can store or deploy display system 1900 through interface 2304.

Figure 23D:
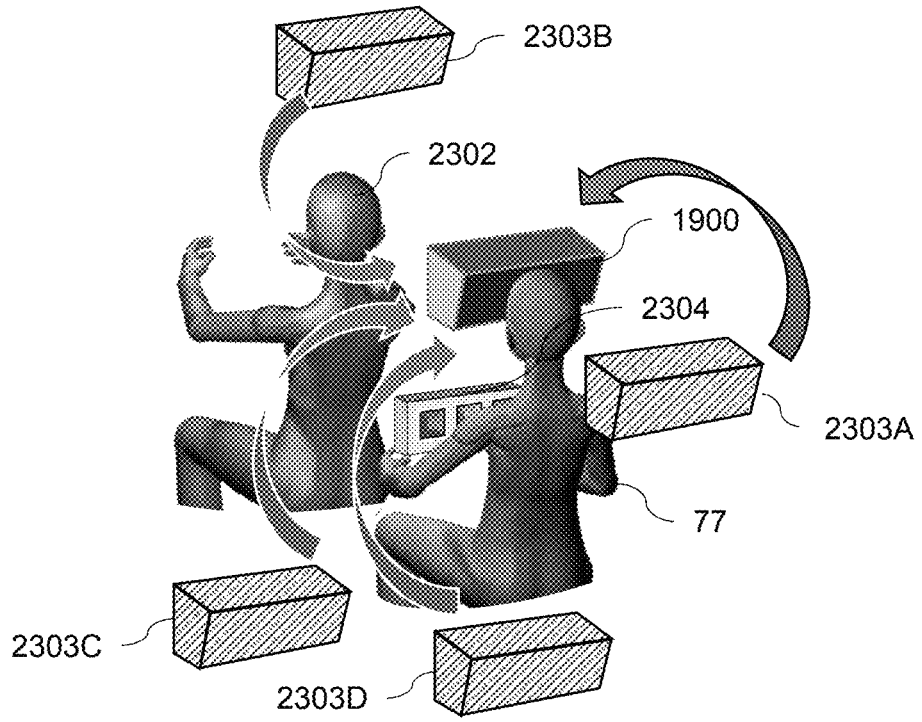

FIG. 23D depicts a rear view of viewer 77 in which display system 1900 can be stored on locations contained in a plane surrounding viewer 77. Display system 1900 can be put in front of viewer 77 by a simple rotational movement. For instance, display system 1900 can be stored behind 2303A viewer 77, or on top of cockpit 2303B, to the side 2303C of driver or frontal passenger 2302, or below 2303D viewer 77. Viewer 77 can store or deploy display system 1900 through interface 2304.

Figure 23E:
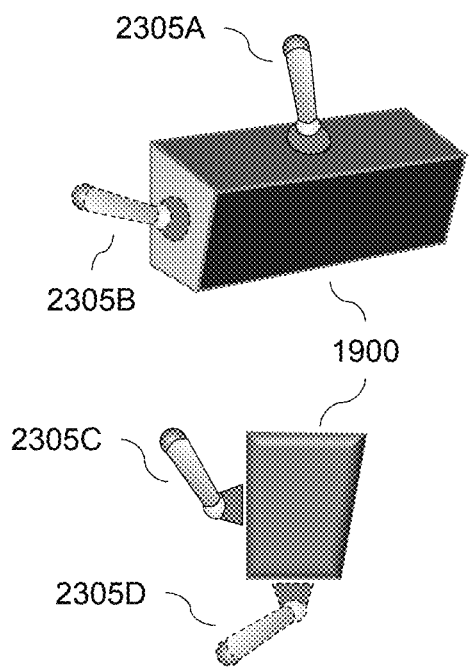

FIG. 23E depicts a perspective and side views of possible direct attachment points of support or arm 2305 to display system 1900. The attachment points could be on top 2305A of display system 1900, or on the side 2305C, or behind 2305C, or at the bottom 2305D.

Figure 23F:
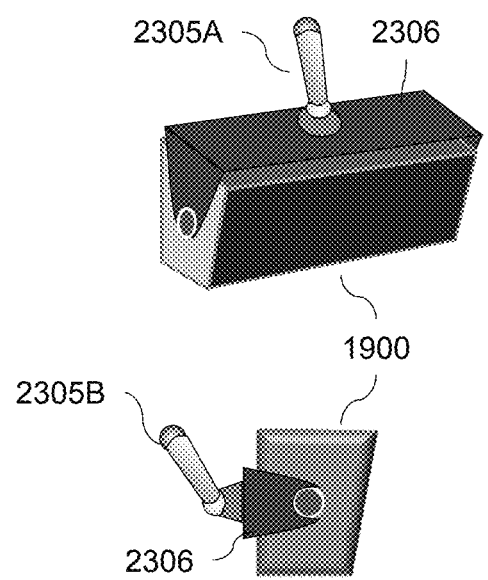

FIG. 23F depicts a perspective and side views of possible attachment points of support or arm 2305 to a gimbal-type mount 2306 supporting display system 1900. The attachment points could be on top 2305A of gimbal-type mount 2306, or on the side 2305C, or behind 2305C, or at the bottom 2305B.

Figure 24A:
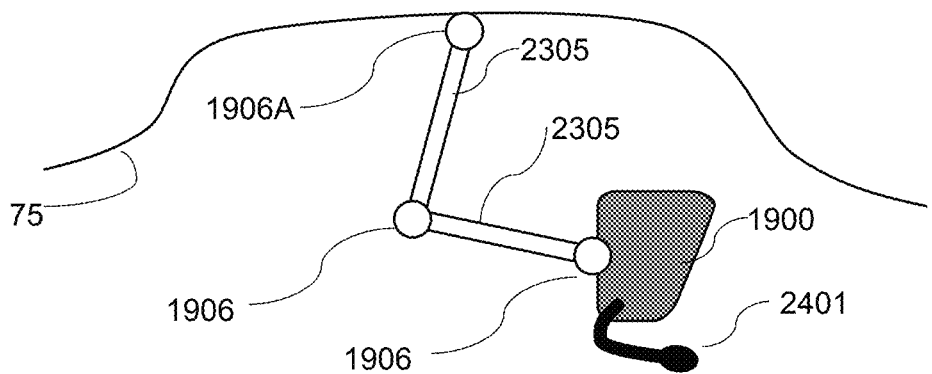
FIGS. 24A through 24E show further specific mechanical coupling mechanisms, including telescoping arms, articulated joints and arms, and hinges.
Figure 24B:
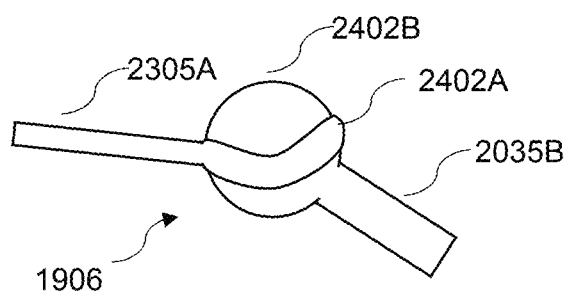

FIGS. 24A through 24E show a set of embodiments that integrate a display system into a vehicle using various articulated or telescoping joints. These are certain examples of the types of motion described above. FIG. 24A shows a display system 1900 integrated into a car roof 75 via a set of arms 2305 and joints or hinges 1906. The hinges may be one-dimensional hinges, or they may allow rotation in multiple dimensions. The display system also has a handle 2401 for a user to manually adjust the position. An example of a hinge 1906 which allows multiple rotation axes is shown in FIG. 24B. The end of a first arm 2305A ends in first joint element 2402A, which may be a socket. The end of a second arm 2305B ends in a second joint element 2402B, which may be a ball.

Figure 24C:
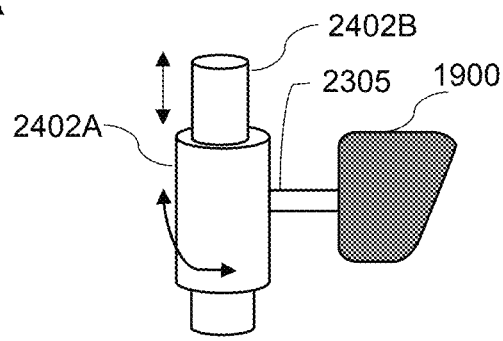

Another example of vehicle integration is shown in FIG. 24C. A display system 1900 is connected to an arm 2305 which is connected at its other end to a first joint element 2402A. This may be a sleeve that wraps around a second joint element 2402B, which may be a cylinder. The first joint element can rotate around an axis through the second joint element. It may also slide vertically upward or downward. In any of these embodiments, the joint elements may include notches or locking mechanisms for stability of positioning and for repeated placements of the display system in the same orientation.

Figure 24D:
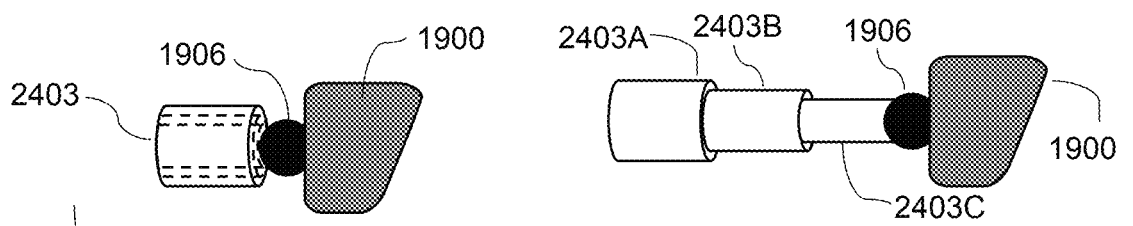

FIG. 24D shows an embodiment in which a display system 1900 is coupled by a hinge 1906 to a telescoping mechanism 2403. When extended the telescoping mechanism extends into a first telescoping sleeve 2403A, a second telescoping sleeve 2403B, and a third telescoping sleeve 2403C. In some embodiments, the hinge is a gimbal mount hinge. In some embodiments, it is an articulated joint or ball joint.

Figure 24E:
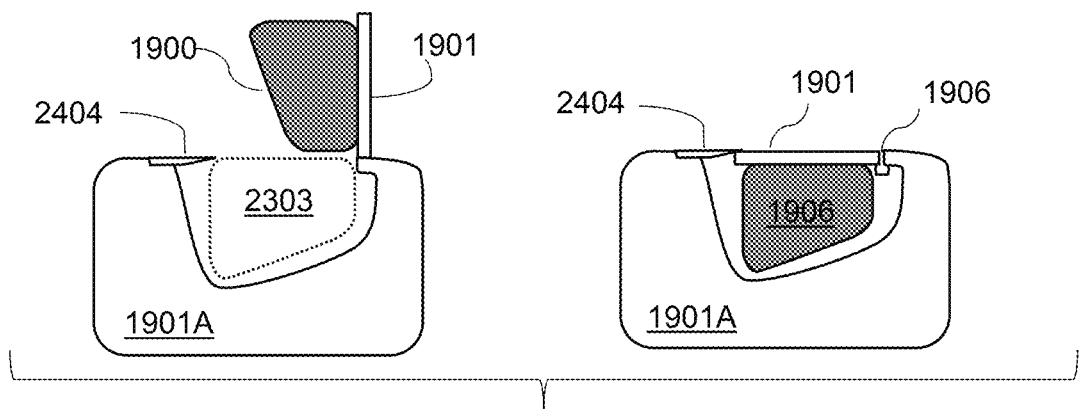

FIG. 24E shows an embodiment in which a display system is mounted to a part of a vehicle 1901, wherein the part is mounted by a hinge 1906 to a secondary part of a vehicle 1901A. In the viewing configuration, the display system is exposed and visible outside the secondary part, which has a recessed area or compartment 2302. The hinge is flush at 90 degrees and at 0 degrees so there are no gaps between the part of the vehicle and the secondary part of the vehicle. When the display system 1900 is put away and housed in compartment 2302, a non-porous lip 2404 may be provided to hide any seams or gaps.

Figure 25A:
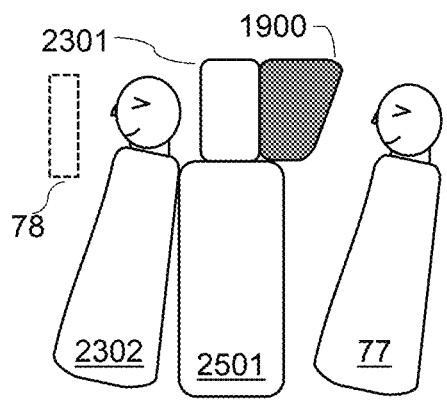
FIGS. 25A through 25J show various positions within the vehicle a display system may be integrated.
Figure 25B:
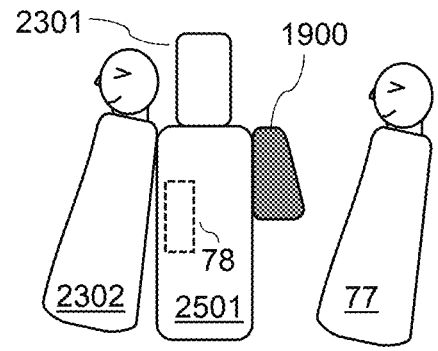
Figure 25C:
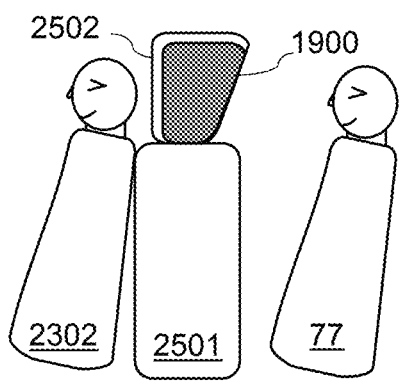
Figure 25D:
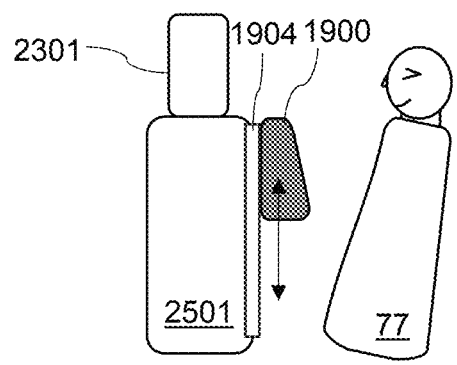

FIGS. 25A through 25J show various locations where the display system may be integrated into the vehicle. In FIG. 25A, a viewer 77 views the display system 1900, which is mounted behind the headrest 2301 of a seat 2501 that is used by another passenger 2302 of the vehicle. In some embodiments, the virtual image 78 has a depth that is on the opposite side of the seat 2501 as the viewer 77. In this example, the front passenger does not see any virtual image. In FIG. 25B, the viewer views the display system 1900, which is mounted to the seatback of seat 2501, positioned below the headrest 2301, which is used by another passenger 2302. In some embodiments, the virtual image 78 is deeper than the display system. FIG. 25C shows an embodiment in which the display system 1900 replaces a headrest. The front passenger 2302 is protected by padding 2502 that surrounds the display system. The viewer 77 is in the same position behind seat 2501. In FIG. 25D, the viewer 77 views the display system 1900, which is mounted to the back of seat 2501 by a linear track 1904 that can move the system up or down. In some embodiments, nothing is attached to the headrest 2301.

Figure 25E:
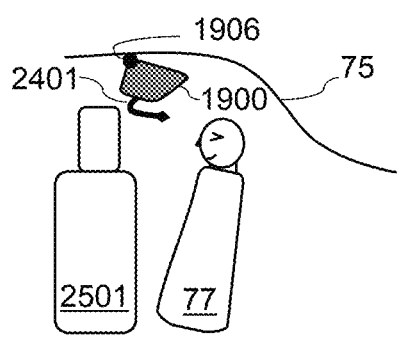
Figure 25F:
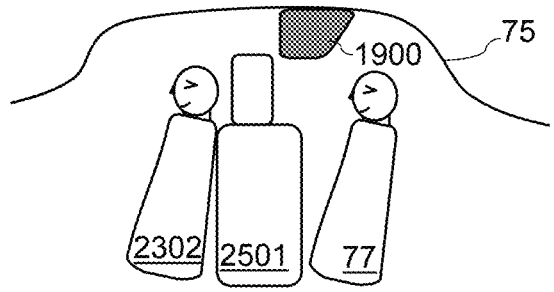

FIG. 25E shows an embodiment in which the display system 1900 is mounted by a hinge 1906 to the roof 75 of a vehicle. A handle 2401 may be used by a viewer 77 to adjust the system's position. In some embodiments, the viewer is a rear passenger sitting behind seat 2501. In some embodiments, such as that in FIG. 25F, the display system 1900 is mounted directly to the roof 75 of the car for a viewer 77 who is sitting behind a seat 2501 for another passenger 2501.

Figure 25G:
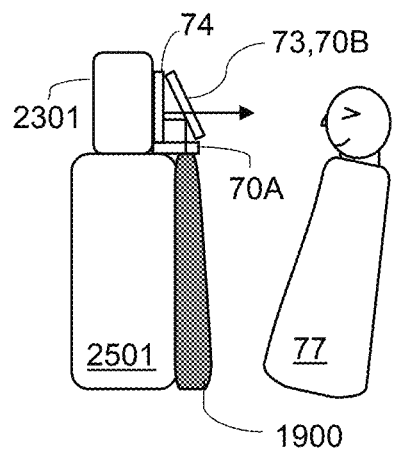
Figure 25H:
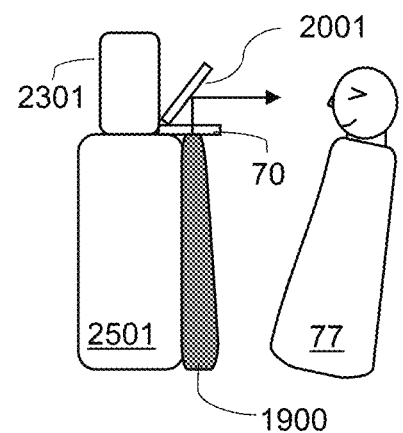

FIG. 25G shows an embodiment of vehicular integration in which the display system 1900 is mounted to the back of seat 2501 and directs light through a first aperture optic 70A into a region behind the headrest 2301. The light is then reflected by a first element 73, reflected by a second element 74, and transmitted by the first element 73 and a second aperture optic 70B toward a viewer 77. In some embodiments, the light transmitted through the first aperture optic 70A may be polarized. The first element may be a polarization-dependent semi-reflector, such as a reflective polarizer. The second element may be a reflector and a quarter-wave plate to rotate the polarization In FIG. 25H, a similar display system 1900 mounted to a seat 2501 directs light vertically through an aperture optic 70, which is then reflected to a viewer by a mirror 2001.

Figure 25I:
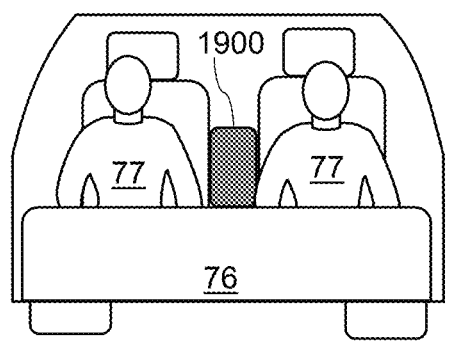
Figure 25J:
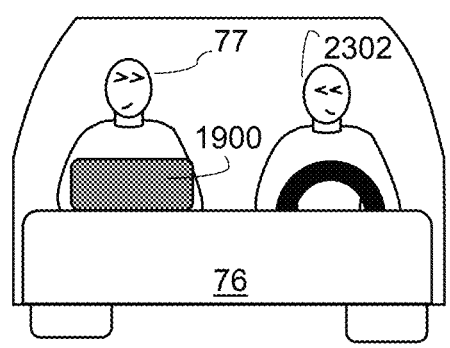

FIG. 25I shows an embodiment in which two viewers 77, who may be sitting the backseat of a vehicle 76 are simultaneously viewing a display system 1900 that is integrated between the seats of a car. Similarly, in FIG. 25J, vehicle 75 is being controlled by a passenger who is a driver 2302, and a front passenger is a viewer 77 of the display system 1900, which is integrated in the front portion of the cabin.

Figure 26A:
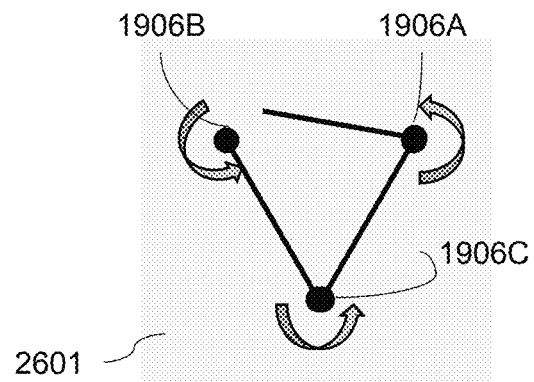
FIGS. 26A through 26C show generic rotational methods of the components of a display system, used for collapsible display systems in a vehicle.
Figure 26B:
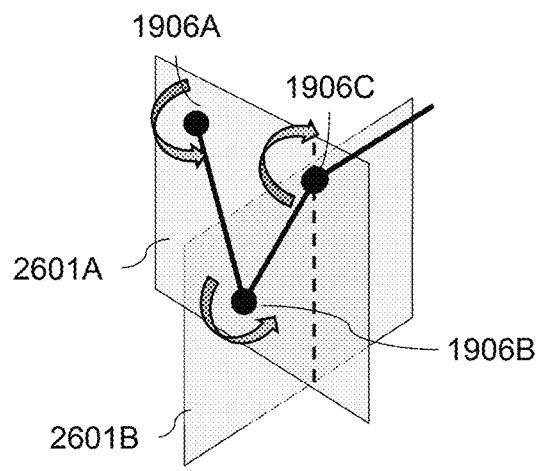
Figure 26C:
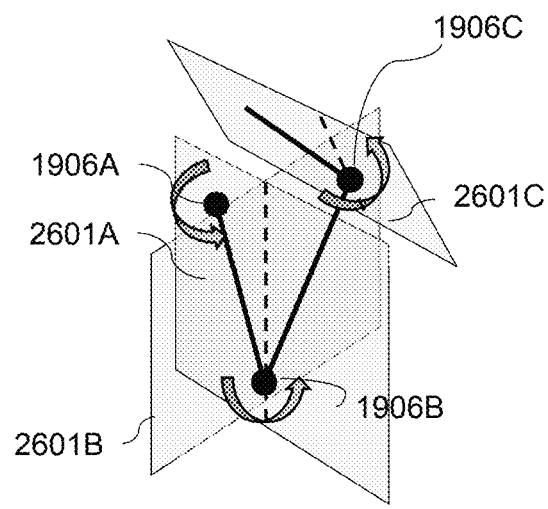

FIGS. 26A through 26C depict the different rotational degrees of freedom that three sequentially attached components can be unfolded. Each rotational degree is contained within a plane that contains the angle in which two components connected by a joint can be rotated with respect to each other.

FIG. 26A depicts the case in which all rotational degrees of freedom are contained within the same plane 2601, which also means that angles 1906A, 1906B, and 1906C are all co-planar. For example, in this case, all elements of display system 1900 will unfold sequentially in one direction.

FIG. 26B depicts the case in which two rotational degrees of freedom 1906A and 1906B are contained in a single plane 2601A, whereas a third rotational degree 1906C is contained in a different plane 2601B respect the first plane 2601A. For example, in this case, the first two elements 73 and 74 of display system 1900 are unfolded in the same direction whereas the third element is unfolded in a different direction.

FIG. 26C depicts the case in which all rotational degrees of freedom are in different planes. For instance, the first rotation 1906A is contained in plane 2601A, the second rotation 1906B is contained in plane 2601B, and the third rotation 1906C contained in plane 2601C. This is the case where all three elements are unfolded in different directions.

Figure 27A:
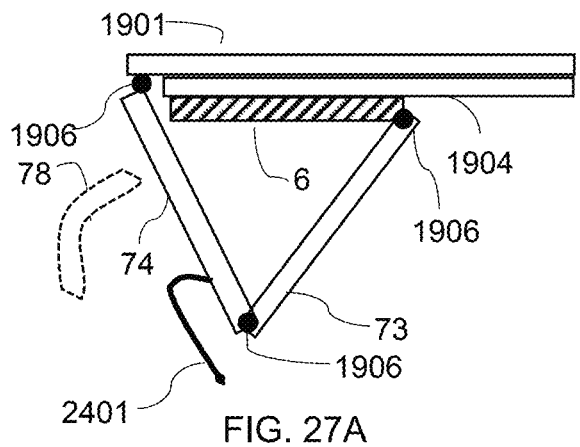
FIGS. 27A through 27O show various mechanisms of articulated components of the display system to produce collapsible display systems or foldable display systems.
Figure 27B:
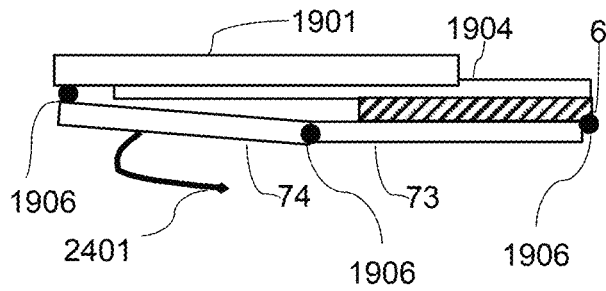

FIGS. 27A through 27O show example embodiments of collapsible displays, wherein the components or elements of the display system (the display, first and second elements, aperture optic, and the like) are allowed to move or fold relative to each other. Some of these are specific examples of the types of motion in FIGS. 26A through 26C. In FIG. 27A, a part of a vehicle 1901 is connected to a mechanical track 1904. In some embodiments, the mechanical track is multiple parallel mechanical tracks. In some embodiments, a rigid guide bar is connected to the multiple tracks such that they move in unison. Display 6, which may be a curved display, is mounted to the track and moves with it. On one end of the display is a hinge 1906 that connects to the first element 73 of a field-evolving cavity. The other end of the first element has another hinge that couples to a second element 74. This element has a hinge 1906 mounted to a part of the vehicle 1901. The position of this hinge is fixed but is free to rotate. In some embodiments, handle 2401 may be connected to a part of the display system for a user to collapse the display. In the viewing position, the display system produces a virtual image 78. In some embodiments, the focal plane is curved and maps to a portion of a human horopter. The collapsed configuration of the embodiment of FIG. 27A is shown in FIG. 27B. When the track 1904 is engaged, it slides the display 6 to the right, and the first element 73 and the second element 74 rotate about their hinges 1906. When the mechanical track has moved the display full to the right, the first and second elements are largely flush with the part of the vehicle 1901 to which the display and track are mounted. In some embodiments, the tracks are motorized and engaged/disengaged with electrical signals from an interactive interface, lever, or button. In some embodiments, these elements are integrated into handle 2401.

Figure 27C:
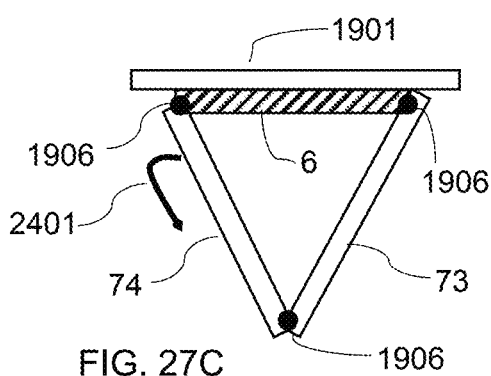
Figure 27D:
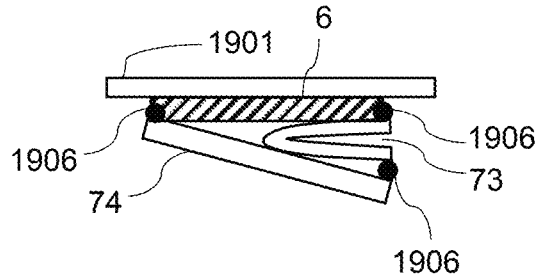

FIG. 27C shows a similar embodiment: a display 6 is mounted to a part of a vehicle 1901 and is fixed in position. Hinges 1906 couple the display to the first element 73 and the second element 74 of the display system. In some embodiments, a handle 2401 is used to engage the collapsing mechanism of the hinges 1906. In some embodiments, the first element 73 is flexible, and the collapsed configuration of such an embodiment is shown in FIG. 27D. The flexible first element 73 maybe be flexible glass or plastic semi-reflectors. When the system is collapsed, the first element 73 folds on itself so that the entire display system is largely flush with the part of the vehicle 19901. In some embodiments, the flexible elements may be rolled. In some embodiments, the display is a flexible OLED display and can be rolled and unrolled as part of the collapsing mechanisms. In some embodiments, the components of the display system are piecewise rigid, i.e., a given component consists of rigid, subcomponents that are coupled by hinges which can fold the component into a footprint of size comparable to a subcomponent. In such embodiments, pre-compensation techniques are used to eliminate seams or edge artifacts in the virtual image. In some embodiments, further physical components are used to compensate the seams.

Figure 27E:
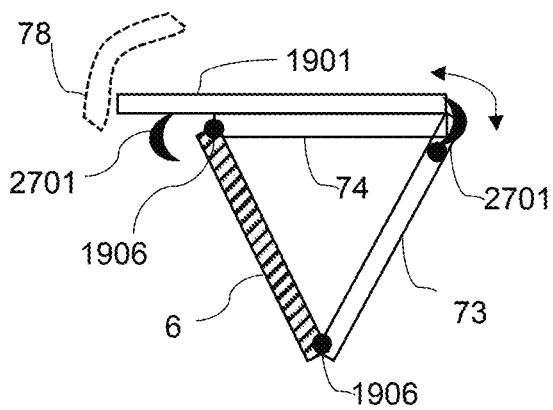
Figure 27F:
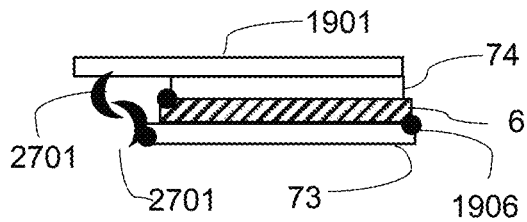

FIG. 27E shows a collapse system in which a display 6 is coupled to a first element 73 and a second element 74 by a series of hinges 1906. The second element 74 is mounted to a part of a vehicle 1901. In some embodiments, the display is a curved display, and the second element is a curved reflector. A series of latches 2701 lock the display into a configuration for viewing virtual images. FIG. 27F shows the same embodiment in the closed or collapsed orientation. The latch 2701 collected to the first element 73 is disconnected from the part of the vehicle 1901, such that the hinges 1906 are free to rotate. The elements of the display system are largely flush with each other, and the two latches 2701 are connected together to fix the components in place.

Figure 27G:
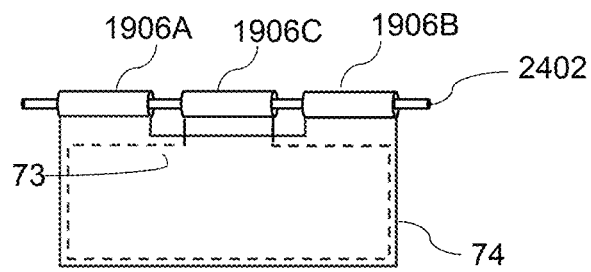

FIG. 27G shows an example of two components of the display system, such as a first element 73 and a second element 74 moveable relative to each other. They are attached by a series of hinges 1906A, 1906B, and 1906C to a part of a joint 2402, such that the elements are free to rotate about an axis through that part.

FIG. 27H shows an embodiment of a collapsible display system with an aperture optic 70. Display 6, which may be curved, is mounted to a part of a vehicle 1901. Display 6, first element 73, and second element 74 are coupled to each other by a series of hinges 1906. An aperture optic 70 is also coupled to the first element 73 by a hinge 1906. The aperture optic is also locked into a position by a latch 2701 connected to a support bar 2702. The first element is also locked to the part of the vehicle 1901 by latch 2701. To collapse the aperture optic, the first latch 2701 is released, and the support bar 2702 is folded backward to lie along the second element 74. The aperture optic 70 can now be collapsed and flush with the first element 73. This is shown in FIG. 27I. Now the system is the same as that shown in FIG. 27E, which can be collapsed further into the geometry of FIG. 27F.

FIG. 27J shows an embodiment in which display 6, and the first element 73 and second element 74 of a field-evolving cavity 1 are substantially parallel to each either. They are connected to each other by folding linkages 2703. In the viewing position, the linkages are extended. The collapsed position of this embodiment is shown in FIG. 27K. The folding linkages 2703 are collapsed as alternating hinges move away from the field-evolving cavity. In some embodiments, the linkages are motorized. In some embodiments, the linkages are Scott-Russell-type linkages.

FIG. 27L shows an example embodiment in which the field-evolving cavity 1 is mounted to a display housing 2704, which is hollow. The display housing is wide enough for a portable device 2705 to be inserted into it. In some embodiments, the portable device is a tablet, foldable laptop, or smart phone. FIG. 27M shows operation of the embodiment of FIG. 27L. When the portable device 2705 is inserted into the housing 2704, its display content enters as a first light signal 2707A into the field-evolving cavity 1. The light is processed by the elements of the cavity and exits as a second light signal 2707B to the viewer 77, who sees a virtual image 78. The virtual image is based on the display content of the portable device. FIG. 27N shows that the display housing 2704 has a top surface 2704A and a bottom surface 2704B. The bottom surface consists mainly of guide rails to support the portable device 2704 but is largely transparent to allow light from the device to be transmitted to a field-evolving cavity. FIG. 27O shows the underside of the housing. The bottom surface 2704B is a guiding track around the edge, such that the portable device 2705 is visible. Adjustable alignment clamps 2706 hold the portable device in place. The alignment clamps have the further function of being adjustable in two or three dimensions to position the device for proper virtual image production. In some embodiments, the positions of the alignment clamps are determined based on an electronic signal for an interactive interface or on a wired or wireless signal from the portable device itself. These various signals contain information about the specific product, model number, dimensions, and the like, such that the clamps' positions are optimized for image quality.

Figure 28:
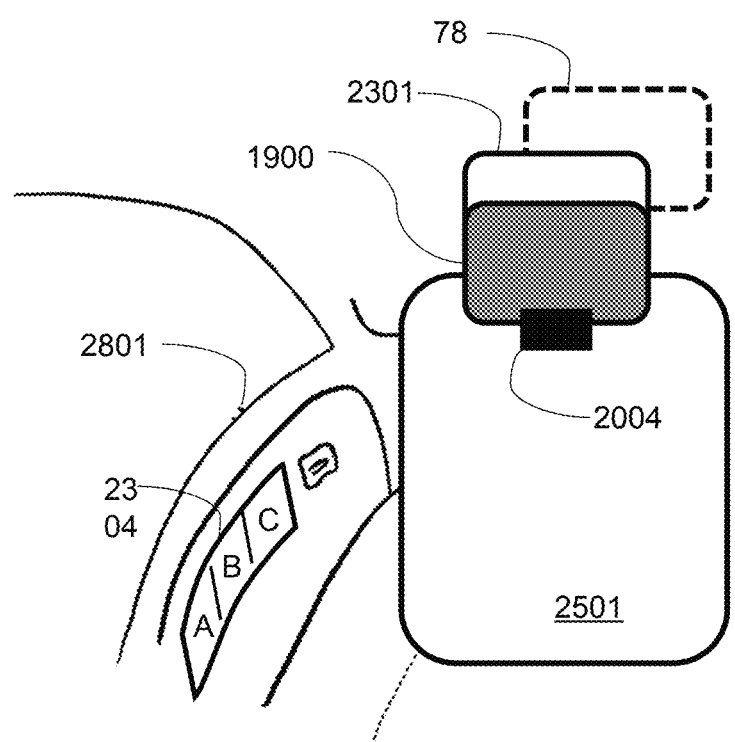
FIG. 28 shows an example embodiment of a display system controlled by an interactive interface.

FIG. 28 shows an embodiment in which the display system 1900 is mounted behind a headrest 2301 and/or a portion of a seatback 2501, primarily for a rear passenger. In this embodiment, the display content may be entertainment content. In some embodiments, the virtual image 78 is farther away than the display system 1900 and the seat 2501. On a vehicle door 2301 is integrated an interactive interface 2304, which may consist of a remote, buttons, touch screen, or gesture sensors. In some embodiments, the interface is integrated into a different part of a vehicle, such as a center console. The interface allows a passenger to modify the display content or to change the orientation or position of the display system. In some embodiments, the interface is coupled to mechanisms to move the various mechanical joints and arms that are coupled to the display system. In some embodiments, the interface allows the user to input information about the portable device used in the embodiment in FIGS. 27L through 27O so that the insert can optimally place the device for producing virtual images. In some embodiments, the interface will activate motorized hinges to collapse the display system according to, e.g., the embodiments of FIGS. 27A through 27O. In some embodiments, the display system comprises a field evolving cavity and a housing into which a portable device is placed (such as the embodiments in FIGS. 27L through 27O). In these embodiments, the interactive interface is programmed to allow a user to control the system parameters of the display system. The system parameters include parameters about the field evolving cavity, such as the spacing between the components or the relative orientation between them. Such control involves using the interactive interface to activate the mechanisms that couple the various components of the display system. The system parameters include the system properties of the display content on the portable device, such as refresh rate, display brightness, color profiles, font or image sizes, and the like. In some embodiments, the interactive interface is programmed to control the content of the portable device, such as the choice of content in an entertainment application, the active app being displayed, the features and navigation tools within an application, and the like.

In some embodiments, the display system includes a camera 2004 fixed to a portion of the display system or to the vehicle. The camera may be a webcam such that an image of a viewer of the display system is captured by the webcam and transmitted to the display system. In some embodiments, the captured image is communicated over a wireless network to another party with whom the viewer may be communicating through a teleconferencing application being shown on the display system.

Although the invention has been explained in relation to its preferred embodiment, it is to be understood that many other possible modifications and variations can be made without departing from the spirit and scope of the invention as hereinafter claimed.

In this document, various aspects may be described algorithmically. While exemplary algorithms may be provided, the desired functionality may be implemented in any suitable way. One of the skills in the art may implement such functionality or algorithms, for example, in hardware, in software, or in a combination of hardware and software. A module (e.g., "GPS module," "SLAM module") may comprise the hardware and/or software, to implement the functionality or algorithm disclosed. For example, in some embodiments an algorithm may be implemented through a module having one or more processors executing computer code stored on one or more non-transitory computer-readable storage media. In some embodiments, a functionality is implemented at least in part through a module having dedicated hardware (e.g., an ASIC, an FPGA). In some embodiments modules may share components. For example, a first function module and a second function module may both utilize a common processor (e.g., through time-share or multithreading) or have computer executable code stored on a common computer storage medium (e.g., at different memory locations).

In some instances, a module may be identified as a hardware module or a software module. A hardware module includes or shares the hardware for implementing the capability of the module. A hardware module may include software, that is, it may include a software module. A software module comprises information that may be stored, for example, on a non-transitory computer-readable storage medium. In some embodiments, the information may comprise instructions executable by one or more processors. In some embodiments, the information may be used at least in part to configure hardware such as an FPGA. In some embodiments, an algorithm may be recorded as a software module. The capability may be implemented, for example, by reading the software module from a storage medium and executing it with one or more processors, or by reading the software module from a storage medium and using the information to configure hardware.

In this document, the terms "machine readable medium," "computer readable medium," and similar terms are used to refer to non-transitory mediums, volatile or non-volatile, that store data and/or instructions that cause a machine to operate in a specific fashion. Common forms of machine-readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skills in the art after reading this document, the illustrated embodiments and their various alternatives can be implemented without confinement to the illustrated examples. For example, block diagrams and their accompanying description should not be constructed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in several ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain operations or processes may be distributed among computer systems or computers processors, not only residing within a single machine, but deployed across a number of computational resources.

As used herein, the term "or" may be constructed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be constructed as open ended as opposed to limiting. Adjectives such as "conventional," "traditional," "normal," "standard," "known," and terms of similar meaning should not be constructed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed:

1. A system comprising:
   a curved display to emit light; and
   a field-evolving cavity to direct the light from the display along a path to produce a virtual image, the field-evolving cavity having
   a semi-reflector positioned along the path;
   a curved reflector disposed along the path to reflect the light; and an aperture optic to transmit the light away from the field-evolving cavity to form the virtual image visible by a viewer's both eyes in a headbox spanning a lateral distance of at least 15 cm, wherein the lateral distance is perpendicular to and centered on a line of sight between the viewer and the aperture optic, and the path traverses onto the semi-reflector at least twice.

2. The system of claim 1, further comprising a vehicle, wherein the curved display and the field-evolving cavity are mounted to a part of the vehicle.

3. The system of claim 1, wherein the curved display and the field-evolving cavity are mounted to a vehicle part selected from a group consisting of a seat, a roof, a center console, or a dashboard.

4. The system of claim 3, wherein the curved display and field-evolving cavity are mounted with a mechanical joint that permits relative movement between (i) the part and (ii) the curved display and field-evolving cavity.

5. The system of claim 4, wherein the mechanical joint is selected from a group consisting of a hinge, a track, a ball joint, a gimbal joint, a telescoping joint, an articulated arm, a mechanical linkage, and combinations thereof.

6. The system of claim 4, wherein the aperture optic comprises an absorptive polarizer and an antireflection layer.

7. The system of claim 1, wherein at least two of the curved display, the curved reflector, and the semi-reflector are coupled by a mechanical joint, such that the system is at least partially collapsible.

8. The system of claim 7, further comprising a user interaction interface to control a position or orientation of the virtual image.

9. The system of claim 2, further comprising:
a housing containing the curved display and the field-evolving cavity;
a mechanical joint that permits relative movement between (i) the part and (ii) the curved display and field-evolving cavity; and
a handle,
wherein the mechanical joint is operably connected to the housing and the part of the vehicle, and
the handle is operably connected to the housing for a user to move the position or orientation of the housing relative to the vehicle using the handle.

10. The system of claim 1, further comprising a user interaction interface to control a position or orientation of the virtual image.

11. The system of claim 1, wherein a lateral size of the virtual image is 1-3 times greater than a lateral size of the curved display.

12. The system of claim 1, wherein a depth of the virtual image to a headbox is 1-3 times greater than a distance from the headbox to the curved display.

13. The system of claim 1, wherein the curved display is not in a direct line of sight of a viewer.

14. The system of claim 1, further comprising a plurality of quarter-wave plates disposed along the optical path, wherein the semi-reflector is a polarization-dependent semi-reflector.

15. A system comprising:
a field-evolving cavity;
a display housing having surfaces to guide insertion of a portable display device into the display housing, wherein, with the portable display device inserted into the display housing, an entrance aperture of the display housing directs light from the portable display device into the field-evolving cavity,
wherein the field-evolving cavity includes:
a semi-reflector positioned to have the light incident thereon; and
a reflector positioned to reflect the light to or from the semi-reflector;
wherein, when the portable display device showing content is placed in the display housing, a virtual image based on the content is produced.

16. The system of claim 15, wherein the display housing is shaped to house a tablet, a smart phone, or a laptop.

17. The system of claim 15, further comprising a vehicle, wherein the display housing and the field-evolving cavity are mounted to the vehicle.

18. The system of claim 15, wherein the display housing and the field-evolving cavity are mounted to a vehicle through a mechanical joint.

19. The system of claim 18, wherein the mechanical joint is selected from a group consisting of a hinge, a track, a ball joint, a gimbal joint, a telescoping joint, and a mechanical linkage.

20. The system of claim 15, further comprising a user interactive interface to control the content and a plurality of system parameters.

21. A system comprising:
a housing; and
a field-evolving cavity mounted in the housing, the field-evolving cavity to direct light from a light source along a path to produce a virtual image, based on the light source, the virtual image being visible by a viewer's both eyes in a headbox spanning a lateral distance of at least 15 cm, the lateral distance is perpendicular to and centered on a line of sight between the viewer and the aperture optic;
the field-evolving cavity having an entrance aperture to receive the light;
a semi-reflector positioned along the path;
a curved reflector disposed along the path to reflect the light; and
an aperture optic to transmit the light away from the field-evolving cavity, wherein
the path traverses onto the semi-reflector at least twice.

22. The system of claim 21, further comprising a vehicle, wherein the housing is mounted to the vehicle.

23. The system of claim 21, further comprising the light source, wherein the light source is a curved display mounted within the housing and positioned to emit the light into the field-evolving cavity through the entrance aperture.

24. The system of claim 23, wherein a depth of the virtual image to a headbox is greater than a distance between the curved display and the headbox.

25. The system of claim 23, wherein a lateral size of the virtual image is larger than a lateral size of the curved display.

26. The system of claim 1, wherein the curved reflector is a switchable mirror.

27. The system of claim 3, wherein the light is free from reflection from a surface of the vehicle.

28. The system of claim 1, wherein light from any pixel from the curved display enters both eyes of the viewer when both eyes are in the headbox.

29. The system of claim 1, wherein a viewing distance between the aperture optic and a nearest viewing position in the headbox is greater than 20 cm, the viewing distance measured along the line of sight.

30. The system of claim 1, wherein the lateral distance is measured between a first position where the virtual image becomes at least partially disappeared to one of the viewer's both eyes and a second position where the virtual image becomes at least partially disappeared to the other one of the viewer's both eyes.

* * * * *